US009612966B2

(12) United States Patent
Joshi et al.

(10) Patent No.: US 9,612,966 B2
(45) Date of Patent: *Apr. 4, 2017

(54) SYSTEMS, METHODS AND APPARATUS FOR A VIRTUAL MACHINE CACHE

(75) Inventors: Vikram Joshi, Los Gatos, CA (US); Yang Luan, San Jose, CA (US); Michael Brown, Campbell, CA (US); Bhavesh Mehta, Mountain View, CA (US)

(73) Assignee: SanDisk Technologies LLC, Plano, TX (US)

(*) Notice: Subject to any disclaimer, the term of this patent is extended or adjusted under 35 U.S.C. 154(b) by 280 days.

This patent is subject to a terminal disclaimer.

(21) Appl. No.: 13/541,659

(22) Filed: Jul. 3, 2012

(65) Prior Publication Data

US 2014/0012940 A1   Jan. 9, 2014

(51) Int. Cl.
G06F 15/167 (2006.01)
G06F 12/0875 (2016.01)
G06F 9/455 (2006.01)

(52) U.S. Cl.
CPC ...... G06F 12/0875 (2013.01); G06F 9/45558 (2013.01); G06F 2009/45583 (2013.01)

(58) Field of Classification Search
CPC . G06F 12/0815; G06F 9/45558; G06F 9/5077
USPC .............................. 709/214; 711/6
See application file for complete search history.

(56) References Cited

U.S. PATENT DOCUMENTS

| 4,571,674 A | 2/1986 | Hartung |
| 5,043,871 A | 8/1991 | Nishigaki et al. |
| 5,193,184 A | 3/1993 | Belsan et al. |
| 5,261,068 A | 11/1993 | Gaskins et al. |
| 5,291,496 A | 3/1994 | Andaleon et al. |
| 5,307,497 A | 4/1994 | Feigenbaum |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |

(Continued)

FOREIGN PATENT DOCUMENTS

| CN | 1771495 | 5/2006 |
| EP | 1100001 | 5/2001 |

(Continued)

OTHER PUBLICATIONS

Albert Noll et al., CellVM: A Homogeneous Virtual Machine Runtime System for a Heterogeneous Single-Chip Multiprocessor; Technical Report No. 06-17, *Donald Bren School of Information and Computer Science*, University of California, Irvine; Nov. 2006.

(Continued)

*Primary Examiner* — Ario Etienne
*Assistant Examiner* — Sahera Halim
(74) *Attorney, Agent, or Firm* — Stoel Rives LLP

(57) ABSTRACT

A virtual machine cache provides for maintaining a working set of the cache during a transfer between virtual machine hosts. In response to the transfer, a previous host retains cache data of the virtual machine, which is provided to the new host of the virtual machine. The cache data may be transferred via a network transfer.

19 Claims, 26 Drawing Sheets

(56) References Cited

U.S. PATENT DOCUMENTS

| | | |
|---|---|---|
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Niijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,740,367 A | 4/1998 | Spilo |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jenett |
| 6,073,232 A | 6/2000 | Kroeker et al. |
| 6,075,938 A | 6/2000 | Bugnion et al. |
| 6,101,601 A | 8/2000 | Matthews et al. |
| 6,115,703 A | 9/2000 | Bireley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,742,082 B1 | 5/2004 | Lango et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 6/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |
| 7,203,815 B2 | 4/2007 | Haswell |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |

(56) References Cited

U.S. PATENT DOCUMENTS

| | | |
|---|---|---|
| 7,272,606 B2 | 9/2007 | Borthakur et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 * | 4/2010 | Petev et al. ............... 711/6 |
| 7,702,873 B2 | 4/2010 | Griess et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,761,573 B2 * | 7/2010 | Travostino ............. G06F 9/4856 709/226 |
| 7,801,894 B1 | 9/2010 | Bone et al. |
| 7,805,449 B1 | 9/2010 | Bone et al. |
| 7,831,783 B2 | 11/2010 | Pandit et al. |
| 7,831,977 B2 | 11/2010 | Schultz et al. |
| 7,853,772 B2 | 12/2010 | Chang et al. |
| 7,873,782 B2 | 1/2011 | Terry et al. |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,617 B1 * | 3/2011 | Ponnapur ............ G06F 9/455 709/224 |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,683 B2 | 11/2011 | Shultz et al. |
| 8,095,764 B1 | 1/2012 | Bauer et al. |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,201 B1 | 5/2012 | Edwards, Sr. |
| 8,171,204 B2 | 5/2012 | Chow et al. |
| 8,195,929 B2 | 6/2012 | Banga et al. |
| 8,214,583 B2 | 7/2012 | Sinclair et al. |
| 8,244,935 B2 | 8/2012 | Leventhal et al. |
| 8,341,352 B2 | 12/2012 | Cain, III et al. |
| 8,479,294 B1 * | 7/2013 | Li et al. .............. 726/24 |
| 8,549,222 B1 | 10/2013 | Kleiman et al. |
| 8,613,085 B2 * | 12/2013 | Diab et al. ............ 726/22 |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0153694 A1 | 8/2004 | Nicholson et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnamana et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0041731 A1 | 2/2006 | Jochemsen et al. |
| 2006/0053157 A1 | 3/2006 | Pitts |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |

(56) References Cited

U.S. PATENT DOCUMENTS

| | | |
|---|---|---|
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0033371 A1 | 2/2007 | Dunshea et al. |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Chow et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233455 A1 | 10/2007 | Zimmer et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005141 A1 | 1/2008 | Zheng et al. |
| 2008/0005748 A1 | 1/2008 | Mathew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song |
| 2008/0104321 A1 | 5/2008 | Kamisetty et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1 | 10/2008 | Rolia et al. |
| 2008/0276040 A1 | 11/2008 | Moritoki |
| 2008/0307414 A1 | 12/2008 | Alpern et al. |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0132621 A1 | 5/2009 | Jensen et al. |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0279556 A1 | 11/2009 | Selitser et al. |
| 2009/0287887 A1 | 11/2009 | Matsuki et al. |
| 2009/0292861 A1 | 11/2009 | Kanevsky et al. |
| 2009/0294847 A1 | 11/2009 | Maruyama et al. |
| 2009/0300277 A1 | 12/2009 | Jeddoloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070715 A1 | 3/2010 | Waltermann et al. |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0095059 A1 | 4/2010 | Kisley et al. |
| 2010/0169542 A1 | 7/2010 | Sinclair |
| 2010/0199036 A1 | 8/2010 | Siewert et al. |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1 | 8/2010 | Gao et al. |
| 2010/0228903 A1 | 9/2010 | Chandrasekaran et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0268881 A1 | 10/2010 | Galchev et al. |
| 2011/0022819 A1 | 1/2011 | Post et al. |
| 2011/0107033 A1 | 5/2011 | Grigoriev et al. |
| 2011/0179162 A1 | 7/2011 | Mayo et al. |
| 2011/0225342 A1 | 9/2011 | Sharma et al. |
| 2011/0231857 A1 | 9/2011 | Zaroo et al. |
| 2011/0238546 A1 | 9/2011 | Certain et al. |
| 2011/0265083 A1 | 10/2011 | Davis |
| 2011/0314202 A1 | 12/2011 | Iyigun et al. |
| 2011/0320733 A1 | 12/2011 | Sanford et al. |
| 2012/0017209 A1 | 1/2012 | Ben-Yehuda et al. |
| 2012/0159081 A1 | 6/2012 | Agrawal et al. |
| 2012/0173653 A1 | 7/2012 | Bland et al. |
| 2012/0173824 A1 | 7/2012 | Iyigun et al. |

(56) References Cited

U.S. PATENT DOCUMENTS

| | | | |
|---|---|---|---|
| 2012/0254824 A1 | 10/2012 | Bansod | |
| 2012/0272240 A1 | 10/2012 | Starks et al. | |
| 2012/0278588 A1 | 11/2012 | Adams et al. | |
| 2013/0081013 A1 | 3/2013 | Plondke et al. | |
| 2013/0232303 A1* | 9/2013 | Quan | 711/118 |
| 2013/0262801 A1* | 10/2013 | Sancheti et al. | 711/162 |
| 2013/0263119 A1 | 10/2013 | Pissay et al. | |
| 2013/0318283 A1 | 11/2013 | Small et al. | |
| 2013/0339958 A1 | 12/2013 | Droste et al. | |
| 2013/0346613 A1 | 12/2013 | Tarasuk-Levin et al. | |
| 2014/0136872 A1 | 5/2014 | Cooper et al. | |
| 2014/0156910 A1 | 6/2014 | Uttamchandani et al. | |
| 2014/0156938 A1 | 6/2014 | Galchev et al. | |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO02/01365 | 1/2002 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

NEVEX Virtual Technologies, CacheWorks Data Sheet, http://www.nevex.com/wp-content/uploads/2010/12/Data-Sheet3.pdf, Published Dec. 1, 2010, Visited Aug. 1, 2012.

David C. Steere et al., "Efficient User-Level File Cache Management on the Sun Vnode Interface," School of Computer Science, Carnegie Mellon University, CMU-CS-90-126, Usenix Conference Proceedings, Jun. 1990.

Pin Lu et al., Virtual machine memory access tracing with hypervisor exclusive cache, Proceedings of the USENIX Annual Technical Conference 2007 (ATC'07), Article No. 3, 15 pages.

Mark Friedman et al., File Cache Performance and Tuning, Windows 2000 Performance Guide, O'Reilly & Associates, Inc., http://msdn.microsoft.com/en-us/library/ms369863.aspx, Published Jan. 2002, Visited Aug. 3, 2012.

Microsoft, Filter Driver Development Guide, http://download.microsoft.com/download/e/b/a/eba1050f-a31d-436b-9281-92cdfeae4b45/FilterDriverDeveloperGuide.doc, 2004, Published 2004, Visited Aug. 3, 2012.

Microsoft, File Cache Management, Windows Embedded CE 6.0 R3, msdn.microsoft.com/en-us/subscriptions/aa911545.aspx, Published Aug. 28, 2008, Visited Aug. 3, 2012.

D. Muntz et al., Multi-level Caching in Distributed File Systems, CITI Technical Report 91-3, Aug. 16, 1991.

Omesh Tickoo et al, Modeling Virtual Machine Performance: Challenges and Approaches, *SIGMETRICS Perform. Eval. Rev.* 37, 3 (Jan. 2010), 55-60. DOI=10.1145/1710115.1710126 http://doi.acm.org/10.1145/1710115.1710126.

Craig Linn, Windows I/O Performance: Cache Manager and File System Considerations, CMGA Proceedings, Sep. 6, 2006.

Adabas, Adabas Caching Configuration and Tuning, http://documentation.softwareag.com/adabas/ada821mfr/addons/acf/config/cfgover.htm, Published Sep. 2009, Visited Aug. 3, 2012.

Adabas, Adabas Caching Facility, http://www.softwareag.com/es/Images/Adabas_Caching_Facility_tcm24-71167.pdf, Published 2008, Visited Aug. 3, 2012.

VMware, Introduction to VMware vSphere, http://www.vmware.com/pdf/vsphere4/r40/vsp_40_intro_vs.pdf, Published 2009, Visited Aug. 1, 2012.

VMware, Virtual Disk API Programming Guide, Virtual Disk Development Kit 1.2, Published Nov. 2010, Visited Aug. 3, 2012.

Atlantis Computing Technology, Caching, http://atlantiscomputing.com/technology/caching, published 2012, accessed Aug. 1, 2012.

Richard Rosen, IntelliCache, Scalability and consumer SSDs, blogs.citrix.com/2012/01/03/intellicache-scalability-and-consumer-ssds, Jan. 3, 2012, accessed Aug. 3, 2012.

Christian Ferber, XenDesktop and local storage + IntelliCache, Jun. 22, 2011, blogs.citrix.com/2011/06/22/xendesktop-and-local-storage-intellicache/, accessed Aug. 3, 2012.

Citrix, XenServer-6.0.0 Installation Guide, Mar. 2, 2012, http://support.citrix.com/servlet/KbServlet/download/28750-102-673824/XenServer-6.0.0-installation.pdf. accessed Aug. 3, 2012.

Adabas, Adabas Caching ASSO, Data, Work, Aug. 26, 2011, http://communities.softw areag.com/web/guest/pwiki/-/wiki/Main/.../pop_up?_36_viewMode=print, Oct. 2008, accessed Aug. 3, 2012.

Adabas, File Level Caching, http://documentation.softwareag.com/adabas/ada824mfr/addons/acf/services/file-level-caching.htm, accessed Aug. 3, 2012.

USPTO, Office Action for U.S. Appl. No. 13/750,904 mailed Nov. 3, 2014.

USPTO, Office Action for U.S. Appl. No. 13/687,979 mailed Feb. 24, 2015.

USPTO, Office Action for U.S. Appl. No. 13/837,210 mailed Feb. 27, 2015.

Non-Final Office Action for U.S. Appl. No. 13/687,979, filed Nov. 28, 2012, and mailed from the USPTO on Jan. 4, 2016, 9 pgs.

Non-Final Office Action for U.S. Appl. No. 13/687,979, filed Nov. 28, 2012, and mailed from the USPTO on Jul. 8, 2015, 14 pgs.

USPTO, office action in U.S. Appl. No. 13/687,979 dated Oct. 7, 2016.

Hystor: "Making SSDs the Survival of the Fittest in High-Performance Storage Systems," ics10-Paper 102, Feb. 2010.

IBM, "Method to Improve Reliability of SSD Arrays," Nov. 2009.

Information Technology, "SCSI Object-Based Storage Device Commands," 2 (OSD-2), Project T10/1729-D, Revision 4, published Jul. 30, 2004, printed Jul. 24, 2008.

INTEL, "Non-Volatile Memory Host Controller Interface (NVMHCI) 1.0," Apr. 14, 2008.

Johnson, "An Introduction to Block Device Drivers," Jan. 1, 1995.

Kawaguchi, "A Flash-Memory Based File System," TCON'95 Proceedings of the USENIX 1995 Technical Conference Proceedings, p. 13.

Mesnier, "Object-Based Storage," IEEE Communications Magazine, Aug. 2003, pp. 84-90.

Micron Technology, Inc., "NAND Flash 101: An Introduction to ND Flash and How to Design It in to Your Next Product (TN-29-19)," http://www.micron.com/~/media/Documents/Products/Technical%20Note/ND%20Flash/145tn2919_nd_101.pdf, 2006, visited May 10, 2010.

Micron, "TN-29-08: Technical Note," Hamming Codes for NAND Flash Memory Devices, Mar. 10, 2010.

Micron, "TN-29-17: NAND Flash Design and Use Considerations," Mar. 10, 2010.

Micron, "TN-29-42: Wear-Leveling Techniques in NAND Flash Devices," Mar. 10, 2010.

Microsoft, Data Set Management Commands Proposal for ATA8-ACS2, published Oct. 5, 2007, Rev. 3.

Microsoft, "How NTFS Works," Apr. 9, 2010.

Morgenstern, David, "Is There a Flash Memory RAID in your Future?", http://www.eweek.com—eWeek, Ziff Davis Enterprise Holdings Inc., Nov. 8, 2006, visited Mar. 18, 2010.

Novell, "File System Primer", http://wiki.novell.com/index.php/File_System_Primer, 2006, visited Oct. 18, 2006.

Perfectcacheserver, "Automatic Disk Caching," http://www.raxco.com/business/perfectcache_server.aspx, last visited Oct. 31, 2012.

(56) References Cited

OTHER PUBLICATIONS

PIVOT3, "Pivot3 announces IP-based storage cluster," www.pivot3._com, Jun. 22, 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/ training/ss/lecture/new-documents/ Lectures/15-CacheManager/Cache Manager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
SEARS, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/Uploaded-Documents/docs2008/e07154r6-Data_Set_Management_Proposal_for_ATA-ACS2.pdf, printed Apr. 5, 2010.
Singer, Dan, "Implementing MLC NAND Flash for Cost-Effective, High Capacity Memory," M-Systems, White Paper, 91-SR014-02-8L, Rev. 1.1, Sep. 2003.
Solid Data, Maximizing Performance through Solid State File-Caching, Best Practices Guide, http://soliddata.com/resources/pdf/bp-sybase.pdf, May 2000.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, issued Jun. 29, 2011.
State Intellectual Property Office, Office Action, CN Application No. 200780050970.0, issued Oct. 28, 2010.
State Intellectual Property Office, Office Action, CN Application No. 200780051020.X, issued Nov. 11, 2010.
State Intellectual Property Office, Office Action, CN Application No. 200780050983.8, issued May 18, 2011.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
State Intellectual Property Office, Office Action, CN Application No. 200780050970.0, issued Jan. 5, 2012.
Superspeed, "New Super Cache 5 on Servers," http://www.superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
USPTO, Interview Summary for U.S. Appl. No. 10/372,734, mailed Feb. 28, 2006.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 12/879,004 mailed Feb. 25, 2013.
USPTO, Office Action for U.S. Appl. No. 13/607,486 mailed Jan. 10, 2013.
USPTO, Office Action for U.S. Appl. No. 10/372,734, mailed Sep. 1, 2005.
USPTO, Office Action for U.S. Appl. No. 11/952,113, mailed Dec. 15, 2010.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13,607,486 mailed May 2, 2013.
USPTO, Office Action for U.S. Appl. No. 13/118,237 mailed Apr. 22, 2013.
USPTO, Office Action, U.S. Appl. No. 11/952,109, issued May 1, 2013.
USPTO, Office Action, U.S. Appl. No. 11/952,109, mailed Nov. 29, 2011.
Van Hensbergen, IBM Research Report, "Dynamic Policy Disk Caching for Storage Networking," IBM Research Division, Computer Science, RC24123 (WO611-189), Nov. 28, 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices," Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, mailed Feb. 16, 2009.
WIPO, International Preliminary Report on Patentability for PCT/US2007/086688, mailed Mar. 16, 2009.
WIPO, International Preliminary Report on Patentability for PCT/US2007/086701, mailed Mar. 16, 2009.
WIPO, International Preliminary Report on Patentability for PCT/US2007/086687, mailed Mar. 18, 2009.
WIPO, International Preliminary Report on Patentability for PCT/US2007/025048, mailed Jun. 10, 2009.
WIPO, International Preliminary Report on Patentability for PCT/US2010/048325, mailed Mar. 13, 2012.
WIPO, International Search Report and Written Opinion for PCT/US2007/086691, mailed May 8, 2008.
WIPO, International Search Report and Written Opinion for PCT/US2007/025049, mailed May 14, 2008.
WIPO, International Search Report and Written Opinion for PCT/US2007/025048, mailed May 27, 2008.
WIPO, International Search Report and Written Opinion for PCT/US2007/086701, mailed Jun. 5, 2008.
WIPO, International Search Report and Written Opinion for PCT/US2007/086687, mailed Sep. 5, 2008.
WIPO, International Search Report and Written Opinion for PCT/US2011/65927, mailed Aug. 28, 2012.
WIPO, International Search Report and Written Opinion for PCT/US2012/029722, mailed Oct. 30, 2012.

(56) References Cited

OTHER PUBLICATIONS

WIPO, International Search Report and Written Opinion for PCT/US2012/039189, mailed Dec. 27, 2012.
WIPO, International Search Report and Written Opinion PCT/US2010/025885, mailed Sep. 28, 2011.
WIPO, International Search Report and Written Opinion PCT/US2012/050194, mailed Feb. 26, 2013.
Woodhouse, David, "JFFS: The Journaling Flash File System," Red Hat, Inc., http://sourceware.org/jffs2/jffs2.pdf, visited Jun. 22, 2010.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yang, "A DCD Filter Driver for Windows NT 4," Proceedings of the 12th International Conference on Computer Applications in Industry and Engineering (CAINE-99), Atlanta, Georgia, USA, Nov. 4-6, 1999.
Yerrick, "Block Device," http://www.pineight.com/ds/block, last visited Mar. 1, 2010.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-227.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Bandulet "Object-Based Storage Devices," Jul. 2007 http://developers.sun.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & aerospace Electronics East 2004," http://www.bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San," Storage Inc., http://www.solidata.com/resourses/pdf/storageing.pdf, 2000, visited May 20, 2011.
Casey, "Solid State File-Caching for Performance and Scalability," SolidData Quarter 1 2000, http://www/storagesearch. com/3dram. html, visited May 20, 2011.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.//datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gill, "WOW: Wise Ordering for Writes—Combining Spatial and Temporal Locality in Non-Volatile Caches," IBM, Fast "05: 4th USENIX Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
USPTO, Office Action for U.S. Appl. No. 14/262,581 mailed Jun. 19, 2014.
USPTO, Office Action for U.S. Appl. No. 13/687,979 mailed Sep. 9, 2014.
USPTO, Office Action for U.S. Appl. No. 13/192,365 mailed Jul. 17, 2014.
USPTO, Office Action for U.S. Appl. No. 13/287,998 mailed Jun. 10, 2014.
USPTO, Office Action for U.S. Appl. No. 13/288,005 mailed Jul. 8, 2014.

* cited by examiner

| TIME (HH:MM) | CLOCK HAND 1 (10 MINUTES) | | CLOCK HAND 2 (1 HOUR) | |
|---|---|---|---|---|
| | BIT 1 | BIT 2 | BIT 1 | BIT 2 |
| 00:00 | 1 | 1 | 1 | 1 |
| 00:05 | 1 | 1 | 1 | 1 |
| 10 MINUTE CLOCK SWEEP | | | | |
| 00:08 | 1 | 0 | 1 | |
| 10 MINUTE CLOCK SWEEP | | | | |
| 00:18 | 0 | 0 | 1 | 1 |
| DATA ACCESS | | | | |
| 00:22 | 1 | 1 | 1 | 1 |
| 10 MINUTE CLOCK SWEEP | | | | |
| 00:28 | 1 | 0 | 1 | 1 |
| 1 HOUR CLOCK SWEEP | | | | |
| 00:31 | 1 | 0 | 1 | 0 |
| 10 MINUTE CLOCK SWEEP | | | | |
| 00:38 | 0 | 0 | 1 | 0 |
| 10 MINUTE CLOCK SWEEP | | | | |
| 00:48 | 0 | 0 | 1 | 0 |
| 10 MINUTE CLOCK SWEEP | | | | |
| 00:58 | 0 | 0 | 1 | 0 |
| DATA ACCESS | | | | |
| 01:04 | 1 | 1 | 1 | 1 |
| DATA ACCESS | | | | |
| 01:07 | 1 | 1 | 1 | 1 |
| 10 MINUTE CLOCK SWEEP | | | | |
| 01:08 | 1 | 0 | 1 | 1 |

SYSTEMS, METHODS AND APPARATUS FOR A VIRTUAL MACHINE CACHE

TECHNICAL FIELD

The embodiments described herein relate to the management of data input/output (I/O) operations in a computing environment and, in particular, to cache warming.

BRIEF DESCRIPTION OF THE DRAWINGS

This disclosure includes and references the accompanying drawings, which provide a more particular description of the embodiments disclosed herein. The disclosure, however, is not limited to the particular, embodiments depicted in the figures. The teachings of the disclosure may be utilized and/or adapted to other embodiments and/or changes may be made to the disclosed embodiments, without departing from the scope of the disclosure.

DETAILED DESCRIPTION

Figure 1:
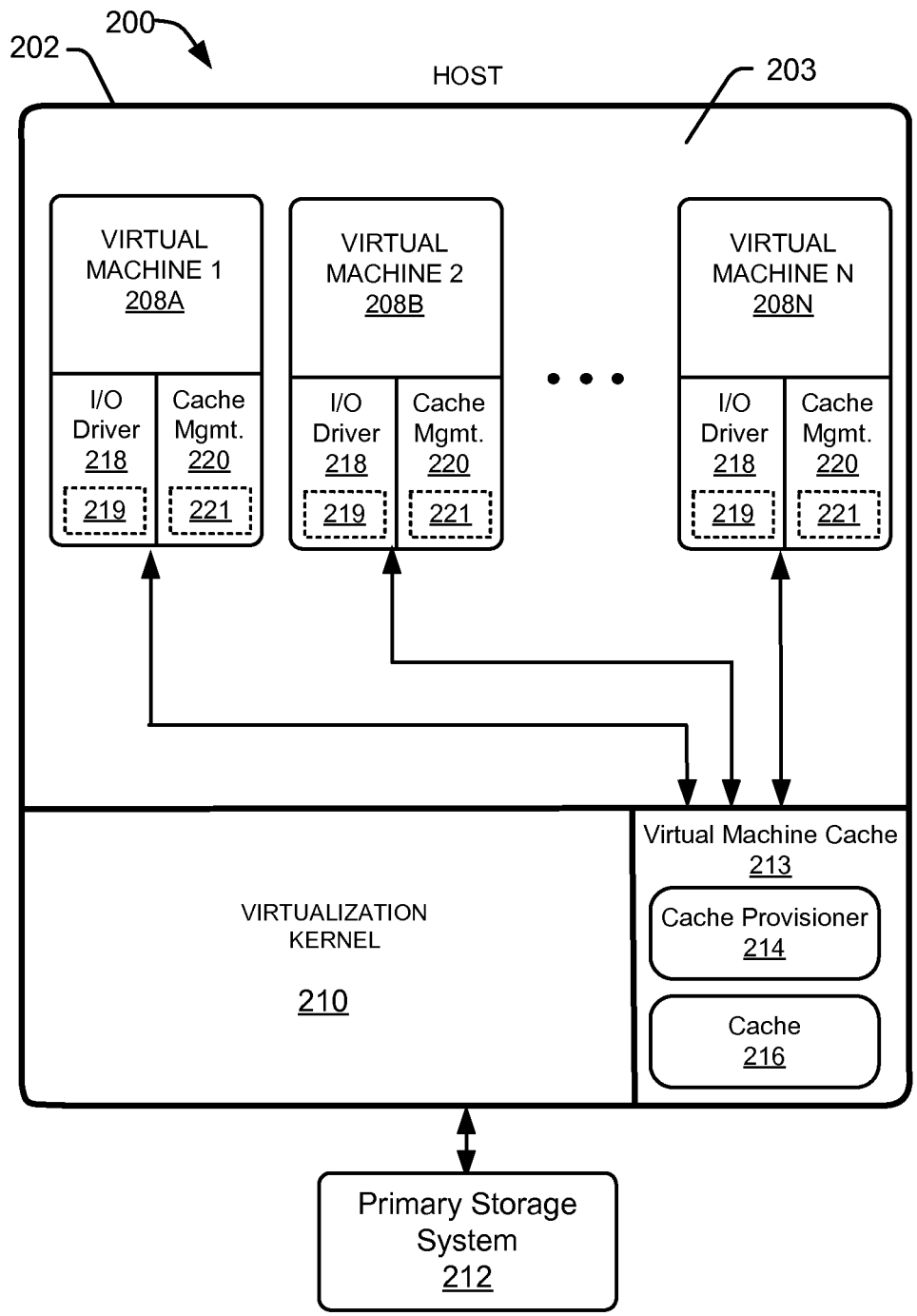
FIG. 1 is a block diagram of one embodiment of a virtualized environment.

The embodiments described herein relate to the management of data input/output (I/O) operations in various computing environments, including virtualized computing environments. However, although particular examples and/or embodiments disclosed herein relate to virtualized environments, the disclosure is not limited in this regard, and could be applied to non-virtualized ("bare metal") environments.

In some embodiments, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems. Thus operating systems that currently exist will be oblivious to the operations of the embodiments described herein, which will cooperate with the basic operation characteristics of virtual operating systems and not disrupt them, while better optimizing the operations of virtual machines resident in hosts.

Specific systems and methods described herein utilize a cache memory constructed with various memory devices, such as flash memory devices or RAM (random access memory) that may or may not be block oriented. The systems and methods described herein do not differentiate between Flash memory, RAM or other types of memory, and further envision new types of memory developed in the future that will utilize various embodiments described herein. The described systems and methods may utilize any type of memory device, regardless of the specific type of memory device shown in any figures or described herein. Particular systems and methods described herein may generally be referred to as an "I/O hypervisor" due to its management of I/O operations in a virtualized environment.

The systems and methods described herein relate to the management of data input/output (I/O) operations in a computing environment. Although particular examples discussed herein relate to virtualized environments, the same systems and methods are applicable to any type of computing environment. In particular implementations, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems. Thus operating systems that currently exist will be oblivious to the operations of the embodiments described herein, which will cooperate with the basic operation characteristics of virtual operating systems and not disrupt them, while better optimizing the operations of virtual machines resident in hosts.

Specific systems and methods described herein utilize a cache memory constructed with various memory devices, such as flash memory devices or RAM (random access memory) that may or may not be block oriented. The systems and methods described herein do not differentiate between Flash memory, RAM or other types of memory, and further envision new types of memory developed in the future that will utilize various embodiments described herein. The described systems and methods may utilize any type of memory device, regardless of the specific type of memory device shown in any figures or described herein. Particular systems and methods described herein may generally be referred to as an "I/O hypervisor" due to its management of I/O operations in a virtualized environment.

FIG. 1 is a block diagram of one embodiment of a virtualized environment 200. The virtualized environment 200 includes a host 202 comprising a virtualization kernel 210 and user space 203. The user space 203 may include multiple virtual machines 208A-N, which are also referred to as "guest operating systems." Although FIG. 1 depicts a virtualization environment, the disclosure is not limited in this regard, and could operate as a "bare metal" system. As used herein, a "bare metal" system refers to an operating system (e.g., Windows®, Unix®, Linux, or the like) that executes directly on computing device hardware. An operating system executing on bare metal may be referred to as a "base operating system." A bare metal computing device, operating system, and/or application may, therefore, not operate within the virtualization kernel 210. As used herein, a "virtual system" or "virtual machine," refers to a computing device, operating system, and/or application operating within a virtualization kernel (e.g., virtualization kernel 210). The terms "virtual machine" and "guest OS" (guest operating system) are used interchangeably herein.

Each virtual machine 208A-N may be configured to implement a different operating system. The host 200 may comprise one or more computing devices capable of hosting multiple virtual machines 208A-N and supporting the applications executed by the virtual machines and the functions associated with those applications. The host 200 may include, for example, one or more processors, memory devices, persistent storage devices, communication devices, I/O interfaces, and related components. Although three virtual machines 208A-N are shown within the host 200, the disclosure is not limited in this regard, and the host 200 may include any number of virtual machines.

The virtualization kernel 210 may be configured to manage the operation of the virtual machines 208A-N operating on the host 200 as well as other components and services provided by the host 200. For example, the virtualization kernel 210 may be configured to handle various I/O operations associated with a primary storage system 212 or other storage devices. They primary storage system 212 may be shared among the multiple virtual machines 208A-N, and may be shared by multiple hosts. The primary storage system 212 may comprise multiple disk drives or other storage devices, such as one or more storage arrays (e.g., RAID, JBOD, or the like).

The host 200 may further comprise a virtual machine cache 213, which may be configured to provide caching services to the virtual machines 208A-N deployed on the host computing device 200. The virtual machine cache 213 may comprise a cache provisioner module 214 and a cache 216. The cache 216 may comprise a cache storage device which may include, but is not limited to: one or more memory devices, such as solid-state memory devices, Random Access Memory ("RAM") devices, or the like. As used herein, a "solid-state memory device," refers to a non-volatile, persistent memory that can be repeatedly erased and reprogrammed. Accordingly, a solid-state memory device may comprise a solid-state storage device and/or solid-state storage drive (SSD) (e.g., a Flash storage device). The cache provisioner module 214 may be configured to provision resources of the cache 216 to the virtual machines 208A-N, which may comprise dynamically provisioning cache storage and/or I/O operations ("IOPS") to the virtual machines 208A-N. The cache provisioner module 214 may be configured to provide for sharing resources of the cache 216 between multiple virtual machines 208A-N. The cache provisioner module 214 may be further configured to protect and/or secure data stored within the cache 216, to prevent more than one virtual machine 208A-N from accessing the same cache data. For example, in some embodiments, the cache provisioner module 214 is configured to associate cached data with a virtual machine identifier (via a VLUN mapping as described below in conjunction with FIG. 16), which may be used to control access to the cache data. Additional details regarding the operation of cache provisioner module 214 and cache 216 are discussed herein.

The virtual machines 208A-N may comprise an I/O driver 218 and a cache management system 220. As used herein, the cache management system (CMS) 220 may also be referred to as a Cache File System (CFS) 220. The I/O driver 218 may be configured to intercept I/O operations of the associated virtual machine 208A-N, and to direct the I/O operations to the virtual machine cache 213 for processing.

In some embodiments, and as depicted in FIG. 1, an I/O driver 218 may be implemented within the virtual machines 208A-N. Accordingly, the I/O driver 218 may be in "close proximity" to the source of I/O operations and data associated with the I/O operations (e.g., the I/O driver 218 does not have to access the virtualization kernel 210 and/or cross a virtual machine boundary to access the I/O operations).

In some embodiments, the I/O driver 218 may comprise and/or be implemented as a "device driver" (e.g., a device driver of respective guest operating systems of the virtual machines 208A-N). The I/O driver 218 may comprise a generic component that forms part of an operating system and a device-specific component. The I/O driver 218 may leverage I/O Application Programming Interfaces (APIs) published by the operating system (e.g., may be in the I/O "path" of the virtual machines 208A-N). Accordingly, in some embodiments, the I/O driver 218 may comprise a "filter driver" configured to operate above standard device drivers in an I/O stack of a virtual machine 208A-N.

In some embodiments, the virtual machines 208A-N may be configured to be transferred and/or relocated from the host 202 to other host computing devices. The virtualization kernel 210 (or other virtualization layer) may be configured to prevent virtual machines that reference local resources of the host 202, such as local disk storage or the like, from being transferred. Accordingly, virtual machines 208A-N may be configured to access the virtual machine cache 213 as if the virtual machine cache 213 were a shared storage resource and/or in a way that does not prevent the virtual machines 208A-N from being transferred between hosts 202.

In some embodiments, the cache management module 220 is configured to access the virtual machine cache 213 through a "virtual disk," which the virtualization kernel 210 treats as a "shared device" (and/or a device that does not prevent virtual machines 208A-N from being transferred between hosts 202). The virtual disk may be provided in a "Virtual Machine Disk Format" (VMDK) supported by the host 202 and/or virtualization kernel 210. The I/O driver 218 may comprise an I/O filter 219 that is configured to monitor I/O operations of the virtual machine 208A-N, intercept I/O operations directed to the virtual disk (e.g., the VLUN disk, described below), and to forward the I/O operations (and other, related data) to the virtual machine cache 213. The I/O filter 219 may operate "above" a SCSI and/or vSCSI level of the virtual machine 208A-N storage stack. The I/O filter may provide for passing I/O requests (and responses) between the cache management system 220 of the virtual machines 208A-N and the cache management system 213. The I/O filter may further provide for communicating other data, such as configuration, command, and/or control data (e.g., performing the handshake protocol, described above). The virtual disk may be represented as a Virtual Logical Unit Number (VLUN) disk implemented according to the VMDK format of the host 202 and/or virtualization kernel 210. The virtual disk may be very small (e.g., a few megabytes), since the virtual disk is not used for storage, but as a conduit for communication between the virtual machine 208 and the virtual machine cache 213 in the virtualization kernel 210.

The virtual machines 208A-N may be configured to emulate shared storage in other ways. For example, in some embodiments, the virtual machines 208A-N may be configured to replicate one or more "shared" VLUN disks across a plurality of hosts 202, such that, to the hosts, the VLUN disks appear to be shared devices. For instance, the VLUN disks may share the same serial number or other identifier. The host 202 and/or the virtualization kernel 210 may, therefore, treat the VLUN disks as shared devices, and allow virtual machines 208A-N to be transferred to/from the host 202. The VDMK approach described above may provide advantages over this approach, however, since a smaller number of "shared" disks need to be created, which may prevent exhaustion of limited storage references (e.g., a virtual machine may be limited to referencing 256 storage devices).

The cache provisioner module 214 may be configured to manage the storage capacity of cache 216 by, for example, allocating cache space among the virtual machines 208A-N, as discussed herein. The allocation information associated with a particular virtual machine (e.g., virtual machine 1 208A) may be communicated to the corresponding virtual-machine cache management system 220. Additional details regarding the operation of the I/O driver 218 and the cache provisioner module 214 are provided below.

In some embodiments, the cache management system 220 is configured to request cache storage from the cache provisioner module 214. The request may be transmitted in response to a cache management system 220 initialization operation (e.g., cache "warm up"). As used herein, cache initialization refers to one or more operations to prepare the cache management system 220 for operation. The cache management system 220 may be configured to perform one or more initialization operations in response to the virtual machine 208A-N being powered on, restarted, transferred to a new host (e.g., in a VMotion™ operation), or the like.

A cache initialization operation may comprise a handshake protocol with the virtual machine cache 213, which may comprise identifying the virtual machine 208A-N, assigning a virtual machine identifier (VMID) to the virtual machine 208A-N, allocating cache storage to the virtual machine 208A-N, and so on. The handshake protocol and/or cache initialization may further comprise the cache provisioner module 214 allocating cache storage capacity to the virtual machine 208A-N, as described above. The virtual machine cache 213 may maintain list, or other data structure, that identifies the virtual machines 208A-N deployed on the host 202. The virtual machines 208A-N may be identified by VMID or other identifier(s). The virtual machine cache 213 may identify a transferred virtual machine 208A-N based, at least in part, on the VMID of the virtual machine 208A-N. For example, the virtual machine cache 213 may determine that the virtual machine 208A-N is a "new" virtual machine on the host 202 in response to the VMID not appearing in the list of deployed virtual machines, and may determine that the virtual machine 208A-N was transferred to the host 202 based upon a host identifier of the VMID (and/or a separate host identifier maintained by the virtual machine 208A-N).

Alternatively, or in addition, the virtual machine cache 213 may be configured to actively identify a transferred virtual machines 208. For example, the virtual machine cache 213 may be configured to periodically query the virtual machines 208 for a VMID and/or current host id, which, as discussed above, may be used to determine whether the virtual machine 208 was transferred in from a remote host 202. In another example, the cache management system 220 of a virtual machine 208 may be configured to periodically interrogate the virtual machine cache 213, which may initiate a handshake protocol (as discussed above) before the virtual machine 208 performs any I/O requests.

Figure 16:
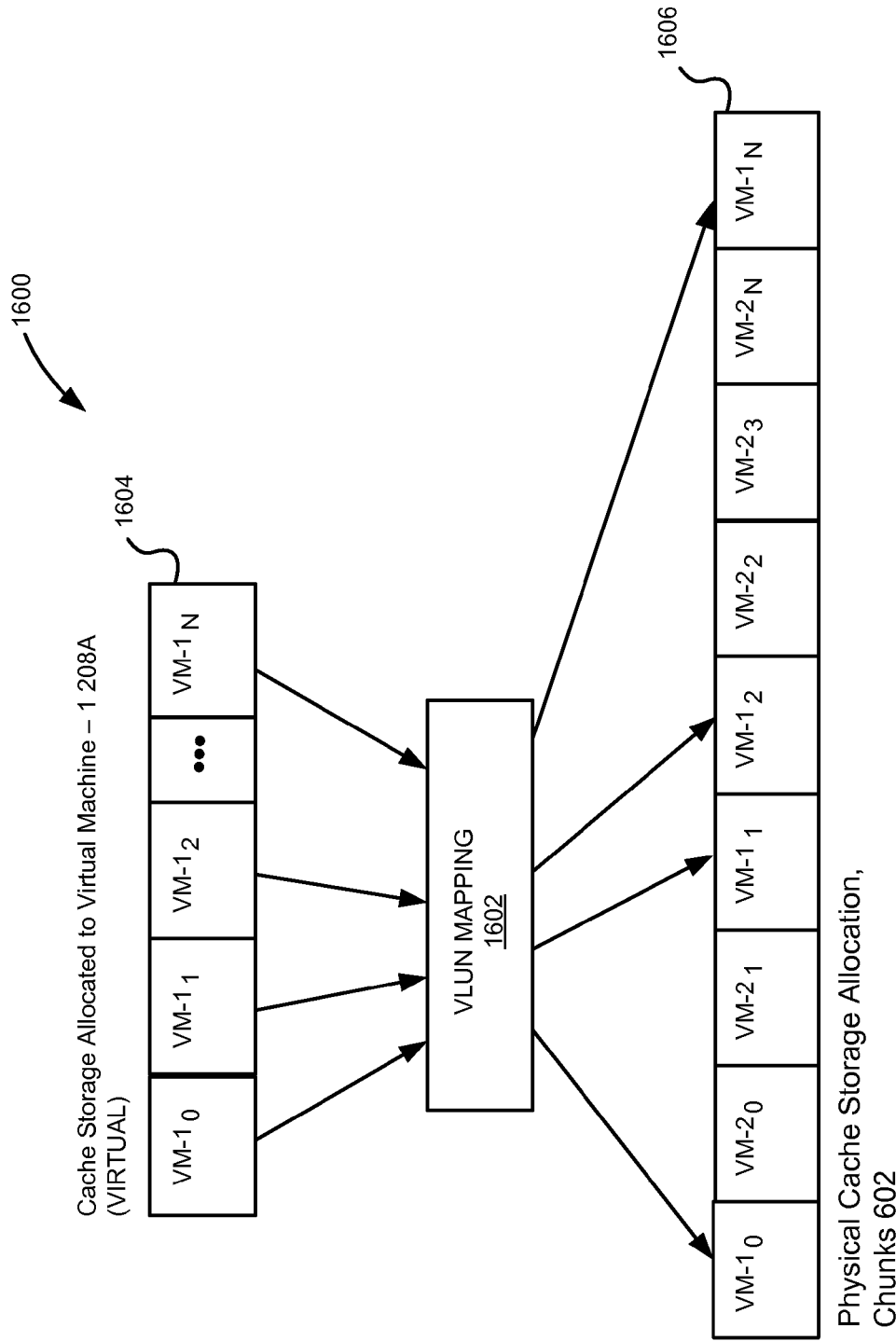
FIG. 16 depicts an exemplary VLUN cache address mapping.

In some embodiments, the cache provisioner module 214 is configured to maintain mappings between the virtual machines 208A-N and respective cache storage locations allocated virtual machines 208A-N (e.g., as depicted in FIG. 16). The mappings may be used to secure cache data of the virtual machines 208A-N (e.g., by limiting access to the virtual machine 208A-N mapped to the cached data) and/or to provide for retaining and/or transferring cache data of one or more virtual machines 208A-N transferred from the host 202 to other, remote hosts, as described below.

The cache management system 220 may be configured to maintain a set of cache tags 221 in accordance with the cache storage that has been allocated to the virtual machine 208A-N by the cache provisioner module 214. As used herein, a "cache tag" refers to an association between an identifier and a cache resource (e.g., a page or other cache storage location in the cache 216). Accordingly, the cache tags 221 may represent cache resources that have been allocated to a particular virtual machine 208A-N by the cache provisioner module 214. As used herein, an "identifier" of a cache tag 221 refers to an identifier used by the virtual machine 208A-N to reference data that has been (or will be) stored in the cache 216. A cache tag identifier may include, but is not limited to: an address (e.g., a memory address, physical storage address, logical block address, etc., such as an address on the primary storage system 212), a name (e.g., file name, directory name, volume name, etc.), a logical identifier, a reference, or the like.

The cache tags 221 may be stored within the respective virtual machine 208A-N (e.g., in volatile memory allocated to the virtual machine 208A-N by the host 200). In some embodiments, the cache tags 221 may represent a "working set" of cache data of the virtual machine 208A-N. As used herein, a "working set" of cache tags 221 refers to a set of cache that that has been admitted and/or retained in the cache 216 by the management system 220 through, inter alia, the application of one or more cache policies, such as cache admission policies, cache retention and/or eviction policies (e.g., cache aging metadata, cache steal metadata, least recently used (LRU), "hotness" and/or "coldness," and so on), cache profiling information, file- and/or application-level knowledge, and the like. Accordingly, the working set of cache tags 221 may represent the set of cache data that provides optimal I/O performance for the virtual machine 208A-N under certain operating conditions.

In some embodiments, the cache management system 220 may be configured to preserve and/or maintain the cache tags 221, which may comprise persisting the cache tags in a non-volatile storage medium, such as the primary storage system 212, persistent cache storage device (e.g., cache 216), or the like. As used herein, a "snapshot" refers to the "working set" of the cache at a particular time. A snapshot may comprise all or a subset of the cache tags 221 (and/or related cache metadata). In some embodiments, a snapshot may further comprise "pinning" data in the cache device 216, which may cause data referenced by the one or more cache tags 221 to be retained in the cache 216. Alternatively, the snapshot may reference only the data identifiers, and may allow the underlying data to be removed (e.g., evicted) from the cache 216. The cache management system 220 may be configured to load a snapshot from persistent storage, and to use the snapshot to populate the cache tags 221. A snapshot may be loaded as part of an initialization operation (e.g., cache warm up) and/or in response to configuration and/or user preference. For example, the cache management service 220 may be configured to load different snapshots that are optimized for particular application(s) and/or service(s). Loading a snapshot may further comprise requesting cache storage from the cache provisioner module 214, as described above. In some embodiments, the cache management service 220 may load a subset of a snapshot if the virtual machine 208A-N cannot allocate sufficient cache space for the full snapshot.

The cache management system 220 may be further configured to retain the cache tags 221 in response to relocating and/or transferring the virtual machine 208A-N to another virtual machine host 200 (e.g., in a VMotion™ operation, as described below). Retaining the cache tags 221 may comprise maintaining the cache tags 221 in the memory of the virtual machine 208A-N and/or not invalidating the cache tags 221. Retaining the cache tags 221 may further comprise requesting cache storage from the cache provisioner module 214 of the new host 200 in accordance with the retained cache tags 221, and/or selectively adding and/or removing cache tags 221 in response to being allocated more or less cache storage on the new host 200. In some embodiments, the cache management system 200 may retain the cache tags 221 despite the fact that the cache data referenced by the cache tags 221 does not exist in the cache 216 of the new host. As described below, the virtual machine cache 213 may be configured to populate the cache 216 with cache data from a previous host 200 of the virtual machine 208A-N (e.g., via a network transfer), and/or from a shared, primary storage 212 system.

In some embodiments, one or more of the virtual machines 208A-N may comprise a virtual desktop, such as a desktop environment associated with a particular user. One or more users may accesses the desktop environment via a terminal or other system or device. This type of virtual desktop environment is commonly referred to as Virtual Desktop Infrastructure ("VDI"). Thus, a single host 200 can replace many individual desktop computing systems. Alternatively, or in addition, one or more of the virtual machines 208A-N may provide one or more server-side applications. Accordingly, a single host 200 can replace any number of individual software or application servers, each operating in a separate, virtual computing environment.

Figure 2:
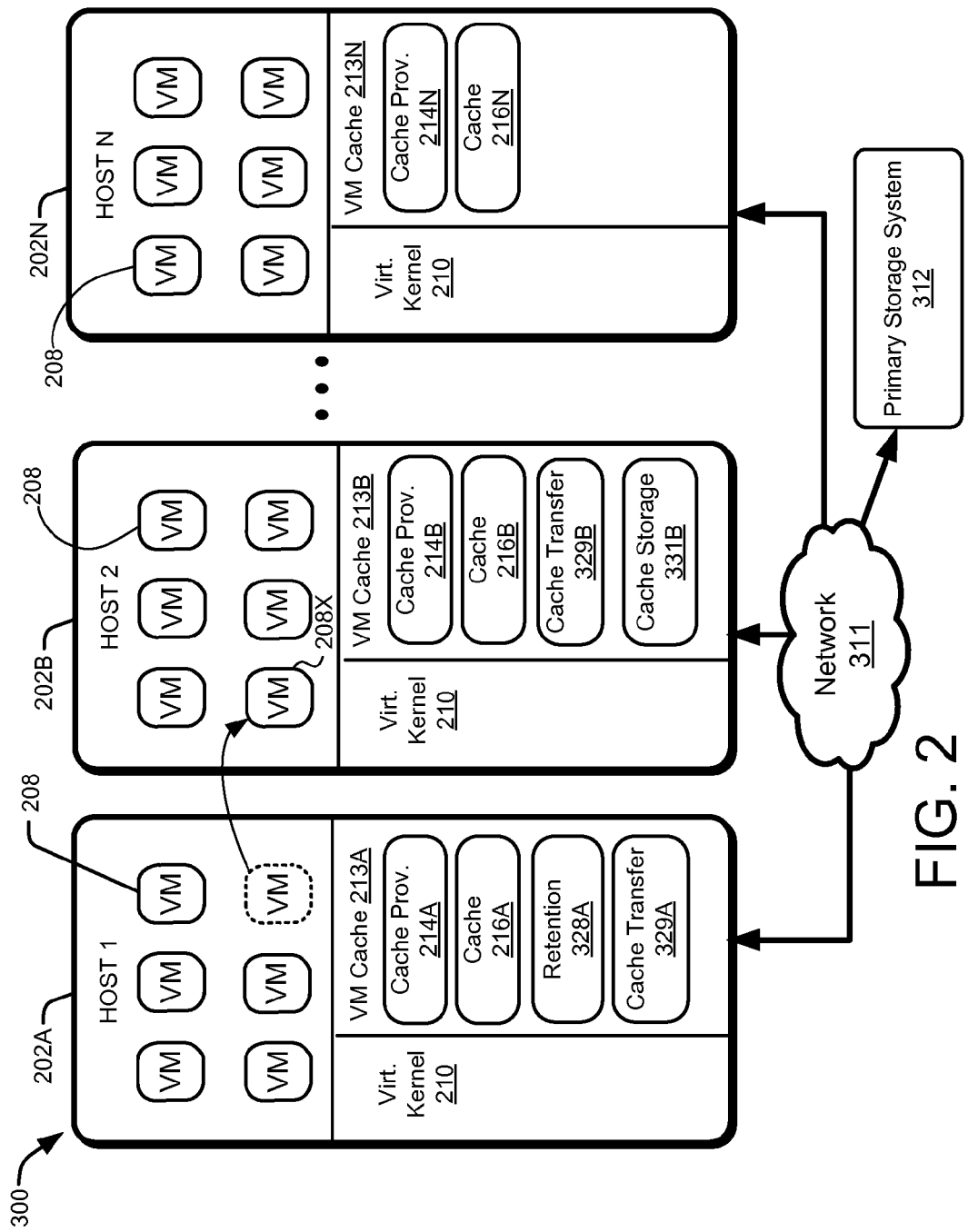
FIG. 2 is a block diagram of another embodiment of a virtualized environment.

FIG. 2 is a block diagram of another embodiment of a virtualized environment 300. The virtualized environment includes multiple hosts 202A-N, each of which comprises a virtualization kernel 210 and one or more virtual machines 208. Although not shown in FIG. 2, each virtual machine 208 may comprise an I/O 218 driver and/or a cache management system 220 (and cache tags 221), as described above. Each host 202A-N may further comprise a virtual machine cache 213, comprising a cache provisioner module 214 and cache 216. Although FIG. 2 depicts three host systems 202A-N, the disclosure is not limited in this regard and could include any number of hosts 202A-N.

The system 300 may further comprise a primary storage system 312, which may be shared among the hosts 202A-N and/or the virtual machines 208. The primary storage system 312 may comprise any suitable persistent storage device and/or storage system, including, but not limited to: one or more magnetic disks (e.g., hard drives), a redundant array of inexpensive disks (RAID), storage area network (SAN), or the like. The hosts 202A-N may be configured to access the primary storage system via the network 311.

In some embodiments, each virtual machine 208 may be assigned a respective VMID. The VMID may be assigned when the virtual machine 208 is instantiated (e.g., loaded) on a host 202A-N (e.g., during a handshake protocol, described above). The VMID may comprise a process identifier, thread identifier, or any other suitable identifier. In some embodiments, the VMID may uniquely identify the virtual machine 208 on a particular host 202A-N and/or within a within a group of hosts 202A-N. For example, the hosts 202A-N may operate within the same namespace, such as a cluster, and the VMID of each virtual machine 208 may be unique within the namespace of the cluster (unique across the virtual machines 208 deployed on hosts 202A-N in the cluster). In some embodiments, the VMID may comprise a host identifier, such as a Media Access Control ("MAC") address, network address, distinguished name, or the like. Accordingly, in some embodiments, a VMID may uniquely identify a virtual machine 208 in a particular namespace, and may identify the host 208A-N upon which the virtual machine 208 is current deployed (or was previously deployed). Alternatively, or in addition, each virtual machine 208 may be configured to maintain a current host identifier and a previous host identifier.

In some embodiments, one or more of the virtual machines 208 may be capable of being relocated and/or transferred between the hosts 202A-N. For example, a virtual machine 208X may be transferred from the host 202A to the host 202B (e.g., in a VMotion™ or similar operation). The virtual machine cache 213B may be configured to identify the transfer in response to receiving a request from the cache management system 220 of the transferred virtual machine 208X (via the I/O driver 218, as described above). The request may comprise the VMID of the transferred virtual machine 208X, from which the virtual machine cache 213B may determine that the virtual machine 208X is "new" to the host 208B (e.g., requests comprising the VMID have not been received before). In response, the virtual machine cache 213B may initiate a handshake protocol with the virtual machine 208X, as described above. The virtual machine cache 213B may determine that the virtual machine 208X was transferred to the host 208B based, at least in part, on a host identifier of the VMID, and/or host identifier(s) maintained by the virtual machine 208X. The host identifier of the virtual machine 208X may reference the host 202A, whereas the host identifier of a newly powered-on virtual machine 208 may reference the host 202B (or be blank). Alternatively, or in addition, the virtual machine 208X may comprise a separate host identifier, which may reference host 202A, and may be accessed in the handshake protocol with the virtual machine cache 213B.

The cache provisioner module 214 may be configured to allocate storage for the virtual machine 208X in the cache 216B, as described below. The cache provisioner module 214 may be configured to determine how much cache storage to provision based, at least in part, upon the size of the cache storage allocated to the virtual machine 208X on the previous host (host 202A). As discussed above, the cache management system 220 of the virtual machine 208X may be configured to retain the working set of the cache (e.g., retain the cache tags 221) after the transfer to host 202B. The cache provisioner module 214B may attempt to allocate sufficient cache storage in the cache 216B to support the retained cache tags 221. If sufficient cache storage cannot be allocated, the cache management system 220 may be configured to selectively remove the retained cache tags in accordance with the new cache storage allocation on host 202B. Alternatively, if excess cache storage is available, the cache management system 202 may be configured to add new tags to the retained cache tags 221.

The virtual machine cache 213A may comprise a retention module 328A, which may be configured to retain cache data of the virtual machine 208X after the virtual machine 208X is transferred from the host 202A. The cache data may be retained for a retention period and/or until the virtual machine cache 213A determines that the retained cache data is no longer needed. The retention module 328A may determine whether to retain the cache data (and/or determine the cache data retention period) based upon various retention policy considerations, including, but not limited to: availability of cache 216A, availability of cache 216B, relative importance of the retained cache data (as compared to cache requirements of other virtual machines 208), whether the cache data is backed up in the primary storage system 312, and so on.

The cache management system 220 of the virtual machine 208X may be configured to retain the working state of the cache (the cache tags 221) despite the fact that the cache 216B does not comprise the cache data to which the cache tags 221 refer. As discussed below, the virtual machine cache 213B may be configured to populate the cache 216B with cache data transferred from the cache 216A of host 202A and/or the primary storage system 312, to reconstruct the working set of the transferred virtual machine 208X.

The virtual machine cache 213B may comprise a cache transfer module 329B which may be configured to access cache data of the virtual machine 208X stored at the previous host 202A. The cache transfer module 329B may be configured to identify the previous host 202A by use of the VMID and/or by interrogating the virtual machine 208X (e.g., accessing a previous host identifier maintained by the virtual machine 208X). The cache transfer module 329B may use the host identifier to issue one or more requests for the cache data to the virtual machine cache 213 of the host 202A via the network 311. In some embodiments, the cache transfer module 329B is configured to determine and/or derive a network address or network identifier of the host 202A from the host identifier.

The virtual machine cache 213A may comprise a cache transfer module 329A that is configured to selectively provide access to retained cache data of the transferred virtual machine 208X. In some embodiments, the cache transfer module 329A is configured to secure the retained cache data. For example, the cache transfer module 329A may be configured to verify that the requesting entity (e.g., the virtual machine cache 213B) is authorized to access the cache data of the transferred virtual machine 208X, which may comprise verifying that the virtual machine 208X is deployed on the host 202B. For example, the cache transfer module 329A may request a credential associated with the transferred virtual machine 208X, such as the VMID, or the like. Alternatively, or in addition, the cache transfer module 329A may implement a cryptographic verification, which may comprise verifying a signature generated by the transferred virtual machine 208X, or the like.

The cache transfer module 329B may be configured to transfer the cache data by one or more: demand paging transfers, prefetch transfers, and/or bulk transfers. A demand paging transfer may comprise transferring cache data in response to requests for the cache data from the virtual machine 208X (e.g., on demand). The transferred data may be used to service the I/O request. In addition, the transferred data may be admitted into the cache 216B of the new host 202B. Alternatively, the transferred data may be admitted at a later time (not not at all), in accordance with a cache policy. A prefetch transfer may comprise transferring data according to a prefetch cache policy (e.g., by proximity, or the like). The amount and/or extent of cache data to prefetch may be determined by, inter alia, cache metadata of the virtual machine cache management system 220 (e.g., cache aging metadata, "hotness," and so on). Accordingly, in some embodiments, the cache transfer module 329B may be configured to query the cache management system 220 to identify the cache data to prefetch (if any). A bulk transfer may comprise transferring cache data in bulk, independent of storage requests from the virtual machine 208X. A bulk transfer may comprise transferring populating the entire cache storage allocated to the virtual machine 208X. Alternatively, a bulk transfer may comprise populating a subset of the cache, which, as discussed above, may be selected based upon cache metadata of the virtual machine cache management system 220.

The cache storage module 331B may be configured to store cache data transferred from the cache 216A of the host 202A (or acquired from other sources, such as the primary storage system 312) in the cache 216B. The cache storage module 331B may be configured to store the cache data at cache storage locations that have been allocated to the transferred virtual machine 208X by the cache provisioning module 214B. The cache data may be stored at the same cache storage location (e.g., same offset with the cache storage) as in the original cache 216A, such that the references in the retained cache tags 221 remain valid. Additional details regarding various embodiments of transferable cache tag mappings are provided below in conjunction with FIG. 16.

The cache transfer module 329A is configured to identify the requested cache data in the cache 216A using, inter alia, the VMID of the transferred virtual machine 208X. The cache transfer module 329A may then transfer the requested cache data (if available) to the cache transfer module 329B via the network 311.

The cache transfer module 329B may be configured to access cache data from either the previous host 202A, the primary storage system 312, and/or other sources of the data (e.g., other persistent storage systems, hosts 202N, or the like). The cache transfer module 329B may select the source of the cache data based upon various policy considerations (e.g., a cache transfer policy), which may include a network policy, a bandwidth policy, a host resource policy, a primary storage resource policy, and the like. For example, in response to determining that the network 311 is highly congested, the cache transfer module 329B may be configured to reduce the amount data to transfer (defer a bulk transfer) and/or transfer the cache data from another source that is independent of the network 311. Similarly, the cache transfer module 329B may direct requests to the host 202 (as opposed to the primary storage system 312) in response to determining that the primary storage system 312 is heavily loaded and/or has limited available bandwidth.

The cache data retained on the host 202A may represent cache resources that cannot be used by the other virtual machines 208 operating on the host 202A. As such, the cache retention module 328A may be configured to selectively remove the retained cache data when the data is no longer needed and/or according to a retention policy. The retention policy may be determined based upon the retention policy factors, described above. In some embodiments, the cache transfer module 329B is configured to inform the previous host 202A of cache data that has been transferred to the host 202B from other sources so that the retention module 328A can remove the corresponding data from the cache 216A. The cache transfer module 329B may be further configured to inform the host 202A of other conditions in which the cache data no longer needs to be retained, such as when the cache data is overwritten, deleted (e.g., trimmed), evicted from the cache 216B, or the like.

In some embodiments, the cache transfer module 329A may be configured to "push" cache data of the virtual machine 208X to the new host 202B. Pushing cache data may comprise transferring retained cache data of the virtual machine 208X to the cache transfer module 329B without receiving a request for the cache data (independent of requests for the cache data). The cache transfer module 329A may determine the host identifier of the new host 202B through user configuration, the verification process, described above, through active polling by the cache transfer module 329A, through a call-back implemented by the transferred virtual machine 208X, or the like. In some embodiments, the virtual machine cache 213 of the new host 202B may identify that the virtual machine 208X was transferred from the host 202A in response to receiving cache data pushed from the host 202A, as described above.

Figure 3:
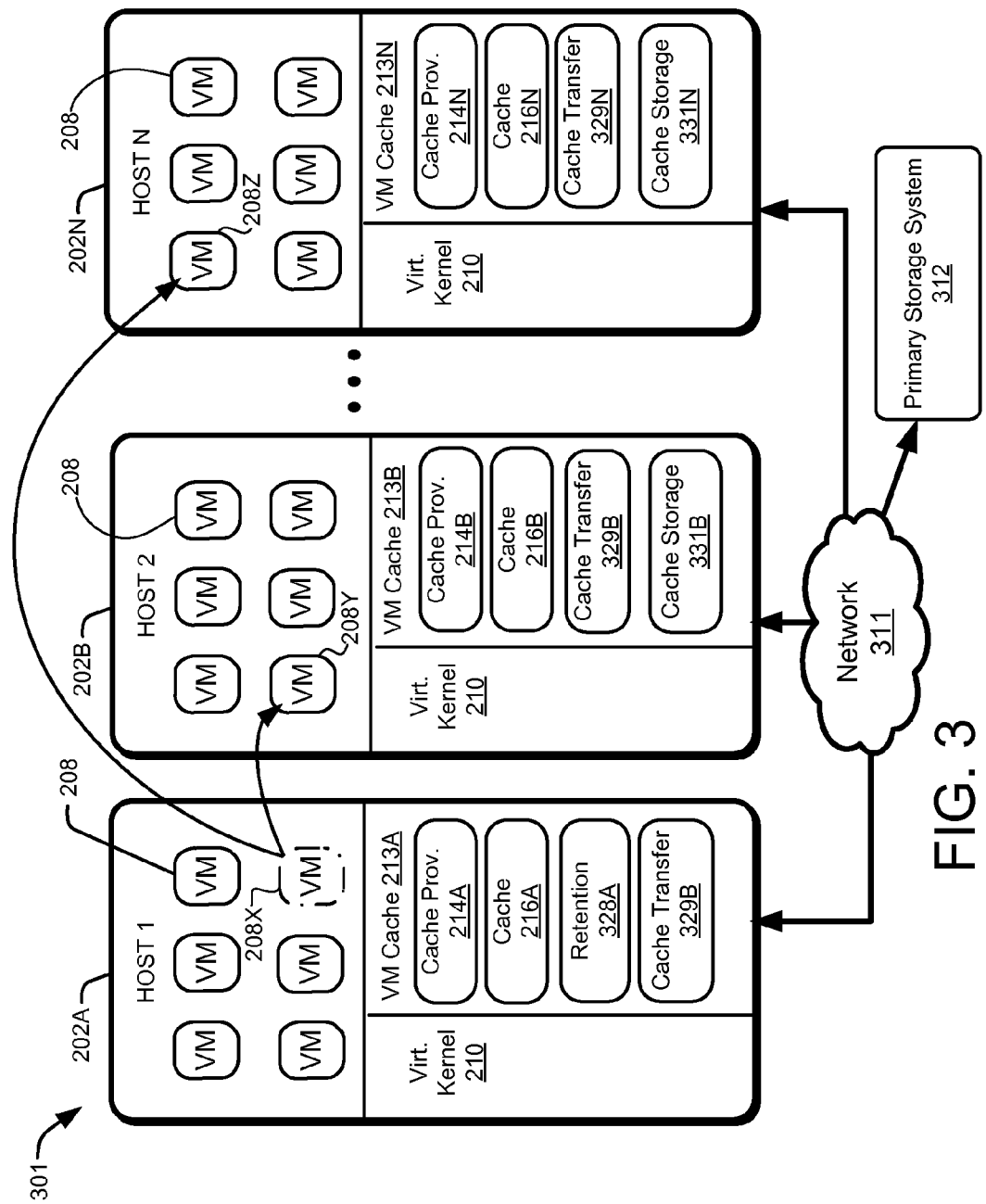
FIG. 3 is a block diagram of another embodiment virtualized environment containing multiple hosts and shared data storage systems.

FIG. 3 is a block diagram depicting another embodiment of a virtualized environment 301. Like FIG. 2, described above, the virtualized environment 301 comprises a plurality of hosts 202A-N, each of which may comprise a virtualization kernel 210 and one or more virtual machines 208. Each host 202A-N may further comprise a respective virtual machine cache 213A-N that is configured to cache data for the virtual machines in a cache 216A-N.

As discussed above, a virtual machine 208X may be transferred between hosts 202A-N (e.g., from host 202A to host 202B, as described above). Alternatively, or in addition, the virtual machine 208X may be transferred to more than one host 202B-N in an "1:N" transfer. As shown in FIG. 3, the virtual machine 208X may be transferred from host 202A to both hosts 202B and 202N. As such, each host 202B and 202N may comprise a respective instantiation of the virtual machine 208X (labeled as 208Y and 208Z, respectively). In response the transfer, the virtual machine cache 213B and 213N may identify the transferred virtual machines 208Y and 208Z, provision cache storage for the transferred virtual machines 208Y and 208Z, and may populate the cache storage allocated thereto the cache 216B and 216N, as described above. The virtual machine cache 213N may comprise a cache transfer module 329N and a cache storage module 331N, that are configured to transfer cache data from the host 202A (and/or primary storage system 212) and store the transferred the transferred data in the cache 216N. The retention module 328A may be configured to retain the cache data of the virtual machine 208A until the data is transferred to both caches 216B and 216N. Alternatively, the retention module 328A may be configured to retain the cache data until the cache data is transferred to either one of the caches 216B or 216N. Subsequent requests for the cache data may result in a miss, may be directed to primary storage 212, or one of the caches 216B and/or 216N.

In another example, the transfer may comprise retaining the virtual machine 208X on the host 202A (e.g., creating "clones" of the virtual machine 208X on the other hosts 208B and 208N). In a "cloning" example, the retention module 328A may be configured to retain a copy of the cache data of the virtual machine 208X (as of the time the virtual machine 208X was "transferred" to the other hosts 202B and 202N), from which the cache transfer modules 329B and 329N may transfer cache data. Alternatively, the retention module 328A may not copy the cache data of virtual machine 208X, and the cache transfer module 329A may provide access to the "working" cache data, as described above. In some embodiments, the cache of virtual machine 208X may be "locked" (e.g., treated as static and/or read only) until the cache data has been transferred to the other hosts 208B and 208N, and/or the cache transfer modules 208B and/or 208N have obtained the cache data from one or more other sources.

Figure 4:
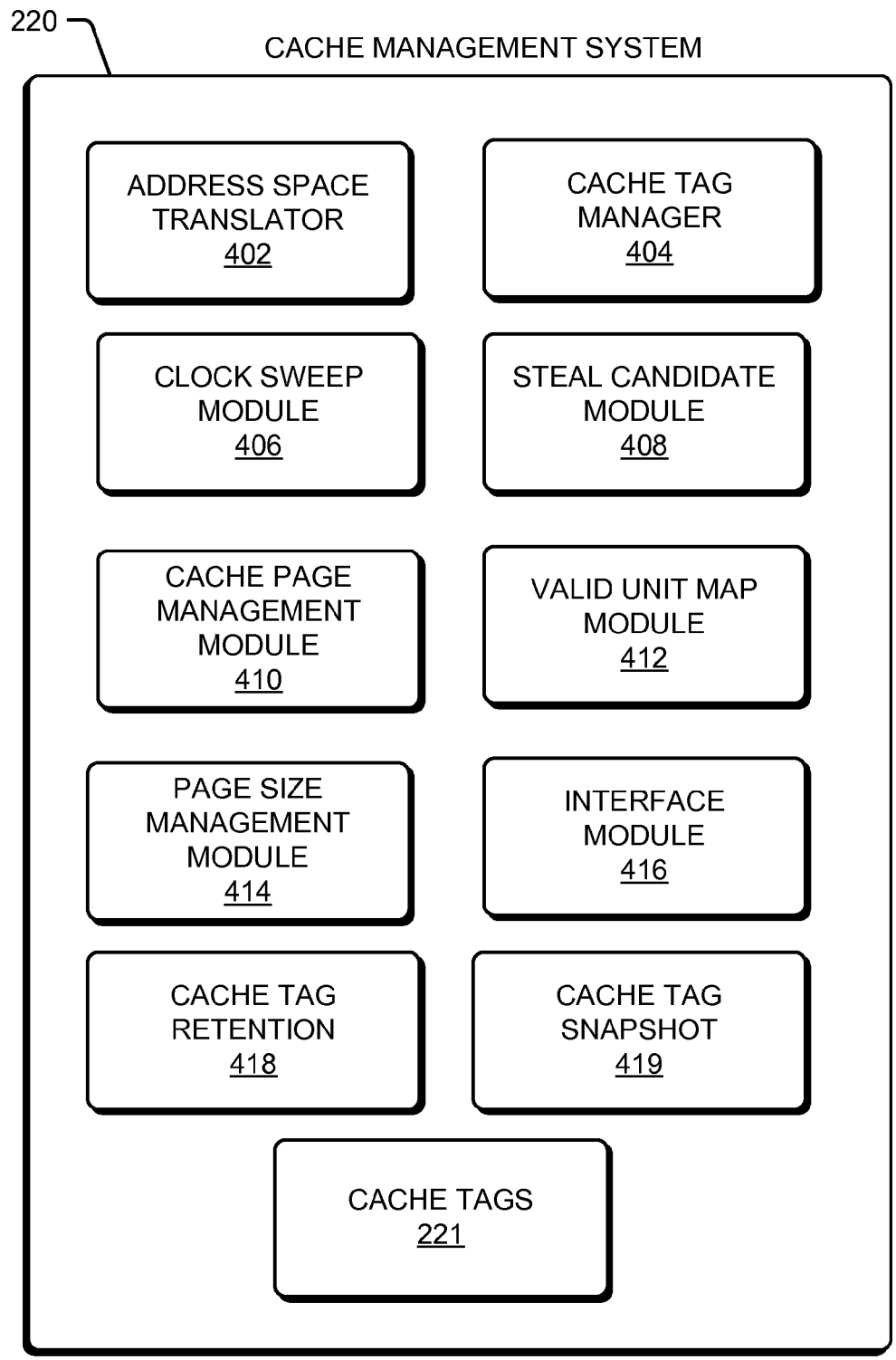
FIG. 4 is a block diagram illustrating example components of a cache management system.

FIG. 4 is a block diagram depicting one embodiment of a cache management system 220. The cache management system 220 may comprise one or more modules, including an address space translator 402, a cache tag manager 404, a clock sweep module 406, a steal candidate module 408, a cache page management module 410, a valid unit map module 412, a page size management module 414, an interface module 416, a cache tag retention module 418, and a cache tag snapshot module 419.

The address space translator 402 may be configured to correlate logical identifiers (e.g., addresses in a primary storage system) with cache storage locations (e.g., cache addresses, cache pages, etc.).

The cache tag manager 404 may be configured to manage the cache tags allocated with the cache management system 220, as described herein, which may comprise maintaining associations between virtual machine identifiers (e.g., logical identifiers, address, etc.) and data in the cache 216.

The clock sweep module 406 may be configured to determine and/or maintain cache aging metadata using, inter alia, one or more clock hand sweep timers as discussed herein. The steal candidate module 408 may be configured to identify cache data and/or cache tags that are candidates for eviction based upon, inter alia, clock sweep metadata, or other cache policy.

The cache page management module 410 may be configured to manage cache resources (e.g., cache page data) and related operations. The valid unit map module 412 may be configured to identify valid data stored in a cache and/or a primary storage system. The page size management module 414 may be configured to perform various page size analysis and adjustment operations to enhance cache performance, as described herein. The interface module 416 may be configured to provide one or more interfaces to allow other components, devices, and/or systems to interact with the cache management system 220.

The cache tag retention module 418 may be configured to retain cache tags 221 in response to transferring the cache management system 220 to a different host. As described above, the cache tags 221 may represent a "working set" of the cache, which may be developed through the use of one or more cache admission and/or eviction policies (e.g., the clock sweep module 406 and/or steal candidate module 408), and in response to the I/O characteristics of the virtual machine 208 (and/or the applications running on the virtual machine 208). The cache tag retention module 418 may be configured to retain the cache tags 221 after the virtual machine 208 is transferred to a new host 202 (e.g., transferred from host 202A to host 202B in, inter alia, a VMotion™ operation) despite the fact that the underlying cache data to which the cache tags refer may not be available on the cache storage device of the new host. The virtual machine cache 213 described herein, however, may be configured to populate the cache 216 at the new host, such that the cache management system 220 can continue to use the working set of cache tags 221.

As described above, data of the retained cache tags 221 may be transferred to the new host from the previous host (and/or from the primary storage system 312, or other source). The cache data may be transferred via a demand paging model, which may comprise populating the cache "on demand," as the cache data of various retained cache tags 221 is requested by the virtual machine 208. Alternatively, or in addition, cache data may be prefetched and/or transferred in a "bulk transfer" operation, which may comprise transferring cache data independent of requests for the cache tag data. In some embodiments, data may be selectively prefetched based upon a cache transfer policy, which may be based, at least in part, on the cache aging metadata of the clock sweep module 406 and/or steal candidate module 408 and/or other cache policy metadata (e.g., hotness, coldness, least recently used, etc.).

The cache tag snapshot module 419 may be configured to maintain one or more "snapshots" of the working set of the cache (e.g., the cache tags 221). As described above, a snapshot refers to a set of cache tags 221 at a particular time. The snapshot module 419 may be configured to store a snapshot of the cache tags 221 on a persistent storage medium and/or load a stored snapshot, as described above.

Figure 5:
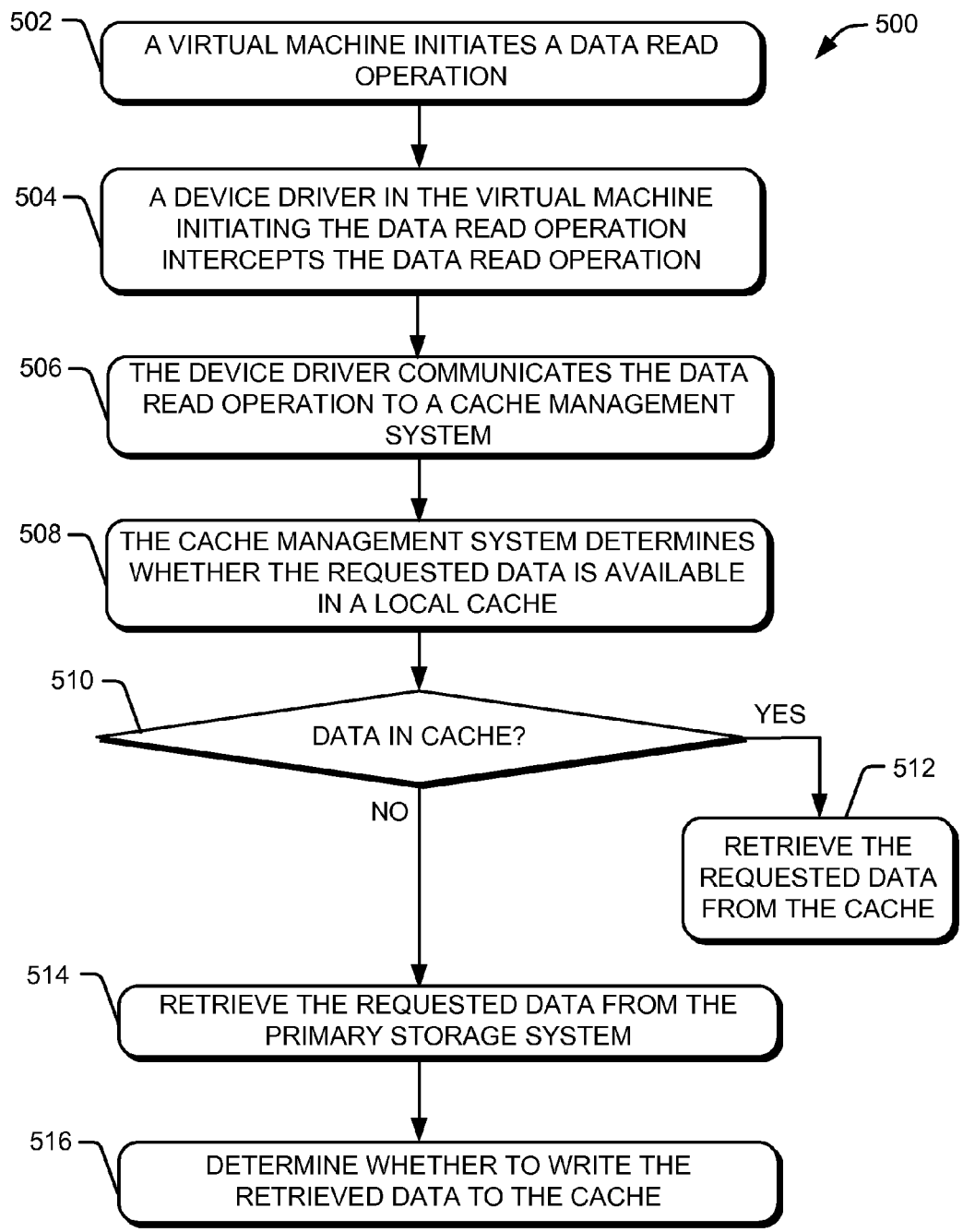
FIG. 5 is a flow diagram illustrating an embodiment of a procedure for implementing a data read operation.

FIG. 5 is a flow diagram of one embodiment of a method or procedure 500 for caching data. Step 502 may comprise initiating a data read operation within a virtual machine. Step 504 may comprise intercepting the read operation at an I/O driver 218, as described above. Step 506 may comprise communicating the intercepted data read operation to a cache management system 220.

At 508, the cache management system 220 may determine whether the requested data is available in the cache 216. Step 508 may comprise determining whether the cache management system 220 comprises a cache tag 221 corresponding to the read request (e.g., whether the cache management system 220 comprises a cache tag 221 having an identifier corresponding to an identifier of the read request). If the data is determined to be in the cache 216 (block 510), the procedure branches to block 512, where the request is forwarded to the cache management system 213 and the requested data is retrieved from the cache 216. If the data is not available in the cache 216, the procedure branches to block 514, where the requested data is retrieved from a primary storage system 312, discussed above. After retrieving the requested data, the procedure 500 determines whether to write the retrieved data to the cache 216 (block 516) to improve the storage I/O performance of the virtual machine 208. This determination is based on various cache policies and other factors.

The cache management system 220 may develop and/or maintain a working set for the cache using inter alia a file system model. As described above, the working set of the cache may be embodied as the set of cache tags 221 maintained by the cache management system 220. The cache 216 may comprise one or more solid-state storage devices, which may provide fast read operations, but relatively slow write and/or erase operations. These slow write operations can result in significant delay when initially developing the working set for the cache. Additionally, the solid-state storage devices comprising the cache 216 may have a limited lifetime (a limited number of write/erase cycles). After reaching the "write lifetime" of a solid-state storage device, portions of the device become unusable. These characteristics may be taken into consideration by the cache management system 220 in managing the cache 216.

Figure 6:
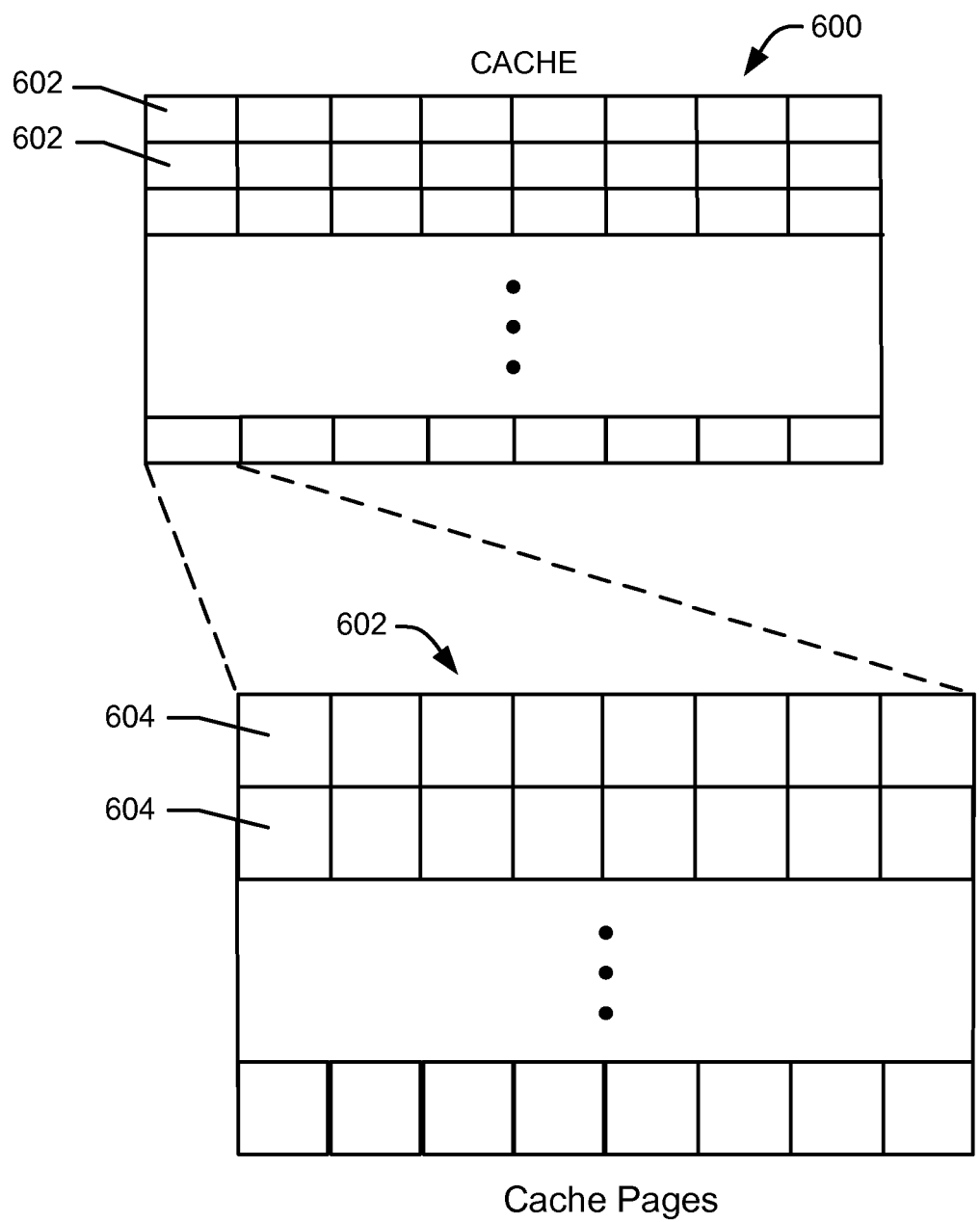
FIG. 6 illustrates an example structure of a data cache and associated cache pages contained in the data cache.

FIG. 6 illustrates one embodiment of a cache 600, comprising a plurality of cache pages 604. The cache 600 may be broken in to multiple chunks 602. As used herein a "chunk" refers to an arbitrarily sized portion of cache storage capacity. The cache 600 may be divided into any number of chunks 602 having any size. In a particular embodiment, each chunk 602 may comprise 256 MB (megabytes) of storage capacity. In this embodiment, the number of chunks 602 may be determined by the available storage capacity of the cache 600. For example, a 1 TB (terabyte) cache 600 divided into 256 MB chunks 602 contains 4192 chunks. As shown in FIG. 6, each chunk 602 is divided into multiple cache pages 604.

The cache 600 may be shared between a plurality of virtual machines on a host. A cache chunk 602 may be assigned or allocated to a particular one of the virtual machines based upon, inter alia, the cache needs of the virtual machine and/or the cache needs of other virtual machines. The number of chunks 602 assigned to a particular virtual machine can change over time as the cache needs of the virtual machine(s) change. The number of chunks 602 assigned to a specific virtual machine may determine the cache capacity of that virtual machine. For example, if two 256 MB chunks are assigned to a specific virtual machine, that virtual machine's cache capacity is 512 MB. The assignment of chunks 602 to particular virtual machines is handled by the cache provisioner, such as the cache provisioner 214 described above.

Cache tags 221 are used in mapping storage I/O addresses in a virtual machine to cache pages 604 (e.g., physical addresses) in the cache 600. The cache tags 221 can cache data associated with any storage device assigned to a virtual machine. The cache tags 221 may, therefore, be used to perform translations between identifiers in the cache tags 221 (e.g., address of blocks on a primary storage system 212) and a cache address. In some embodiments, cache tags 221 may be organized linearly in RAM or other memory. This allows the address of the cache tag 221 to be used to locate a physical cache page 604 because of the algorithmic assumption that each cache tag has a linear 1:1 correspondence with a physical cache page 604. Alternatively, or in addition, cache tags 221 may be organized into another data structure, such as a hashtable, tree, or the like.

As shown in FIG. 2, cache tags 221 associated with a particular virtual machine 208A-N are stored within that virtual machine 208A-N. The cache tags 221 contain metadata that associates storage I/O addresses to specific cache pages 604 in the cache. In a particular embodiment, each cache tag 221 is associated with a particular page 604 in the cache.

Referring back to FIG. 6, in some embodiments, a "thin provisioning" approach is used when allocating cache chunks 602 to the virtual machines 208. In this embodiment, each virtual machine 208 is allocated a particular number of cache chunks 602. However, the entire cache capacity is "published" to each of the virtual machines 208. For example, if the total cache size is 1 TB, each virtual machine 208 reports that it has access to the entire 1 TB of storage space 600. However, the actual allocation of cache chunks 602 may be considerably smaller (e.g., 256 MB or 512 MB), based on the current needs of the virtual machine 208. The allocated cache chunks 602 represent a specific range of cache addresses available within the cache 600. The cache provisioner module 214 dynamically changes these cache chunk allocations as each virtual machine's working set requirements change (and/or virtual machines 208 are transferred to/from the host 202). Regardless of the number of cache chunks 602 actually allocated to a particular virtual machine 208, that virtual machine 208 reports that it has access to the entire 1 TB cache. Accordingly, the guest OS of the virtual machine 208 may operate with a virtual disk of size 1 TB. By using a "thin provisioning" approach, the actual storage space allocated to the virtual machine 208 can be changed dynamically without the guest operating system indicating an error condition.

Figure 7:
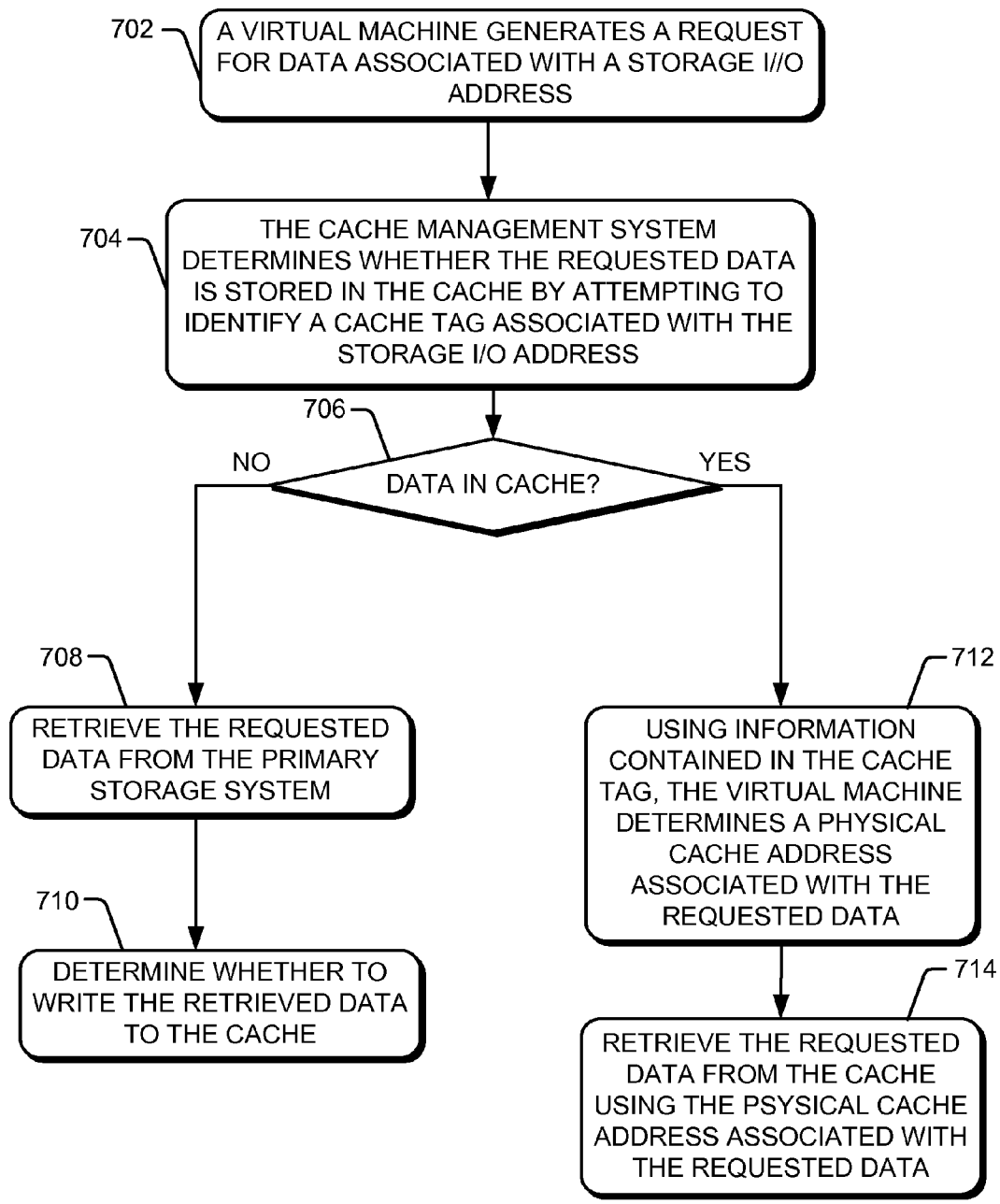
FIG. 7 is a flow diagram illustrating an embodiment of a procedure for implementing a virtual machine read operation using cache tags.

FIG. 7 is a flow diagram illustrating an embodiment of a procedure 700 for implementing a virtual machine read operation using cache tags 221. Initially, a virtual machine 208 generates a request for data associated with a storage I/O address (block 702). The cache management system 220 determines whether the requested data is stored in the cache 216 by attempting to identify a cache tag 221 associated with the storage I/O address (block 704). If the requested data is not in the cache (block 706), the requested data is retrieved from the primary storage system (block 708). After retrieving the requested data from the primary storage system, the procedure determines whether to write the retrieved data to the cache (block 710) to improve storage I/O performance of the virtual machine 208. This determination is based on various cache policies and other factors.

If the decision is to write the retrieved data to the cache 216, the cache management system 220 uses the memory address of the cache tag 221 to determine a physical cache address associated with the data to be written. The data is then written to the cache 216 using the physical cache address associated with the data.

If the requested data is in the cache (block 706), the cache management system uses the memory address of the cache tag 221 to determine a physical cache address associated with the requested data (block 712). The requested data is then retrieved from the cache 216 using the physical cache address associated with the requested data (block 714).

Storing the cache tags 221 (and other cache metadata) within the associated virtual machine 208 allows the virtual machine 208 to easily determine where the data is stored physically in the cache 216 without having to access a different system or process. Instead, the systems and methods described herein allow each virtual machine 208 to quickly access cache tags 221, which increases the speed and efficiency of the I/O operations. Additionally, the virtual machine 208 typically understands the data it is processing better than other systems. For example, the virtual machine 208 understands the nature and context of the data it is processing. This understanding of the data enhances the development and management of an effective working set of cache tags 221. Other systems that are external to the virtual machine 208 may simply see the data as raw data without any context or other understanding. Thus, having the cache tags 221 stored locally in the virtual machine 208 enhances the operation of the virtual machine 208 and the I/O operations.

Figure 8:
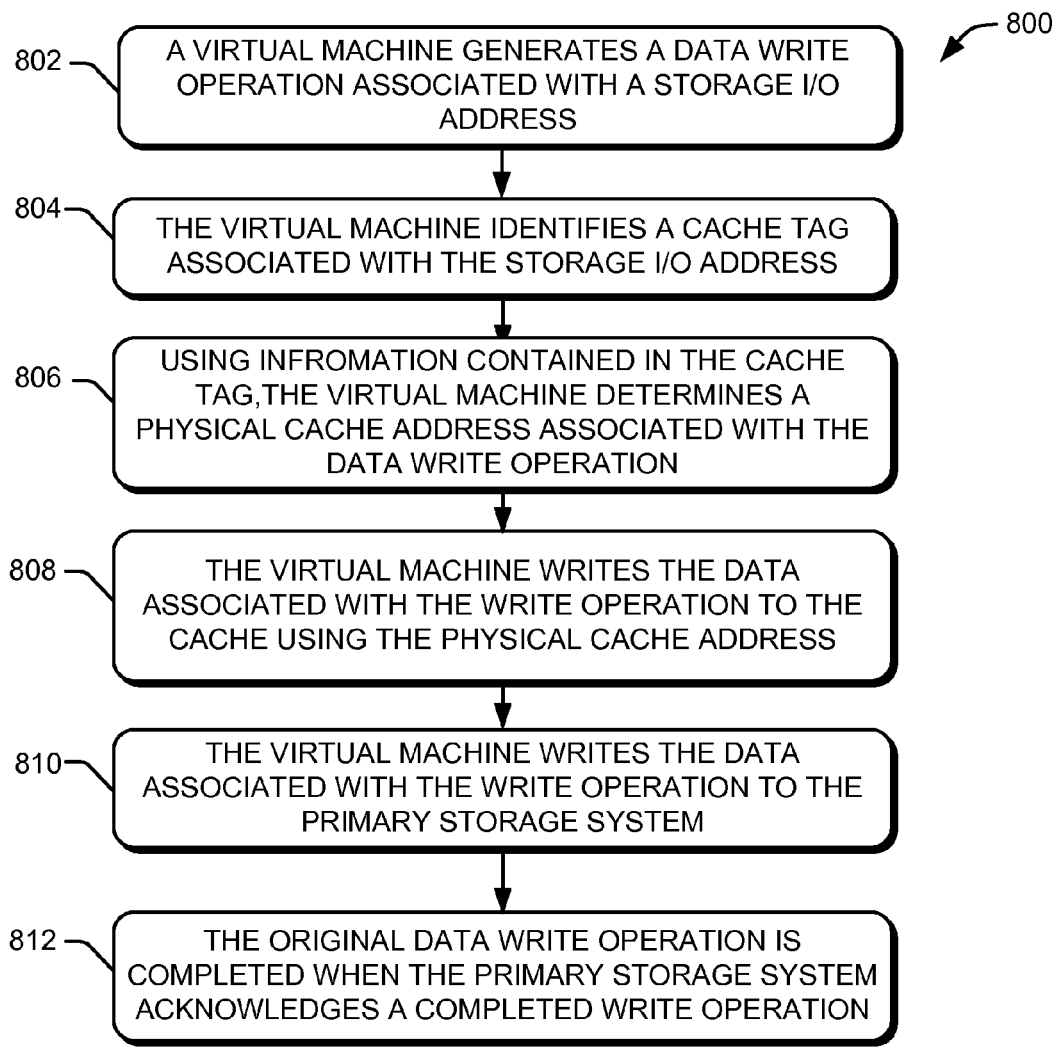
FIG. 8 is a flow diagram illustrating an embodiment of a procedure for implementing a data write operation.

FIG. 8 is a flow diagram illustrating an embodiment of a procedure 800 for implementing a data write operation. Initially, a virtual machine generates a data write operation associated with a storage I/O address (block 802). As discussed herein, the storage I/O address is translated to a physical address in the cache device using the cache tags 221 stored within the cache management system 220 of the virtual machine 208. The cache management system 220 identifies a cache tag 221 associated with the storage I/O address (block 804). Using the information contained in the cache tag 221, the cache management system 220 determines a physical cache address associated with the data write operation (block 806).

Next, the virtual machine 208 writes the data associated with the data write operation to the cache 216 using the physical cache address (block 808). The virtual machine 208 also simultaneously writes the data associated with the data write operation to the primary storage system (block 810) in a "write-through" operation. The original data write operation is completed when the primary storage system acknowledges a completed write operation (block 812).

In a particular implementation, the cache discussed herein is a write-through cache. This type of cache writes data to both primary storage and the cache 216. A write completion is acknowledged after the write operation to the primary storage system is completed, regardless of whether a corresponding write operation to the cache 216 has completed. In specific embodiments, cache write operations can be queued and completed as the cache speed allows. Thus, a cache 216 with a slow write speed (or a queue of pending write operations) does not degrade performance of the overall system. Cache tags 221 associated with incomplete or queued write operations are identified as "pending." After the write operation completes, the associated cache tag is identified as "valid". When the cache tag 221 is identified as "pending," any attempted read of the data associated with the cache tag 221 results in a cache miss, causing retrieval of the requested data from the pending memory buffer associated with the I/O, or from the primary storage system.

As mentioned above, each cache tag 221 stored in a virtual machine 208 is associated with a particular cache page 604. Additionally, the systems and methods described herein are capable of dynamically allocating cache resources (e.g., cache chunks 602) to the virtual machines 208 in a virtualized environment. Therefore, the number of cache tags 221 associated with a particular virtual machine 208 can be increased beyond the number of cache pages 604 actually associated with the virtual machine 608. In certain embodiments, a user changes the configuration of the cache management system 220 and cache allocations by increasing the number of cache tags 221 allocated such that a determination can be made whether a given number of cache tags 221 will provide for efficient use of the cache by a particular virtual machine 208. This increase in cache tags 221 allows the cache management system 220 to determine whether increasing the number of cache pages 604 allocated to the particular virtual machine 208 will likely improve the cache hit rate for that virtual machine 208.

Figure 9:
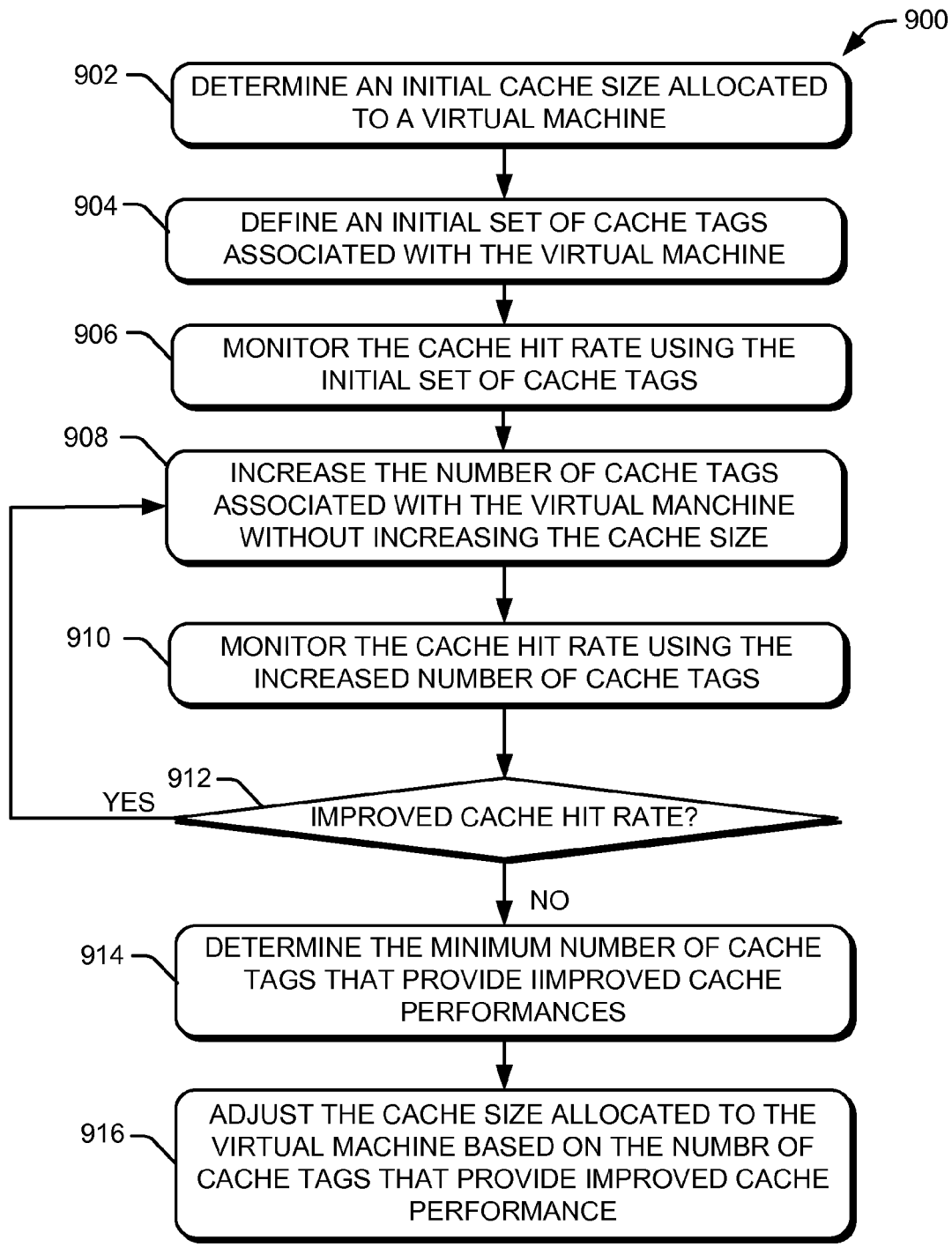
FIG. 9 is a flow diagram illustrating an embodiment of a procedure for allocating cache resources to a virtual machine.

FIG. 9 is a flow diagram illustrating an embodiment of a procedure 900 for allocating cache storage resources to a virtual machine 208. In a particular embodiment, procedure 900 is performed as part of a "profiler" process that analyzes data associated with a particular system. Initially, the procedure determines an initial cache size allocated to a virtual machine 208 (block 902). The procedure then defines an initial set of cache tags 221 associated with the virtual machine (block 904). The number of cache tags 221 in this initial set corresponds to the initial cache size allocated to the virtual machine 208. The cache management system 220 monitors the cache hit rate using the initial set of cache tags 221 (block 906).

The procedure increases the number of cache tags 221 of the virtual machine 208 without increasing the cache size (block 908). For example, the procedure may increase the number of cache tags 221 by an amount that corresponds to assigning an additional cache chunk 602 to the virtual machine 208. However, the additional cache chunk 602 is not actually assigned to the virtual machine 208 at this point in the evaluation procedure. Next, the procedure 900 monitors the cache hit rate using the increased number of cache tags 221 (block 910). After monitoring the cache hit rate with the increased number of cache tags 221 for a period of time, the procedure determines whether the cache hit rate has improved (block 912). If the cache hit rate has improved as a result of the additional cache tags 221, the procedure returns to block 908 to further increase the number of cache tags 221 associated with the virtual machine 208.

The process of increasing the number of cache tags 221 and monitoring the results continues until the increase in cache tags 221 does not improve the cache hit rate. At this point, procedure 900 determines the minimum number of cache tags that provide improved cache performance (block 914). In an alternate embodiment, the procedure determines an optimal number of cache tags 221 that provide optimal cache performance. The procedure then adjusts the cache size allocated to the virtual machine 208 based on the number of cache tags 221 that provide improved cache hit rate performance (block 916). Dynamic addition of cache chunks 602 or capacity to a virtual machine 208 is based on both the hit rate and other policy that handles cache resource provisioning to other virtual machines 208. The hit rate, IOPS improvements, and cache capacity are also adjusted using policy that can be controlled by the user or implemented algorithmically based on rules specified by the user.

In a particular embodiment, the number of cache tags 221 added at block 908 is substantially the same as the number of the cache pages 604 in a particular cache chunk 602. Thus, allocating additional cache resources to the virtual machine is performed by allocating a number of cache chunks 602 that corresponds to the minimum number of cache tags 221 that provide improved cache performance.

Figure 10:
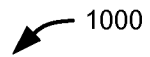
FIG. 10 illustrates example clock hand data values associated with a cache tag over time.

FIG. 10 illustrates example clock hand data values 1000 associated with a cache tag 221 over time. The clock hand data values utilize two bits of information for each clock hand. In the example of FIG. 10, which includes two clock hands, a total of four bits are used. Thus, the memory usage to store these bits of data is considerably less than other systems that use pointers and other data structures requiring significant amounts of storage space.

Each clock hand has a different time interval. In the example of FIG. 10, one clock hand has a time interval of ten minutes and the other clock hand has an interval of one hour. The time interval associated with each clock hand indicates the frequency with which the clock hand "sweeps" the clock hand data bits. For example, a clock hand with a time interval of ten minutes clears one of the two clock hand data bits every ten minutes. Each time a cache page 604 is accessed (a cache hit), all clock hand bits associated with the cache page 604 are reset to a value of "1".

As shown in FIG. 10, all clock hand bits are initially set to "1" (e.g., at time 00:00). After the first ten minute clock sweep, Bit 2 of clock hand 1 is cleared to "0". The clock hand bits associated with the one hour clock hand are unchanged because the one hour clock sweep has not yet occurred. In this example, the ten minute clock sweep occurs at time 00:08, which is less than ten minutes. This occurs because the initial time (00:00) is not necessarily aligned with a clock sweep time.

After a second ten minute clock sweep without any access of the cache page 604, the Bit 1 of clock hand 1 is cleared, leaving a clock hand value of "00". At this time, the cache page 604 associated with this example is identified as a "steal" candidate; i.e., the cache page 604 is a candidate for removal from the cache due to a lack of access of the cache page 604. A separate table or other listing is maintained for cache pages 604 in which both clock hands have been cleared. Cache pages 604 with both clock hands cleared are top candidates for "steal" prior to cache pages 604 with only one clock hand cleared.

As shown in FIG. 10, if a cache page data access occurs at time 00:22, all clock hand bits are set to "1". At time 00:31, the one hour clock hand sweeps, causing the clearing of Bit 2 of clock hand 2. That bit is set (along with setting all other clock hand bits) at time 01:04 due to a cache page data access. Although the particular example of FIG. 10 uses two clock hands with ten minute and one hour intervals, alternate embodiments may use any number of clock hands, each having any time interval.

Figures 11, 12:
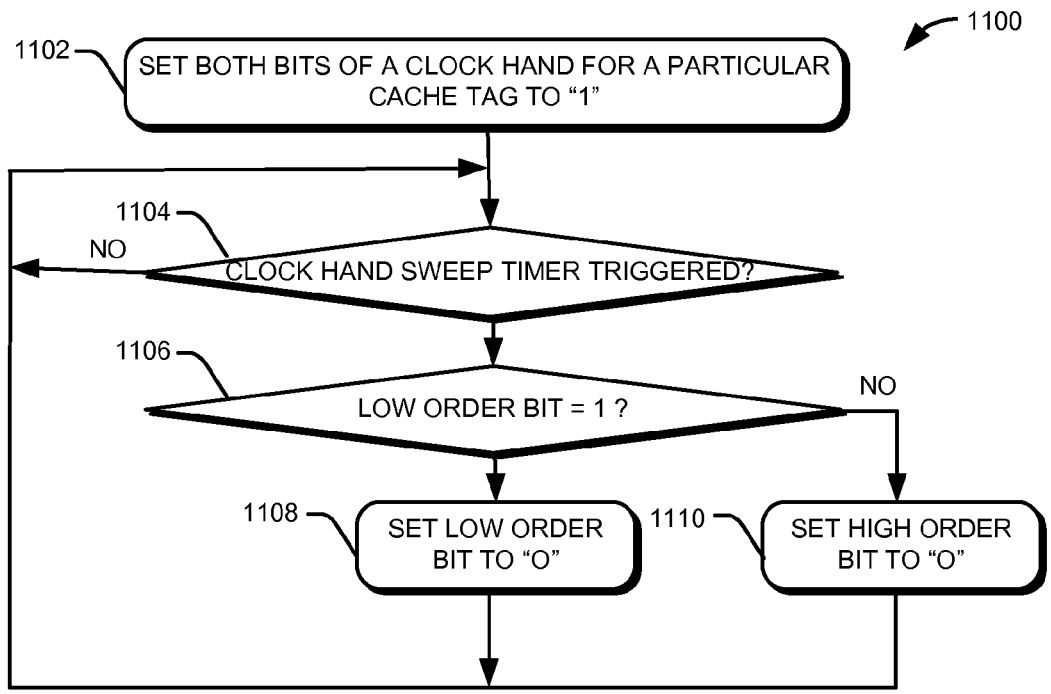
FIG. 11 is a flow diagram illustrating an embodiment of a procedure for managing clock hand data associated with a cache tag.
FIG. 12 illustrates one embodiment of a cache tag data structure.

FIG. 11 is a flow diagram illustrating an embodiment of a procedure 1100 for managing clock hand data associated with a cache tag. In a particular embodiment, procedure 1100 is performed by each virtual machine in a host. Initially, both bits of a clock hand for a particular cache tag are set to "1" (block 1102). The procedure continues by determining whether a clock hand sweep timer has triggered (block 1104). In a particular embodiment, a separate thread is dedicated to the clock hand sweep. That thread has an associated timer that triggers at each clock sweep interval. If a clock hand sweep timer triggers, the procedure determines whether a low order bit associated with the clock hand is "1" (block 1106). If so, the low order bit is set to "0" (block 1108). If, at block 1106, the low order bit was already set to "0", the procedure branches to block 1110, which sets the high order bit to "0". Procedure 1100 then returns to block 1104 to continue monitoring for the triggering of the clock hand sweep timer.

FIG. 12 illustrates one embodiment of a cache tag 221 data structure 1200. The size of several fields in the cache tag 221 are dynamic. Thus, the size of the cache tag data structure 1200 may be dynamic. As discussed above, a cache tag 221 provides a translation between an identifier (e.g., a storage I/O address) and a physical address in the cache (e.g., a cache page 604). The cache tag data structure 1200 shown in FIG. 12 includes a next cache tag index that is fixed in size which is used to link cache tags in the hash table. In operation, the next cache tag index is converted to a memory address to find the next cache tag linked to the current cache tag. A state field is fixed in size and identifies a current state of the cache tag 221. Example state transition diagrams are discussed below with respect to FIG. 13. The clock hands field is a dynamic field and indicates the number of clock hands (e.g., the number of time intervals) associated with the cache tag 221. The checksum field is a dynamic field that varies in size based on the size of the cache page 604 and the level of integrity desired by the user. A user can determine the strength of the checksum. For example, a user can obtain a higher level of integrity for the checksum by allocating more bits of memory to the checksum.

Finally, the cache tag data structure 1200 may include a valid unit map field, which is a dynamic field that identifies which units in a page are cached. An example of a unit within a cache page 604 is a sector. For example, a particular cache page 604 may have one or more sectors that are missing or no longer valid. The valid unit map identifies the status of all units associated with a particular cache page 604 to prevent accessing data in units that is not valid.

Figure 13:
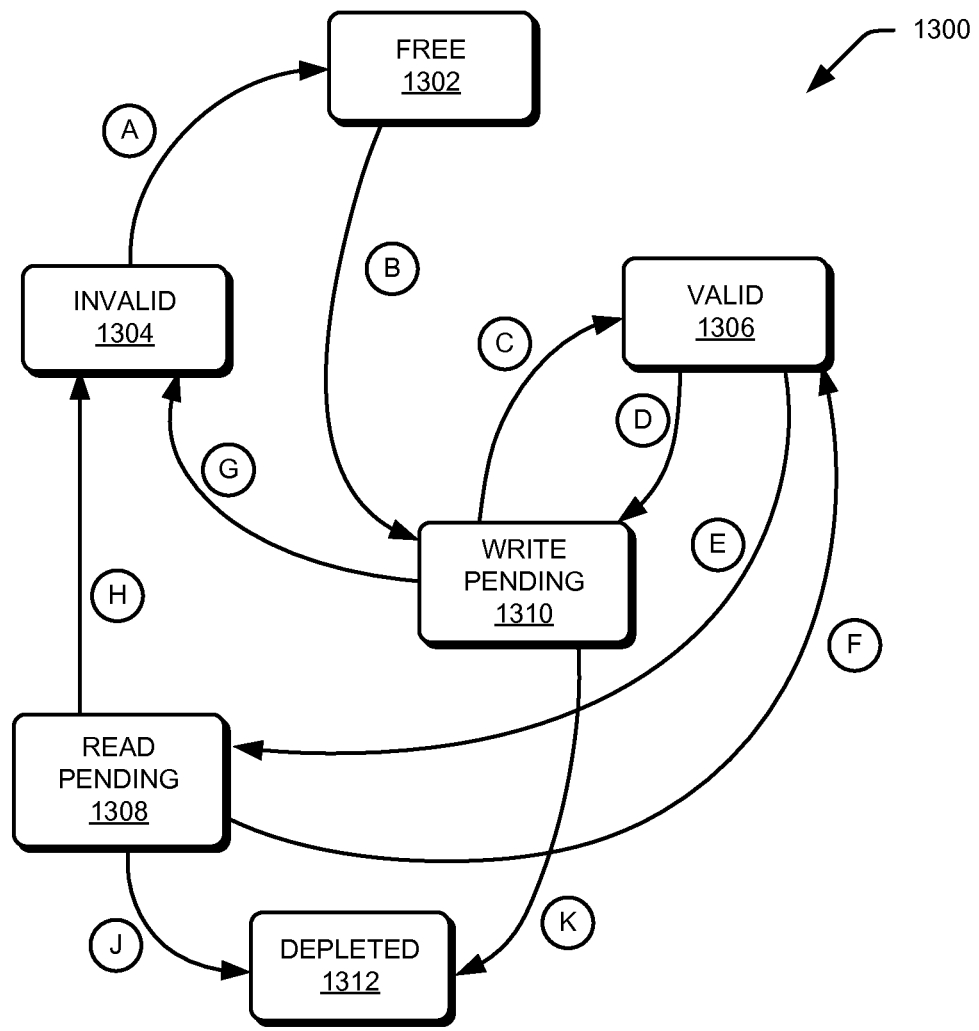
FIG. 13 is a state transition diagram.

FIG. 13 illustrates an example state transition diagram 1300 associated with the operation of the systems and methods described herein. State transition diagram 1300 includes multiple states: a free state 1302, an invalid state 1304, a valid state 1306, a read pending state 1308, a write pending state 1310, and a depleted state 1312. In one embodiment, these various states 1302-1312 are associated with data stored in a cache. The transitions between states 1302-1312 are identified by letters (illustrated in circles) in FIG. 13. Transition B (from free state 1302 to write pending state 1310) occurs upon initiation of a cache write operation or a cache read update (a write to the cache caused by a read miss for the cache). Transition C occurs when a cache write or cache read operation is completed successfully. Transition D occurs upon initiation of a cache write operation or a cache read update. Transition E occurs upon initiation of a cache read operation. Transition F occurs upon successful completion of a cache read operation. Transition G occurs when a concurrent write operation occurs before an earlier cache write operation or cache read update completed. Transition H occurs when a concurrent write operation occurs before an earlier read operation completes. Transition A (from invalid state 1304 to free state 1302) occurs when the first cache write or read update is completed successfully. Transition J occurs when a cache read operation fails. Transition K occurs when a cache write operation or a read update fails.

The cache 216 may support multiple page sizes. Different applications executing in the virtual environment may require different page sizes to function properly. For example, some applications always perform 32K data I/O operations. For these applications, it is desirable to use a large cache page size, such as 16K or 32K, to minimize the number of data I/O operations necessary to handle the 32K of data. For example, if the cache page size is 4K and the application performs a 32K data I/O operation, eight cache pages must be accessed to read or write the 32K of data. Performing eight separate I/O operations to accommodate the 32K of data is a burden on system resources and dramatically increases the number of I/O operations that must be processed by the system. In contrast, if the cache page size is 16K, only two I/O operations are required to process the 32K of data. Thus, the larger cache page size reduces I/O operations and the corresponding burden on system resources.

Using larger cache page sizes also reduces the number of cache tags, thereby reducing the memory space required to store the cache tags. For example, in a one terabyte cache having 4K cache pages, 256M cache tags are necessary to provide a single cache tag for each cache page. In the same system using 16K cache pages, 64M cache tags are needed. Thus, the larger cache page size reduces the number of cache tags and the memory resources needed to store the cache tags.

Although larger cache page sizes can reduce I/O operations and reduce the number of cache tags, in certain situations a larger cache page size can result in underutilized cache resources. For example, if a system is using a 32K cache page size and an application performs a 4K I/O operation, only a small fraction of the 32K page is used (28K of the page is not needed). This situation results in significant unused cache resources. Therefore, the systems and methods described herein support multiple cache page sizes to improve utilization of system resources, such as I/O resources and cache storage resources.

Different applications have different data storage characteristics. Applications can be characterized as having "sparse address spaces" or "dense address spaces". Sparse address spaces tend to have scattered data with significant gaps between different groupings of data. In contrast, dense address spaces tend to have data that is more compact with fewer (or smaller) gaps between different groupings of data. When selecting cache page sizes for a particular virtual environment, it is important to consider the data storage characteristics (e.g., sparse or dense address spaces) associated with applications executing in the virtual environment. There can be exceptions where a sparse address space may comprise groups of contiguous data where the groups are sparsely located. In such cases one can use large pages even though the address space is sparse.

In a particular embodiment, data associated with existing applications can be analyzed prior to implementing a system or method of the type described herein. This prior analysis allows the system to be "tuned" based on typical application data. After the systems and methods are implemented, the dynamic nature of the system allows for adjustments to cache page sizes, cache allocations, system resources, and other parameters based on changes in the operation of the application.

In a particular implementation, a cache is divided into multiple sections such that each section supports different cache page sizes. Because application I/O workloads can vary, a particular cache page size for one application may be more efficient than for another application. One objective in using different cache page sizes is to minimize the number of I/O requests that cross over a cache page boundary in order to make the I/O operations as efficient as possible. For example, a cache may be divided into four sections, two of which support 4K cache pages, one that supports 16K cache pages, and one that supports 32K cache pages. The cache pages in these different sections are allocated to different virtual machines and/or applications based, for example, on the data storage characteristics of the applications.

In one embodiment, a different hash table is used for each different cache page size. Each hash table has its own associated hash function that identifies a particular hash slot in the table based on an address provided to the hash function. When using multiple hash tables, such as a 4K hash table and a 16K hash table, the systems and methods perform a lookup operation for each hash table. Performing a lookup in both hash tables is necessary because a 4K address could be contained within a 16K entry in the 16K hash table. To enhance the lookup process, the systems and methods described herein apply one or more algorithms based on a percentage of cache hits associated with different cache page sizes, a success rate associated with different hash tables, and other factors to weight the lookup between the different hash tables and thereby improve the lookup efficiency.

In a particular implementation, an algorithm uses both the percentage of cache hits associated with cache page sizes and the success rate associated with different hash tables to search for data in a cache.

In other embodiments, the systems and methods use a single hash table associated with the smallest cache page size, such as 4K and still presents the feature of a virtual machine using multiple different page sizes. Although the cache supports multiple cache page sizes, the hash table uses a 4K page size exclusively. This approach eliminates the need to perform a lookup in multiple hash tables associated with different cache page sizes. In this scheme a 16K page I/O would require four hash table lookups in the single has table and groups of cache tags are managed as one.

In certain situations, it is desirable to prevent one or more cache pages from being stolen or usurped by another virtual machine. This is accomplished in the systems and methods discussed herein by "pinning" the cache tags associated with the cache pages that are to be protected from being stolen. Cache tags are pinned by setting the state bit to "pinned state" in the cache tag 221.

Pinning cache tags 221 may be used in a variety of situations. For example, a user can pin specific data within the cache 216 to prevent the data from being replace, modified, evicted, or the like. The user may know that the specified data is critical to the operation of the virtual machine 208 and wants to ensure that the data is always available in the cache 216.

Pinning cache tags 221 may also be used to lock a range of addresses in the cache 216. In certain situations, a portion of data associated with a read operation is available in the cache 216, but a portion is not available (or not valid) in the cache 216. This condition is referred to as a partial cache hit or a partial cache miss. In these situations, the system must decide whether to retrieve all of the data from the primary storage system 212 or retrieve a portion from the cache and the remainder from the primary storage system 212. The decisions involving what's available in the cache 216 can result in more than one I/O to primary or shared storage (which may be more efficient when doing sequential I/Os).

As discussed above, the cache management system 220 may be configured to snapshot a group of cache tags 221, which may comprise storing the cache tags 221 on a persistent storage device. Later, when the virtual machine "warms up" (e.g., reboots, power cycles, etc.), the stored cache tags 221 are retrieved from the persistent storage device, the actual cache data is read back from the primary or shared storage, thereby recreating the working set. This allows the virtual machine 208 to resume operation immediately with a fully functioning working set, rather than taking a significant period of time recreating the working set of cache tags 221. Similarly, the working set of cache tags 221 may be retained when a virtual machine 208 is transferred to a different host 202.

In certain embodiments, the cache management system 220 is configured to manage a partial cache miss as efficiently as possible to minimize the number of I/O requests forwarded on to the primary storage. In addition to managing partial cache miss I/O requests, the cache management system 220 mitigates the amount of fragmentation of I/Os to primary storage based on I/O characteristics of the I/O requests. Fragmentation of I/Os (also known as I/O splitting) refers to an I/O request that crosses a cache page boundary or is divided between data that resides in the cache and data that resides on the primary storage. The I/O characteristics may include whether the I/O is contiguous, the size of the I/O request, the relationship of the I/O request size to the cache page size, and the like. In affectively managing partial cache hits and fragmentation of I/O requests, the cache management system 220 may coalesce I/O requests for non-contiguous address ranges and/or generate additional I/O requests to either the cache or the primary storage.

In a particular embodiment, a checksum is calculated for each cache page. When calculating the checksum, the system only performs the calculation on the valid data, based on a valid unit map (e.g., the valid data sectors). When a write operation is performed that increases the number of valid data sectors, the checksum is recalculated to include the new valid data sectors.

Figure 14:
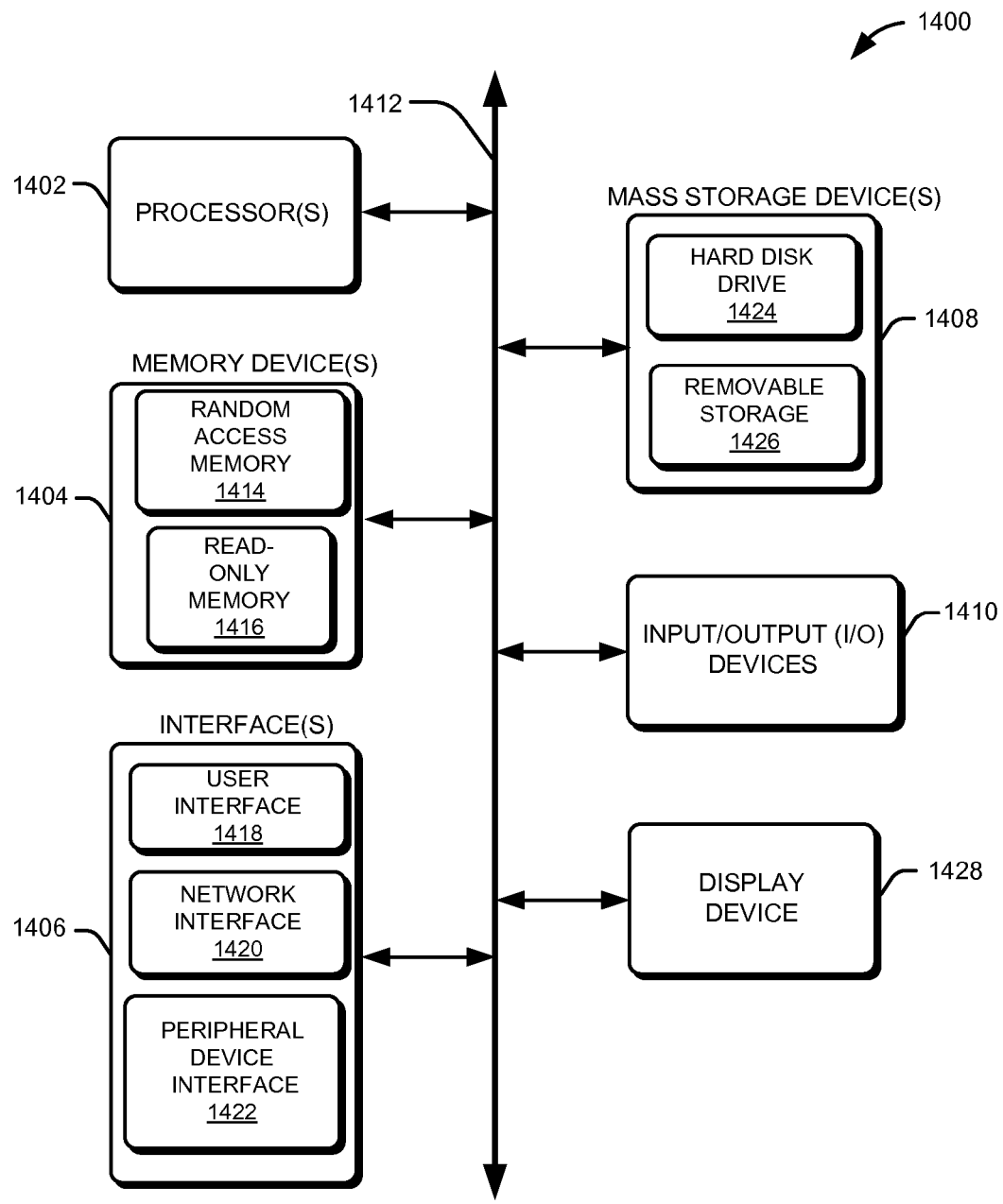
FIG. 14 is a block diagram illustrating an example computing device.

FIG. 14 is a block diagram illustrating an example computing device 1400. Computing device 1400 may be used to perform various procedures, such as those discussed herein. Computing device 1400 can function as a server, a client, or any other computing entity. Computing device 1400 can be any of a wide variety of computing devices, such as a desktop computer, a notebook computer, a server computer, a handheld computer, and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1428 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM)) 1414 and/or nonvolatile memory (e.g., read-only memory (ROM)) 1416. Memory device(s) 1404 may also include rewritable ROM, such as Flash memory.

Mass storage device(s) 1408 include various computer readable media, such as magnetic tapes, magnetic disks, optical disks, solid state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1428 includes any type of device capable of displaying information to one or more users of computing device 1400. Examples of display device 1428 include a monitor, display terminal, video projection device, and the like. Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interfaces include a user interface 1418 and a peripheral device interface 1422.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In another embodiment, an issue of compatibility that occurs within virtual systems is addressed. In certain virtual systems, some of the processes make certain assumptions about the environment in order to properly operate.

In a single host, there typically will be multiple virtual machines operating in the host. Each virtual machine will have its own separate I/O drivers and also separate cache management module to manage local storage operations from the perspective of each particular virtual machine. Each virtual machine needs to share the local storage cache and each virtual machine will have its own unique demand for space on the local storage cache during its operation. Multiple virtual disks may be created on the local cache storage, and these can be exposed to the local virtual machines. During operation of the various virtual machines, the demand can vary among the different virtual machines. As a result, capacity in the local cache may not be efficiently utilized by the virtual machines, and cache capacity may be wasted.

In one example, a thin provisioned storage is provided, such as a thin provisioned cache, for dynamic allocation of storage space among multiple virtual machines within a host. Since virtual machines are dynamic in nature, their demand for storage space may vary. If they share actual storage space with other virtual machines, the use of the storage space by a group of virtual machines may conflict. For example, if one or more virtual machines experience a higher than normal I/O traffic rate, their operations may become bogged down, causing lags in output. Other machines may experience a lower than normal I/O traffic rate at the same time, leaving their allocated storage space unutilized. Thus, in some cases, the higher I/O virtual machines' use of actual storage space may be unnecessarily restricted by rigid or inefficient allocation schemes. Virtual machines may be transferred from one host to another, may become inactive or offline for some period of time, may power down or rest on a host that needs to power down, or its demand for storage space may change up or down during operation. Thus, it would be useful if the storage space allocated to the group of virtual machines could be dynamically allocated and balanced, where actual storage space allocated to any one machine can be apportioned more intelligently. As such, dynamic allocation of storage space could serve to reduce lag time for virtual machines that demand more space and I/O transfers by provisioning more space when other virtual machines associated with the same storage demand less space. The embodiment provides such solutions in an elegant manner.

In typical virtual machine environments, shared storage is utilized among multiple hosts that have equal access to the common storage space. The shared storage may be a clustered file system, a virtual machine file system (VMFS), where the system provides correctness and consistency among the various virtual machine hosts using file based locking and other methods.

Referring back to FIG. 2, one or more virtual machines 208 may be configured to transfer between hosts 202A-N. For example, VMWare™ provides the VMotion™ product that enables virtual machines 208 to transfer operations from one host 202A-N to another, where storage of the transferred virtual machine (e.g., virtual machine 208X) is maintained on storage that is shared between the source and destination hosts (e.g., hosts 202A and 202B). The transferred virtual machine 208X may be a live operating virtual machine 208X located on one host 202A, and the desire is to be able to move the virtual machine 208X to another host 202B without interruption. This is possible because the multiple hosts 202A and 202B see and share the common data storage system (e.g., shared primary storage system 212). Thus, the virtual machine may move from one host to another without shutting down or rebooting the virtual machine 208X, the move is transparent to the moving virtual machine 208X.

When a virtual machine 208 boots up and begins to run, the virtual machine 208 is configured to identify available resources, such as storage devices, network devices, etc., which may comprise sending out Small Computer System Interface (SCSI) inquiries to connected storage devices to determine what resources are available. The storage available to the virtual machine 208 is virtual storage that is encapsulated in a file. The encapsulated file is the main storage space for the virtual machine. Thus, the storage for the virtual machine is now instantiated in a file and becomes a virtual hard drive. In prior art devices, this file is stored in the common data storage system shared among multiple hosts.

According to one embodiment, it is desired to store the virtual disk of the virtual machines 208 hosted on a particular host 202A in local storage, such as the cache storage 216A. However, as discussed above, the virtualization kernel 210 may prevent virtual machines 208 that reference local storage resources from being transferred between hosts 202A-N. In some embodiments, the virtual machine cache 213 may be configured to emulate a shared storage device by use of a VMDK virtual disk (and vSCSI filter 219), as described above. Alternatively, the virtual machine cache 213 may emulate shared storage by use of other types of virtual disks (VLUN disks).

Once provisioned, each virtual machine 208 expects to have access to predetermined and contiguous cache storage space for which it has the cache tags 221 (discussed above). In one embodiment, a dynamic provisioning approach is provided to divide the cache storage into cache chunks 602 that can be dynamically provisioned to the separate virtual machines 208. According to one embodiment, the cache provisioner module 214 comprises a VLUN driver configured to manage the chunks 602 of cache data that is allocated to each virtual machine 208. According to one embodiment, a VLUN disk is a virtual storage resource allocated to a virtual machine 208. Since multiple virtual machines 208 will typically be operating on a single host 282, the chunks 602 of cache storage that come available will likely be located in different physical areas of the cache 216. The VLUN driver may be configured to create a VLUN disk that is assigned to the virtual machine 208.

In some embodiments, the virtual machines 208 may be configured for use with a fixed amount of storage space. The virtual machine 208 may react adversely or may not operate properly if there is sudden atypical change to storage space. Accordingly, the cache provisioner module 214 may be configured to expose cache storage resources that appear to the virtual machine 208 to have a fixed size. In some embodiments, the cache provisioner module 214 (VLUN driver) allocates a limited amount of cache storage to the virtual machines 208 on an as needed basis, while exposing a fixed storage capacity through a virtual disk, such as a VLUN disk, as described above. To avoid potential conflicts, the cache storage space allocated to the virtual machine 208 appears to have a fixed size. The fixed size may be equal to a set amount of space that a virtual machine's 208 operating system expects to detect. Thus, the dynamically provisioned cache storage may appear to be constant.

The cache provisioner 214 may be configured to manage the dynamic allocation of the available cache chunks 602 to the virtual machines 208. The storage is thus physically managed in chunks 602 by the VLUN driver of the cache provisioner module 214, which provides each virtual machine with the abstraction of contiguous chunks of storage space.

The VLUN driver may be configured to translate allocations from a "virtual space" exposed through the VLUN disk into the underlying physical chunks 602 allocated to each virtual machine within the cache 216. As a result, the embodiment allows the cache provisioner module 214 to allocate cache storage as chunks 602, which can be allocated on the fly to the various virtual machines 208. In operation, the cache provisioner module 213 maintains mappings between the virtual space of each virtual machine and the actual physical storage space located in the cache 216 (e.g., cache addresses within the cache storage device(s) of the cache 216).

Figure 15:
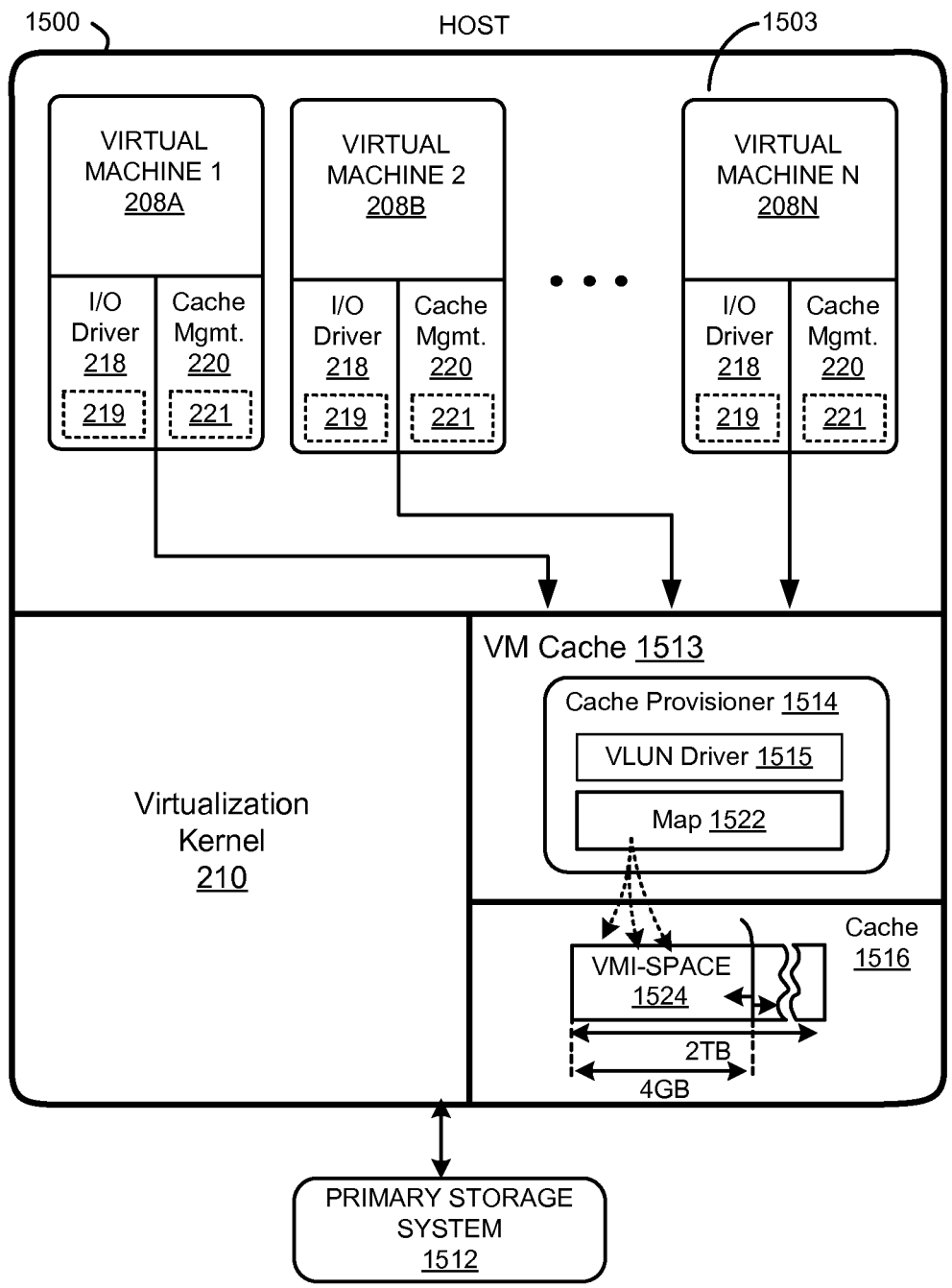
FIG. 15 is a block diagram of one embodiment of a host comprising a plurality of virtual machines and a VLUN driver.

FIG. 15, a block diagram of another embodiment of a virtual machine cache 1513 operating on a host 1502. The host 1502 may comprise a user space 1503 and a virtualization kernel 1510. User space 1502 includes multiple virtual machines 208A-N. Each virtual machine may be configured to communicate with the virtual machine cache 1513 via the VLUN driver 1515. The virtual machine 208A-N may comprise respective I/O drivers 218 and cache management system s 220 for managing the communications with the virtual machine cache 1513, as described above.

The cache 1516 may comprise one or more persistent storage devices, such as one or more solid-state and/or Flash storage devices. The cache provisioner 1514 may be configured to dynamically allocate different amounts of cache storage to the virtual machines 208A-N (e.g., by use of the VLUN Driver 1515, as described above). The virtual machines 208A-N may be allocated varying amounts of cache space, in accordance with different cache requirements of the virtual machines 208A-N.

The cache provisioner 1513 may comprise a map module 1522 configured to map virtual storage resources exposed to the virtual machines 208A-N to physical addresses in the cache 1516. As described above, the VLUN driver 1515 may be configured to present fixed-sized, contiguous cache storage allocations to the virtual machines 208A-N. The map module 1522 may be configured to map the virtual storage allocations to physical cache addresses (e.g., cache chunks 602 and/or pages 604). For example, the cache storage provisioned to the Virtual Machine-1 208A is illustrated diagrammatically as space 1524 in the cache 1516. The virtual space allocated to this virtual machine 208A is two terabytes (2 TB), and the physical cache storage space that is actually allocated to the virtual machine 208A is four gigabytes (4 GB). The VLUN driver 1515 may expose the entire, fixed-sized (2 TB) virtual disk to the virtual machine 208A, and may dynamically allocation portion(s) of the physical storage space to the virtual machine 208A as needed (4 GB in this example).

Furthermore, the chunks 602 of storage space allocated to a particular virtual machine may be disbursed within the physical address space of the cache 1516 in an arbitrary manner (the chunks 602 may be discontiguous). However, the virtual cache storage presented to the virtual machine 208A may be contiguous.

The cache provisioning module 1514 may be configured to dynamically shift cache storage allocations between the virtual machines 208A-N in response to changing cache requirement and/or as virtual machines 208A-N are transferred to/from the host 1502.

FIG. 16 depicts one embodiment of a mapping between virtual cache storage exposed to one the virtual machine 1 208A by the virtual machine cache 1513 (e.g., through the VLUN driver 1515) and the underling physical cache addresses actually allocated to the virtual machine 208A.

The virtual cache storage 1604 allocated to the virtual machine 1 (VM-1) 208A is depicted as a contiguous range of cache chunks 602 VM-$1_0$, VM-$1_1$, VM-$1_2$, VM-$1_N$. The physical cache storage actually allocated to VM-1 208A is depicted as a discontiguous set of chunks VM-$1_0$, VM-$1_1$, VM-$1_2$, VM-$1_N$ within the physical address space 1606 of the cache 1516. As depicted in FIG. 16, the chunks 602 in the physical address space 1606 of the cache 1516 may be discontiguous and/or interleaved with chunks 602 allocated to other virtual machines 202B-N. Although the illustration in FIG. 16 shows some of the different locations in a physical order, the cache chunks 602 allocated to the VM-1 208A may be located in a random order, in accordance with the availability of physical cache resources (e.g., available chunks 602).

The VLUN mapping 1602, implemented by the map module 1522, may be configured to map virtual cache storage allocations to physical cache allocations. In some embodiments, the VLUN mapping 1602 may comprise an "any-to-any" index of associations between the virtual cache storage allocations exposed to the virtual machines 208A-N and the physical address space 1606 of the cache 1516.

In some embodiments, the virtual machine cache 1513 may leverage the VLUN mapping 1602 to secure data stored in the cache 1516. For example, the virtual cache manager 1513 may use the VLUN mapping 1602 as a form of access control, wherein access to physical cache chunks 602 is restricted to the virtual machine to which the physical cache chunk 602 is mapped. For example, the cache chunk labeled VM-$1_0$ may only be accessible to the virtual machine 208A-N to which the chunk 602 is mapped in the VLUN mapping 1602 (e.g., VM-1 208A). Moreover, by virtue of the VLUN mapping layer 1602, virtual machines 208A-N may be incapable of referencing and/or addressing physical cache chunks 602 of other virtual machines 208A-N.

The VLUN mapping 1602 may be configured to map virtual cache storage using the VMID of the corresponding virtual machine. Accordingly, when a virtual machine is transferred from the host 1502 to another host, the VLUN mapping 1602 may remain valid to reference data of the virtual machine (e.g., given the VMID, the retained cache data of the corresponding virtual machine 208A-N may be identified and accessed). Therefore, in some embodiments, the cache transfer module 329A may be configured to determine the cache address of retained cache data of a transferred virtual machine using the VMID and/or the VLUN mapping 1602.

Figure 17:
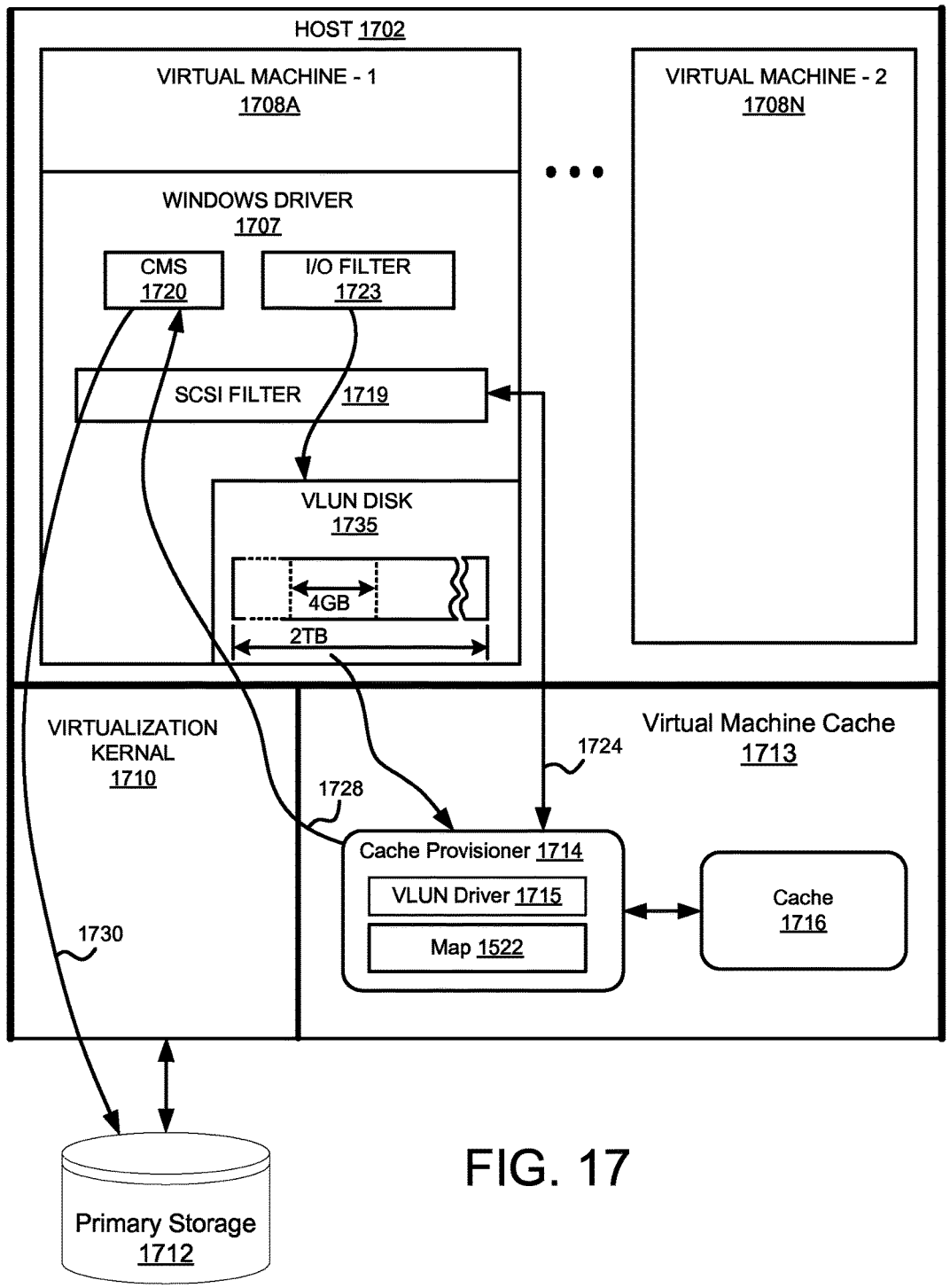
FIG. 17 is a block diagram of another embodiment of a host comprising a VLUN driver, and a virtual machine comprising corresponding VLUN disk.

FIG. 17 depicts another embodiment of a virtual machine cache 1713 operating on a host 1702. The virtual machine cache 1713 may be configured to dynamically provision cache storage to one or more virtual machines 1708A-N. As discussed above, from the view of applications outside a virtual machine 1708A-N, there is a fixed amount of cache storage space allocated to a virtual machine 1708A-N, and it may or may not be the same for each virtual machine 1708A-N. Since multiple virtual machines 1708A-N may be deployed on the host 1702, the different virtual machines 1708A-N may have varying demands for storage space.

The cache provisioner module 1714 of the virtual machine cache 1713 may comprise a VLUN driver 1715 configured to represents to the operating system of the virtual machine 1708A that a large fixed amount of space is allocated to the virtual machine 1708A, even though a dynamically provisioned, lesser amount is actually allocated to any one virtual machine 1708A. Although the cache storage appears to the fixed, the actual cache storage allocated to the virtual machine 1708A may be dynamically provisioned by a VLUN driver 1715.

Each of the virtual machines 1708A-N may comprise a respective SCSI filter 1719 that is incorporated into a storage stack of the virtual machine 1708A-N (e.g., OS SCSI stack). The virtual machines 1708A-N may further comprise a windows driver 1707, comprising the cache management system 1720, described above. The CMS 1720 may be configured to manage data transfers between the virtual machine 1708A and various storage devices. An input/output (I/O) filter 1723 cooperates with the CMS 1720 to service I/O requests directed toward primary storage 1712 either directly from the primary storage or from the virtual machine cache 1713 of the host 1702. The primary storage 1712 may comprise a physical storage device located within the host device 1702 or a virtual disk defined on a virtual and/or shared storage.

The virtual disk 1735 may be available only to a single virtual machine 1708A while the primary storage 1712 may be accessible by a number of virtual machines 1708A-N (e.g., all of the virtual machines 1708A-N deployed on the host 1702). The SCSI filter 1719 may be configured to manage transfers between the CMS 1720 and the I/O filter 1732 and the various storage devices. The SCSI filter 1719 may be configured to manage the transfer of data among physical and virtual entities (e.g., primary storage 1712, VLUN disk 1735, and/or the virtual machine cache 1713). Within the virtual machine 1708A, the SCSI filter 1719 is configured to identify the VLUN disk 1719, and to manage capacity changes implemented by, inter alia, the cache provisioning module 1714 (and/or VLUN driver 1715), as described above. The VLUN disk 17135 is a virtual disk, which provides raw storage capacity for the CMS 1720. As described above, the VLUN disk 1735 may be configured to report a larger, fixed storage capacity than the actual physical cache capacity allocated to the virtual machine 1708A, such that the cache provisioner 1714 can dynamically provision cache storage to/from the VLUN disk 1735 without adversely affecting the virtual machine 1708A. Alternatively, the SCSI filter 1719 may be configured to manage the actual physical capacity of the VLUN disk 1735, which may be hidden from other applications and/or operating systems of the virtual machine host 1708A. In one embodiment, the VLUN disk 1735 is presented to the virtual machine 1708A as a read-only storage device. Consequently, the guest operating system prevents other applications of the guest operating system from writing data to the VLUN disk 1735.

As discussed above, in operation, though the actual storage space that is allocated to the virtual machine 1708A is one value, another, fixed value is represented to the virtual machine operating system. For example, the virtual machine 1708A may be allocated 4 GB of actual cache storage, but may appear to the operating system to comprise 2 TB cache storage.

The cache provisioner module 1714 may report the actual physical cache storage allocated to the virtual machine 1708A via a communication link 1724. The communication link 1724 may operate separately from I/O data traffic between the VLUN driver 1715 and the SCSI filter 1719. Thus, asynchronous out of band messages may be sent between the VLUN driver 1715 and the SCSI filter 1719 to inform the Windows driver 1707 of the actual cache space allocated to the virtual machine 1708A in the cache 1716. The SCSI filter 1719 may report the allocation information to the CMS 1720, which may use the allocation information to determine the number of cache tags 221 available to the virtual machine 1708A. Accordingly, the cache may be thinly provisioned with respect to the virtual machines 1708A-N. The communication path 1724 allows the ability to inform the Windows driver, particularly CFS 1712, of cache storage capacity changes when actual cache storage space that is allocated to the virtual machine 1704 changes. Thus, in underlying operation, each virtual machine 1708A-N is dynamically actually allocated cache storage space in accordance with the cache requirements of the virtual machine 1708A-N, which may vary over time in response to changing operating conditions, power on/off events, virtual machine transfers, and so on.

Figure 18:
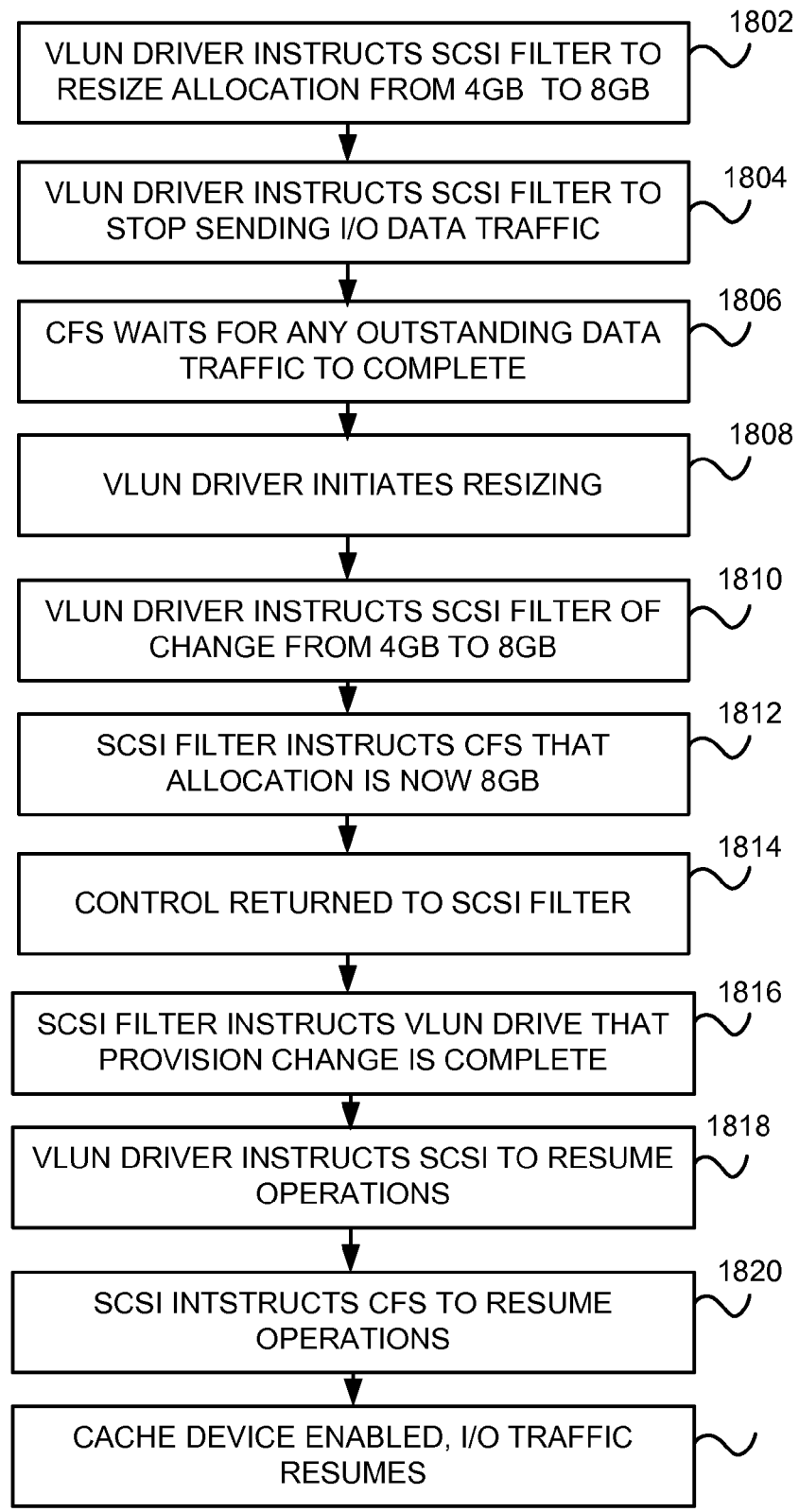
FIG. 18 is a flow diagram of one embodiment of a method for changing cache space allocation.

According to one embodiment, the virtual machine 1708A may be provisioned different amounts of cache storage as its needs change. Referring to FIG. 18, a process flow chart 1800 of a change in allocation of cache storage is shown, and will act as a process guide in conjunction with the system diagram of FIG. 17 to illustrate how cache storage space is dynamically provisioned.

In the FIG. 18 example, the virtual machine 1708A may be dynamically allocated additional cache storage (e.g., an increase from 4 GB to 8 GB). As described above, the cache provisioner module 1714 may be configured to monitor and/or manage cache storage for the virtual machines 1708A-N (by use of the VLUN driver 1715). The cache provisioner module 1714 may be further configured to dynamically provision cache storage, and to communicate allocation changes to the virtual machines 1708A-N via the SCSI filter 1719. Step 1802 may comprise the VLUN driver 1715 resizing the cache storage allocated to the virtual machine 1708A from 4 GB to 8 GB.

In step 1804, the VLUN driver 1715 instructs the SCSI filter 1719 to stop sending I/O data traffic relating to the virtual machine cache 1723 during the dynamic provisioning or re-provisioning of cache storage. The SCSI filter 1719 communicates the this directive to the CMS 1720. Alternatively, or in addition, the directive may be communicated via the path 1728. In one embodiment, while the CMS 1720 stalls, applications running on the virtual machine 1708A may continue to perform I/O operations with the primary storage 1712 (via path 1730). Accordingly, applications such as Iometer™, Microsoft Office™, SQL Server™, and other applications can continue to operate, and the I/O traffic directed to the primary storage 1712 may continue. The CMS 1720 may be configured to invalidate selected cache tags 221 in response to write operations that occur while the CMS 1720 is stalled. Step 1804 may further comprise flushing any outstanding I/O requests directed to the virtual machine cache 1723 (e.g., waiting for any outstanding I/O data traffic to and from the virtual machine cache 1723 to complete).

In step 1807, the CMS 1720 notifies the VLUN driver 1715 that the pending I/Os are complete. In response, the CMS 1720 is stalled, as described above. The VLUN driver 1715 initiates the resizing from 4 GB to 8 GB in step 1808 and instructs the SCSI filter 1719 that the new allocation of cache storage space is 8 GB in step 1810. In step 1812, the SCSI filter 1719 instructs CMS 1720 to resize the allocation of cache storage to 8 GB. In one embodiment, the CMS 1720 resizing the cache storage allocation by adding new cache tags 221 to an existing, working set of cache tags 221. Thus, the CMS 1720 may maintain the existing working set of cache tags 221 (and associated metadata) corresponding to the original 4 GB during the resizing operation.

In step 1814, control is returned to the SCSI filter 1719, and in step 1816 the SCSI filter 1719 instructs the VLUN driver 1715 that the change of cache storage for virtual machine 1708A is complete. In step 1818, the VLUN driver 1715 instructs the SCSI filter 1719 to resume operations (e.g., unstall the CMS 1720). In step 1820, the SCSI filter 1719 instructs CMS 1720 to resume operations. In step 1822, and I/O data traffic resumes to the virtual machine cache 1713 (and cache 1716), and the virtual machine 1708A can continue to send I/O data traffic to either the cache 1716 or the shared storage 1712, as described above.

Thus, a thin provisioned cache device is provided, where the limitation of a fixed disk capacity requirement in conventional virtual systems has been addressed. Thus, the operating system can essentially be deceived into thinking that a fixed amount of cache storage has been allocated so that applications in the operating system have no impact. And, the actual cache storage space allocated to any virtual machine may be resized on the fly without impacting other system operations. The result is an intelligent and optimized utilization of cache storage, where the available cache storage space is more efficiently utilized. Multiple virtual machines are dynamic in nature and their data flow and cache storage needs change dynamically. A virtual machine substantially reduces its demand for cache storage in different modes or circumstances. For example, it may power off or go into sleep mode, it may stall while moving from one host to another, and its needs will necessarily change when these operational changes occur. A virtual machine may alternatively increase its demand for cache storage in other modes or circumstances, such as when it wakes up from a sleep mode, arrives at a new host after moving, or simply experiences an upsurge in usage operations. This embodiment gives the host system the flexibility to dynamically change and optimizes the use of cache storage at the same time. Accordingly, the amount of cache storage designed in a host system can be minimized, substantially saving costs in a host system or device. The cache device, which is commonly implemented in expensive flash memory, is itself virtualized in this embodiment, and its operations are intelligently managed in a way that optimizes the use of its storage space, allocating cache storage to the various virtual machines according to their needs.

One fundamental precept of virtual systems is that shared storage must be secured among the different virtual machines. This is important because the different virtual machines may store confidential information in the various storage chunks in cache storage that possibly could be accessed by other virtual machines in the dynamic provisioning process. For example, a person's confidential financial and identity information may be stored by one virtual machine in one chunk of allocated cache data storage, and that machine's allocated cache storage may be resized as a result of low demand. The virtual machine may then give up allocated cache storage space to another machine in the dynamic allocation process, also giving the second virtual machine that acquires the data chunk having the person's confidential information stored in that chunk. This is thus a security risk, and the dynamic allocation process that has been designed to optimize the use of the cache storage may cause a problem when resizing cache space of particular machines and allocating cache storage chunks from one virtual machine to another. One embodiment of the invention addresses this security risk in an elegant manner without substantial impact to the work flow within the system while dynamically provisioning cache storage chunks.

Figure 19:
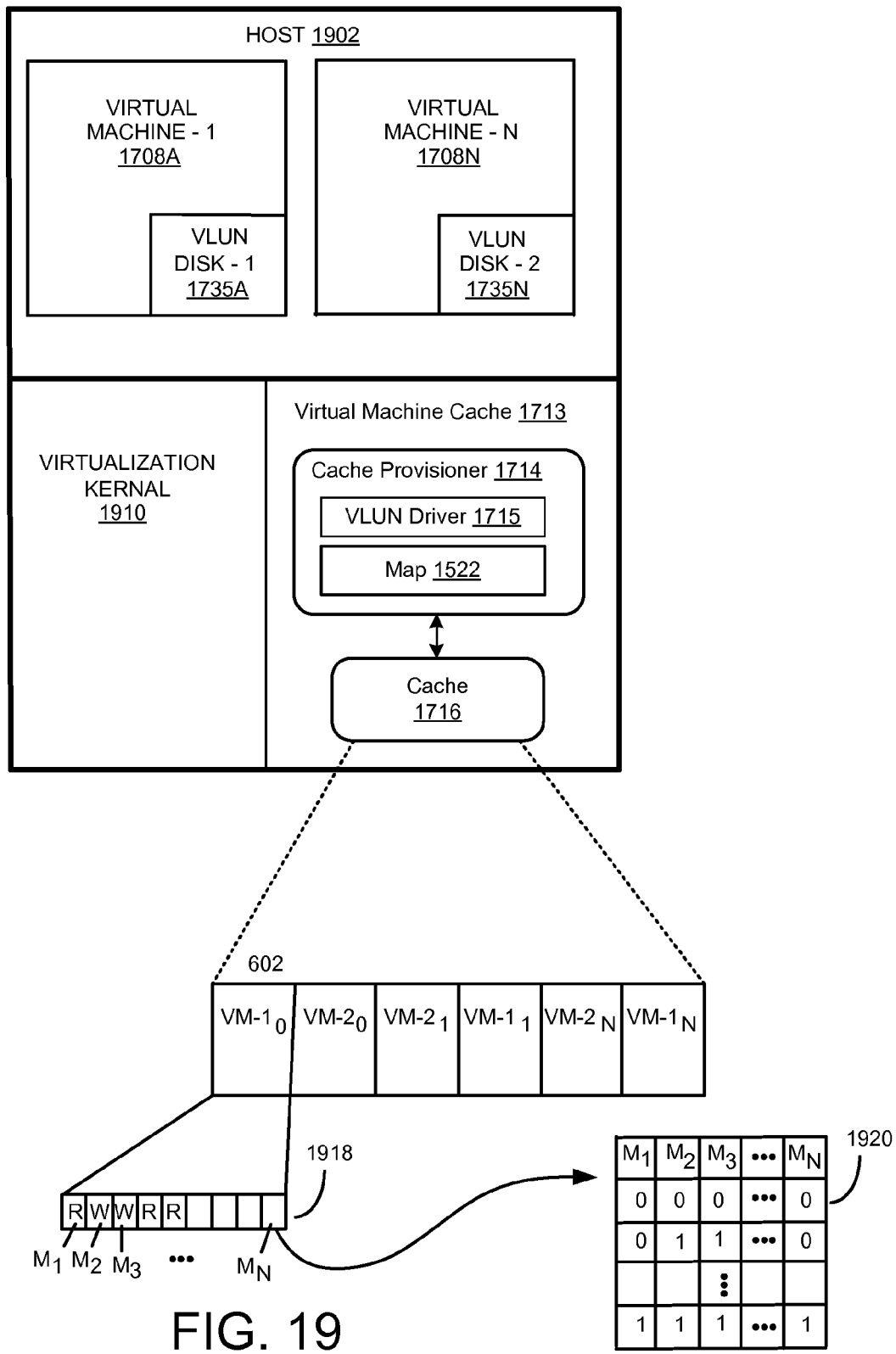
FIG. 19 is a block diagram of another embodiment of a host comprising virtual machines accessing cache storage through respective VLUN disks.

FIG. 19 is block diagram of another embodiment of a virtual machine cache 1713 operating on a host 1902. The host 1902 may comprise a virtualization kernel 1910, and a plurality of virtual machines 1708A-N, each comprising a respective VLUN disk 1735A-N. As described above, the cache 1716 may be divided into physically addressable chunks 602, which may be allocated to respective virtual machines 1708A-N (e.g., chunks allocated to virtual machine 1708A are shown as VM-$1_0$, VM-$1_1$ and, VM-$1_N$ and chunks allocated to Virtual Machine-N 1708N are shown as VM-$2_0$, VM-$2_1$ and VM-$2_N$. As discussed above, the map module 1522 may implement mappings between virtual machine identifiers (VMIDs) and chunks 602 allocated to the respective virtual machines 1708A-N. The mapping may provide a "barrier" to prevent authorized access to cache data of the virtual machines 1708A-N.

The virtual machine cache 1713 may be further configured to secure cache data as cache chunks 602 are dynamically reallocated between the virtual machines 1708A-N. The individual chunks 602 must be properly handled when being allocated between the virtual machines 1708A-N to ensure that the virtual machine to which a chunk 602 has been allocated cannot access cache data stored thereon by the previous "owner" of the chunk 602.

In some embodiments, the virtual machine cache 1913 may be configured to erase chunks 602 as they are provisioned between virtual machines 1708A-N. This approach may not be efficient, however, due to erase latencies and/or wear characteristics of some types of solid-state storage media used to implement the cache 1716. Alternatively, the virtual machine cache 1713 may be configured to TRIM chunks 602 (e.g., logically invalidate the data stored on the transferred chunks 602). In other embodiments, chunks 602 may be monitored to ensure that a virtual machine 1702A-N does not attempt to perform a "read before write operation." Chunks 602 that were erased prior to being transfer (and before being used to store data of another virtual machine 1702A-N) may not require monitoring. As used herein, such that is erased before being transferred (and/or before use to store data by another virtual machine 1708A-N) is referred to as an "unused chunk." By contrast, a chunk 602 that was used to store data of another virtual machine 1702A-N (and was not erased or TRIMed) is referred to as a "used" or "dirty chunk," which may be monitored to prevent "read before write" security hazards.

The monitoring state of a chunk 602 may be persisted for use after a power cycle event. In some embodiments, the VLUN driver 1715 monitors "used" chunks 602 after allocation to a different virtual machine 1708A-N and/or during a current power cycle of the virtual machine cache 1713. In one such embodiment, a bit mask indicator is used to prevent "read before write" hazards on the dirty chunk 602. In one embodiment, each 4 kb sub portion of a used chunk 602 is monitored to determine whether there has been a corresponding write in the 4 kb sub portion. This is determined at the time the subsequent virtual machine 1708A-N accesses the used chunk, and is performed only when necessary to prevent the reading of old data. After provisioning a used chunk 602 to a new virtual machine 1708A-N, each sub portion of the chunk 602 may be tested prior to any read operation on the used chunk (until the respective sub portions are overwritten and/or erased).

Figure 20:
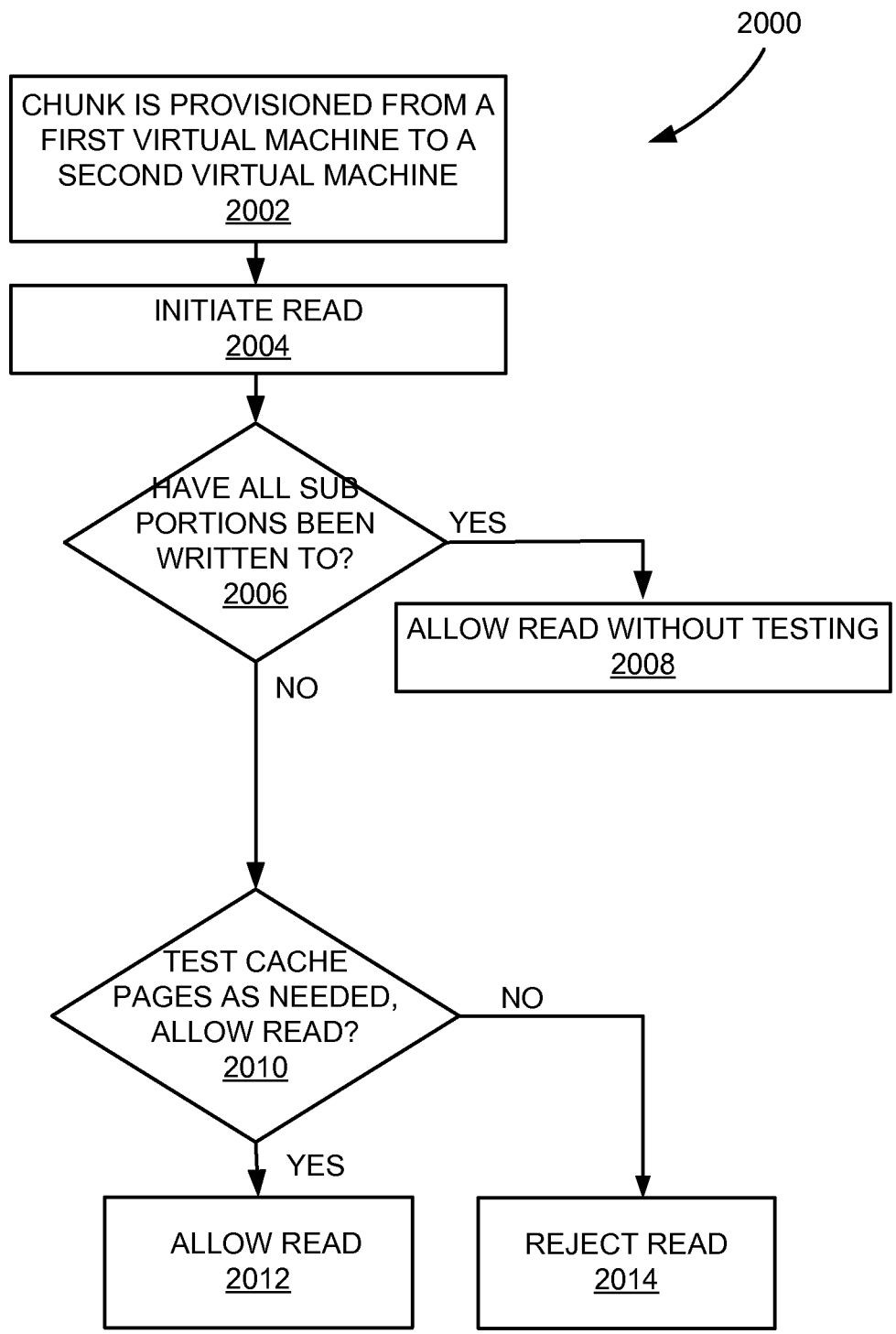
FIG. 20 is a flow diagram of one embodiment of a method for reading cache data from a shared cache.

FIG. 20 is a process flow chart illustrating one embodiment of a method for preventing "read before write" security hazards. This means that read operations for the old data are prevented until the address for old data has received a write, erase, or TRIM operation (an overwrite from the virtual machine allocated the newly provisioned chunk 602). Thus, if any sub portion is read by a virtual machine 1708A-N that has acquired a chunk 602 from one or more other virtual machines 1708A-N, it is presumed that the chunk 602 has old data that could present a read before write security hazard. Here, a chunk 602 is provisioned from a first virtual machine 1708A to a second virtual machine 1708N, for example chunk VM-$1_0$ having subdivided spaces $m_1$ through $m_N$ 1918. In step 2002, a read is initiated by the second virtual machine 1708N.

The process then proceeds to step 2006, where it is determined whether all pages within the chunk 602 were written, erased, and/or TRIMed at least once by the second virtual machine 1708N, and in particular, whether this has occurred since the chunk 602 was provisioned to the second virtual machine 1708N. If yes, then the need for the security test is obviated, and the reads to this chunk 602 by the second virtual machine 1708N may resume in step 2008 without further testing; otherwise, the flow continues to step 2010 for further testing on an as-needed basis until each sub portion (cache page 604) is written, erased, and/or TRIMed at least once (and while the second virtual machine 1708N continues to be allocated the chunk 602 continues to initiate reads to the chunk 602).

At step 2010, if the sub portion testing indicates a "read before write hazard" (e.g., the particular sub portion has not been written by the second virtual machine 1708A), the read may be rejected at step 2014. Otherwise, if no security hazard exists, the read may be allowed at step 2012. The determination of step 2010 may comprise accessing a bitmap comprising on or off, logic 1 or logic 0, for example. The bits may be recorded in a table, such as table 1920. This may be in the form of a type of bit mask that can be stored in cache or other storage location. The indication of whether a page is entirely written over may be indicated by a single bit that is toggled to a binary "1" when a full write over occurs. When a partial write occurs to the page 604 of a chunk 602, the VLUN driver 1715 converts the partial write to a full write by filling in zeros for the data space that is not covered by the partial write from the CMS 1720. Any other write to a page 604 while the very first write is in progress will be returned with error. If a read occurs before a write, then a test would show that a full write has not occurred, and the binary bit should be "0". As the chart 1920 shows, the table may start out as all logical "0", indicating that the individual pages 604 have not been fully written over since being allocated to the second virtual machine. As full write over occurs in each page 604, the full write indicator bits eventually become more populated across the array, eventually ending up over time with all logical "1" bits, indicating that each and every page 604 has been written over by the second virtual machine at least once.

Figure 21:
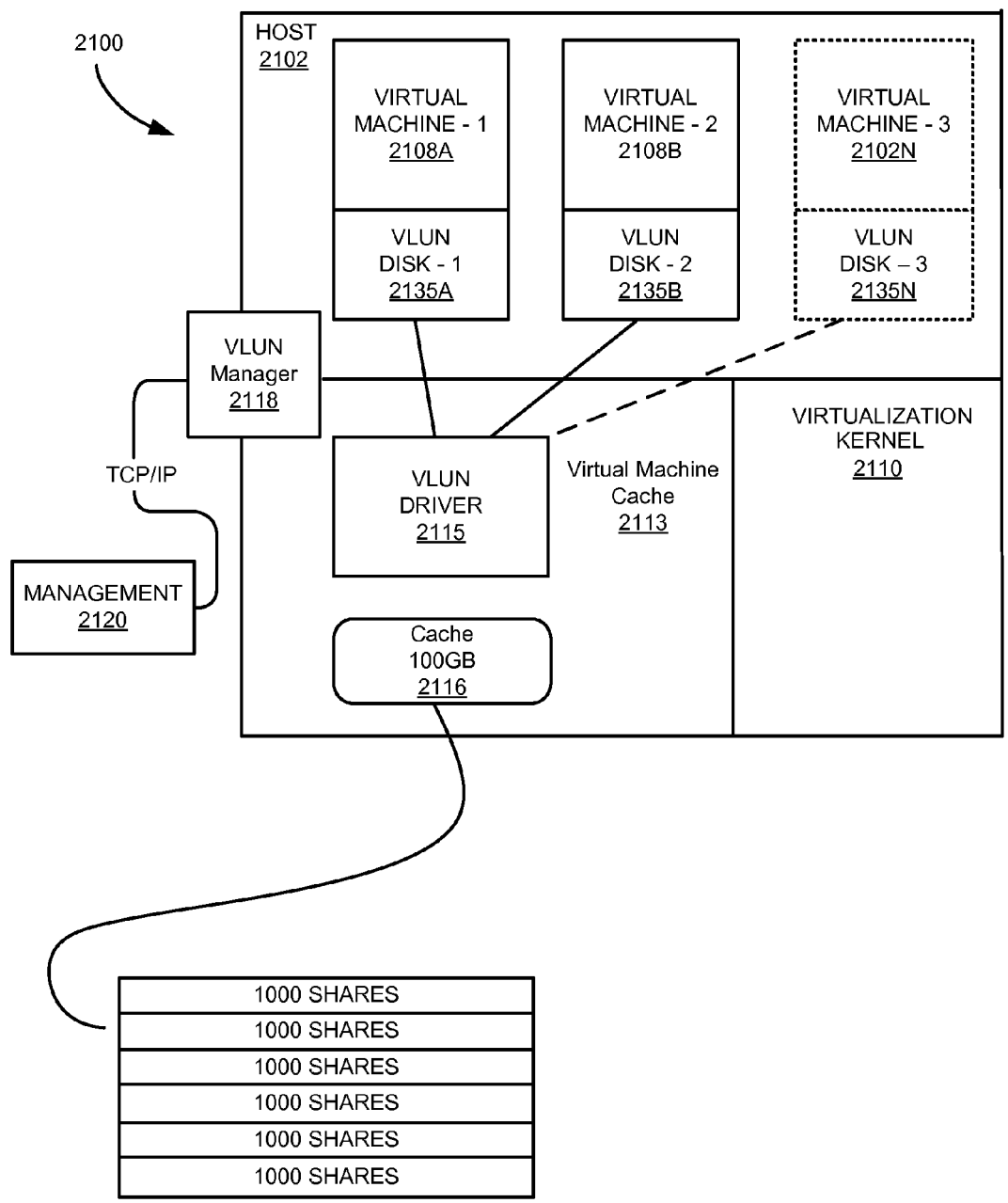
FIG. 21 is a block diagram of one embodiment for allocating cache storage between a plurality of virtual machines.

FIG. 21 depicts another embodiment of a virtual machine cache operating on a host 2102. The host 2102 includes virtual machines 2108A-N each comprising a respective VLUN disk 2135A-N configured to communicate with a shared virtual machine cache 2113 operating within the virtualization kernel 2110 (via the VLUN driver 2115, as described above). Cache storage 2116 is configured to store data from the virtual machines 2108A-N as allocated by VLUN driver 2115. The system further includes a VLUN manager 2118 that communicates between host 2102 and management module 2120 via a TCP/IP protocol connection.

The VLUN Manager 2118 may comprise a user space daemon that configures the provisioning of the portions of the cache storage among the different virtual machines 2108A-N (e.g., to parcel out cache storage fairly and efficiently among the virtual machines 2108A-N). When a management module 2120 may establishing relative proportions allocated among the various virtual machines 2108A-N. Shares of storage space may be defined for each virtual machine 2108A-N, for example:

Virtual Machine 1 2108A—1000 shares
Virtual Machine 2 2108B—3000 shares
Virtual Machine 3 2108N—2000 shares These shares are used as an abstract definition of proportions of cache storage that is allocated to particular virtual machines 2108A-N, independent of the actual size of the cache 2116. The shares can be divided up and allocated among multiple virtual machines 2108A-N as they are added or subtracted from the host 2102, as further cache capacity is added, and/or as the system changes over time. The shares allow for a relative dynamic percentage for each virtual machine 2108A-N in response to changing demands. Thus, for each virtual machine 2108A-N, the amount of cache storage it receives can be calculated as Capacity of VM-1 shares=(VM-1 shares/total active VM shares) Cache Capacity, where the total "active" VM shares are the total number of shares allocated to total number of powered-on virtual machines 2108A-N. Thus, for virtual machines 2108A-N that are not up and running, their shares are not accounted for in the capacity equation. Thus, for the example in FIG. 21, and given the allocated shares set forth above, since only Virtual Machine-1 2108A and Virtual Machine-2 2108B are active, and given the example of a 100 GB cache storage capacity, the following capacities may be calculated:

VM1 Capacity=(1000/4000)100 GB=25.0 GB
VM2 Capacity=(3000/4000)100 GB=75.0 GB

The different virtual machines 2108A-N may be powering on and off, vMotionting/migrating away and back to the host, so the capacity allocations can change over time. At the time Virtual Machine-3 2108N comes on line, the capacity of each host would be calculated as follows:

VM1 Capacity=(1000/6000)100 GB=16.7 GB
VM2 Capacity=(3000/6000)100 GB=50.0 GB
VM3 Capacity=(2000/6000)100 GB=33.3 GB Thus, the current percentage may be calculated based on current allocations. In performing this transition of VM3 2108N online and being allocated its percentage or shares of cache storage, VM3 2108N must be allocated its percentage shares, and virtual machines VM1 2108A and VM2 2108B must relinquish storage space. This is accomplished by the methods discussed above in connection with FIGS. 17 and 18. Each virtual machine 2108A-N must stall operations, change capacity, and then resume operations. Thus, for each machine, VM2 2108B must shrink from 75% to 50%, VM1 2108A must shrink from 25% to 17%, and VM3 2108N can then be given its 33.3%, which is taken from the relinquished storage space from VM1 2108A and VM2 2108B. Thus, the embodiment provides a dynamic provisioning of cache using a virtual disk approach.

Additionally, to the extent virtual machines can be provisioned storage space according to the shares concept, IOPS capacity can also be allocated among the virtual machines. Thus, for each machine, VM1 Capacity=(1000/6000)100k IOPS
VM2 Capacity=(3000/6000)100k IOPS
VM3 Capacity=(2000/6000)100k IOPS In one embodiment, the VLUN driver 2115 manages the cache 2116 such that each VM 2108A-N receives its allocated shares of IOPS capacity. Typically, a cache device 2116 operates at a single IOPS rate for each request that it services. Consequently, the VLUN driver 2115 in one embodiment manages IOPS shares amongst VM1 2108A, VM2 2108B, and VM3 2108N by giving each an opportunity to use the cache device 2116 in a given time period. In other words, each VM 2108A-N gets a time slice within a given time period to use the cache device 2116. In this manner, the IOPS capacity between VMs 2108A-N can be managed. In some embodiments, the IOPS rate of a VM 2108A-N may be throttled to allow other VMs 2108A-N to access the cache 2116 in accordance with IOPS share allocation therebetween.

As discussed above, virtual machines may be transferred between hosts, without powering down or taking the virtual machine offline in the process. In conventional systems, since hosts are usually connected to shared storage, this process is well defined and seamless. However, in systems configured according to the various embodiments described above that utilize local cache storage rather than shared storage for certain virtual system operations, such as a thin provisioned cache, there are conflicts that result from exercising certain features common in virtual systems such as moving virtual machines from one host to another.

In conventional virtual systems, a virtual machine may be moved from one host to another by utilizing and/or emulating shared storage. However, moving virtual machines from one host to another while utilizing the various embodiments described herein, problems would occur with the transfer, and critical data and virtual systems operations may be compromised. In some virtual systems, the move simply would not be allowed—such as by VMWare™ virtual system products for example. As discussed above, the systems and methods for emulated a shared storage device may address these issues.

Referring back to FIG. 1, shared storage may be emulated by use of an I/O filter 219 operating within the virtual machines 208A-N. The I/O filter 219 may be configured to monitor I/O operations directed to particular virtual machine disks (VMDKs). The virtualization kernel 210 may treat VMDKs as shared storage; therefore, any virtual machine 208A-N that maps to a VMDK may be available for to be transferred (e.g., in a VMotion™ operation).

Figure 22A:
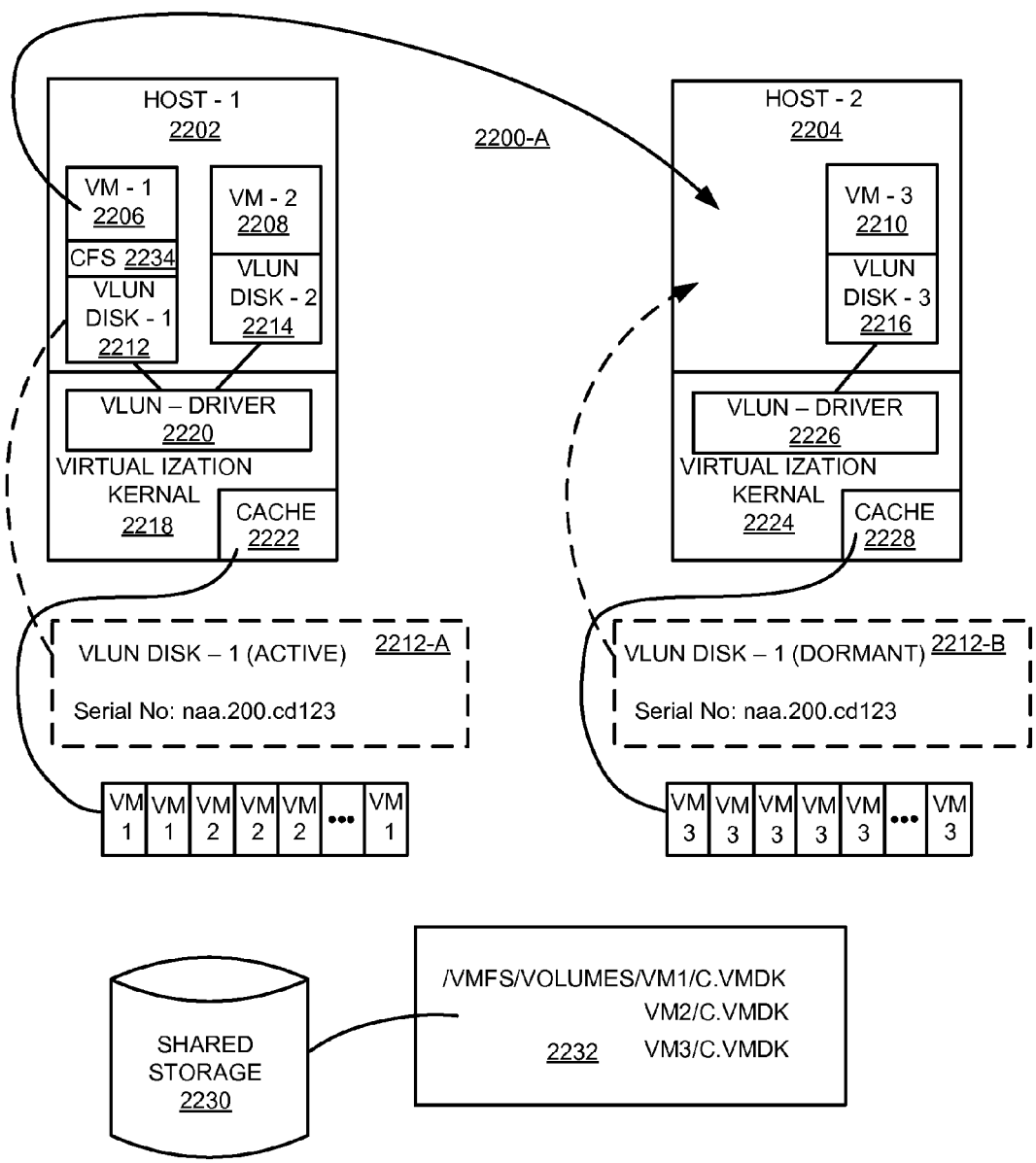
FIGS. 22A and 22B depict one embodiment of a system for relocating a virtual machine.

In other examples, shared storage is emulated by creating shared VLUN disks that are configured to appear, to the virtualization kernel 210, to the shared devices (e.g., by replicating a serial number, or other identifier). FIG. 22A depicts one embodiment of a configuration for emulating shared storage. The FIG. 22 embodiment 2200-A includes two hosts Host-1, 2202 and Host-2, 2204, where Host-1 includes instances of two virtual machines, VM-1 2206 and VM-2 2208, that have VLUN disks 2212 and 2214 respectively. Host-2 includes virtual machine VM-3 2210 having VLUN disk-3 2216. Host-1 further includes virtualization kernel 2218 and VLUN driver 2220 instantiated therein, as well as cache storage 2222 for storing cache data from the virtual machines 2206, 2208. Each cache storage may be divided up into chunks as discussed above, where the chunks are identified as holding either VM-1 or VM-2 data in Host-1, and VM-3 data in Host-2. Host-2 includes its own virtualization kernel 2224, VLUN driver 2226 and cache storage 2228. In one embodiment, the system is configured to allow a transfer of one or any virtual machine, such as VM-1 for example, from Host-1 to Host-2, and to do so substantially seamlessly without the need to completely shut down.

In conventional virtual systems, shared storage 2230 may store the instances of the primary virtual disks 2232 of the virtual machines located among different hosts. These primary virtual disks 2232 are accessible to virtual machines operating on hosts that have shared access to the shared storage 2230. In order to enable the transfer of virtual machines from one host to another, the virtualization kernel 2218 requires that the source host (e.g. Host-1) and the destination host (e.g. Host-2) both have shared access to each storage device of the transferring virtual machine.

Embodiments of the present invention allow transfer of virtual machines between hosts, even though each host does not have access to all physical storage devices of the transferring virtual machine. For example, Host-1 and Host-2 both have access to shared physical storage 2230, but Host-2 does not have access to the physical storage device serving as the cache device 2222. Similarly, Host-1 does not have access to the physical storage device serving as the cache device 2228.

According to one embodiment, virtual machine transfers from one host to another is accomplished by instantiating the VLUN disk 2212-A in an active state on Host-1 and also instantiating a corresponding VLUN disk 2212-B in a dormant state on Host-2. In certain embodiments, these instantiations are performed before the virtual machines power on. In some embodiments, during a configuration phase, the VLUN driver 2220 instantiates a dormant VLUN disk 2212C-N on each host a user may desire to use for transferring of virtual machines, for example each host in a cluster of hosts.

The VLUN disk 2212A-N having the same serial number, either active or dormant, on each host satisfies the requirements of the virtualization kernel 2218 requires that the source host (e.g. Host-1) and the destination host (e.g. Host-2) both have shared access to each storage device of the transferring virtual machine.

For example, an instantiation of VLUN disk-1 2212-A having a serial number of "naa.200.cd123." An identical instantiation may be made in on Host-2, including the same serial number, but it is dormant, where VM-1 does not actively use the copy 2212-B, but rather uses it as a type of holding place for VM-1 when, and if, VM-1 transfers from Host-1 to Host-2. In response to the transfer, the "naa.200.cd123" disk on Host-1 becomes dormant, and the corresponding disk on Host-2 becomes active.

In a system of multiple host computers that each have multiple virtual machines, multiple VLUN disks may be instantiated on the different host computers to aid in transferring virtual machines from one host to another, with the VLUN disk of the source host transitioning to a dormant state and the VLUN disk of the destination host transitioning to an active state.

It has been observed that, in typical computing systems with peripheral and other system devices such as virtual computing systems for example, SCSI operations serve as interfaces for devices within a system and can be utilized to fool the virtualization kernel 2218 into believing that the cache storage devices located in individual host devices are actually accessible by each host in the cluster. When an operating system communicates to components within the system and discovers devices within the purview of operating system, such as storage disks, VLUN disks, and other devices, it initiates queries when a device is found to learn the device's identity and relevant operating information. It questions who the manufacturer is, what the model number is, what the capacity is, and importantly for this embodiment: what the serial number is. The serial number is configured to be globally unique within the system. Thus, in a virtual system, the operating system queries discovered devices such as disks to identify them and to derive a serial number that will be used by the operating system to identify the storage device. For virtual machines, the operating system in conventional virtual systems identifies shared storage devices, and derives a unique serial number to identify it within the virtual system. Once the virtual machines are created, the conventional virtual systems identify each virtual machine as a shared storage device by using this unique serial number assigned to the shared storage.

According to the embodiments discussed herein however, cache storage devices are not shared among different hosts, but are local to the hosts and shared among virtual machines within the hosts. In operation, conventional virtual systems require that the virtual machines are assigned to shared storage in order to enable a transfer of a virtual machine from one host to another. According to one embodiment, fictitious shared storage is created and exported to the host as a Fibre channel or SAS device. Thus, the Fibre channel or SAS device is artificially recognized as a shared storage device with a unique serial number and is instantiated when a VLUN disk is created. VLUN disk devices are fictitious shared storage spaces that are associated with actual storage space in the local cache storage devices. Once created, these VLUN disks are treated as actual devices from the perspective of the operating system. The unique serial numbers for VLUN disks instantiated within the local cache devices, such as "naa.200.cd123", are derived by the virtualization kernel from the serial number of the shared local storage, and each are unique and associated with a particular VLUN disk. Thus, when the VLUN disk is created, it is created with the unique serial number, and these are recognize by the operating system as legitimate entities, but are fictitious shared storage. This derived serial number is also used to create another VLUN disk in Host-2, such as VLUN disk-1 2212-B, so that a virtual machine such as VM-1 will have a corresponding VLUN disk in the other host to communicate to and continue its I/O data traffic after being transferred to Host-2.

Figure 23:
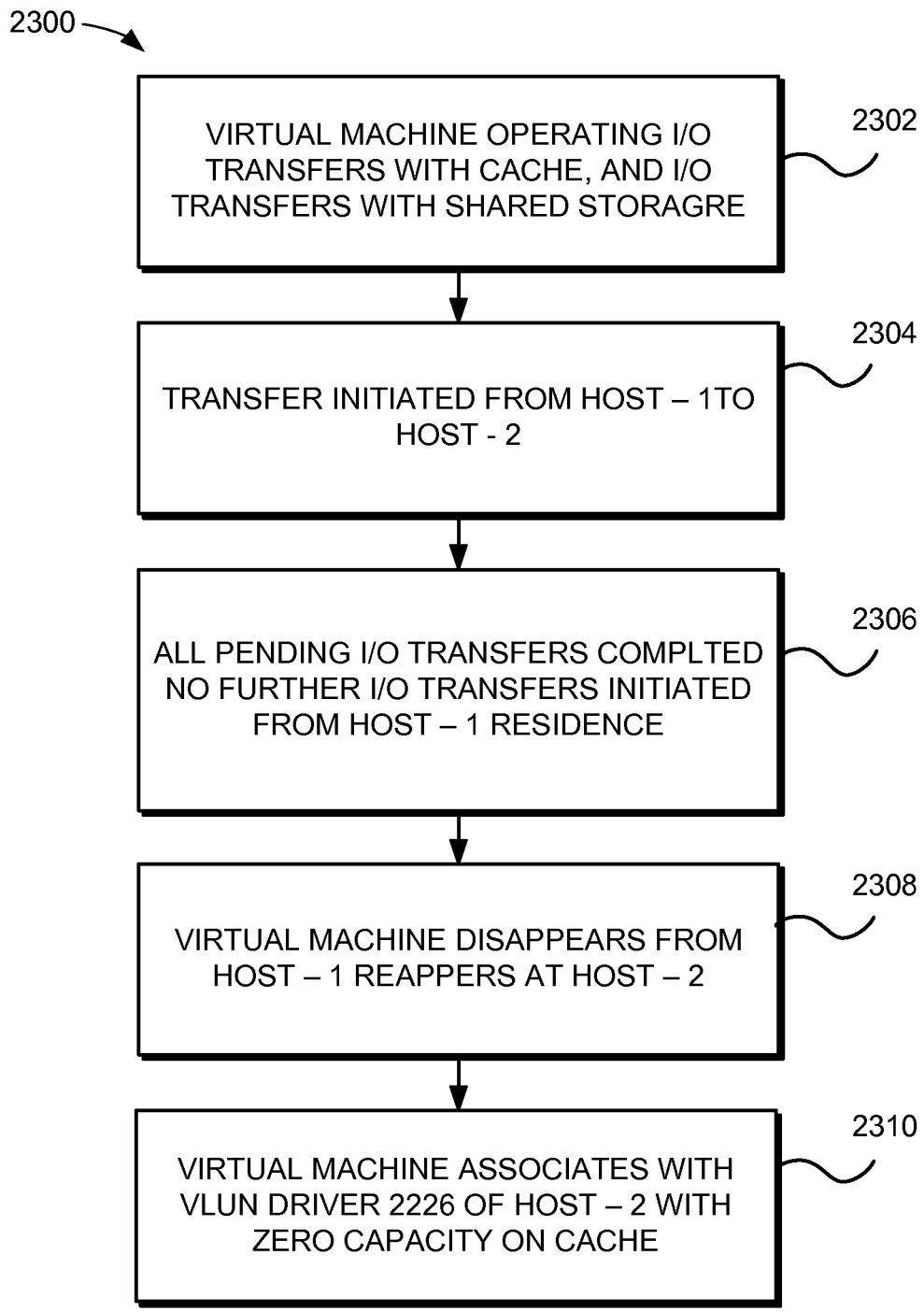
FIG. 23 is a flow diagram of one embodiment of a method for relocating a virtual machine.

While running in Host-1 prior to moving, VM-1 through CFS 2234 believes it has some amount of data stored in the cache storage 2222, having chunks designated VM 1 in this illustration, and these chunks of data storage are not resident in Host-2 after the move. Prior to the move, and referring together with FIG. 23, a flow chart 230—showing general steps of a transfer process, in step 2302, CFS is operating, it is actively caching data and issuing I/O data transfers to and from the cache storage in normal operation. CFS is doing read operations to the designated chunks of data storage prior to the move. Once the move is initiated in step 2304, and then in step 2306 the hypervisor first completes VM-1's initiated I/O transfers to the cache and any shared storage, and then stops these I/O transfers for a small period of time prior to the transfer of the virtual machine. In step 2308, the VM-1 then stops operating and essentially disappears from Host-1, and then reappears on Host-2 and begins operations.

Once a virtual machine moves from one host to another, the data is left resident on the prior host, Host-1 for example, and when the virtual machine arrives at the destination host, Host-2 in this example, the data is left behind. Again, this breaks the design assumption of conventional virtual systems that requires and assumes the existence of having the I/O data transfers associated with the virtual machine to be available to the virtual machine when it transfers, which is typically located on remote shared storage that is shared among different hosts. Having copies of the VLUN disks of the different virtual machines is an approach used to essentially deceive existing virtual systems into believing that each virtual machine is storing I/O data transfers in remote shared storage.

Figure 22B:
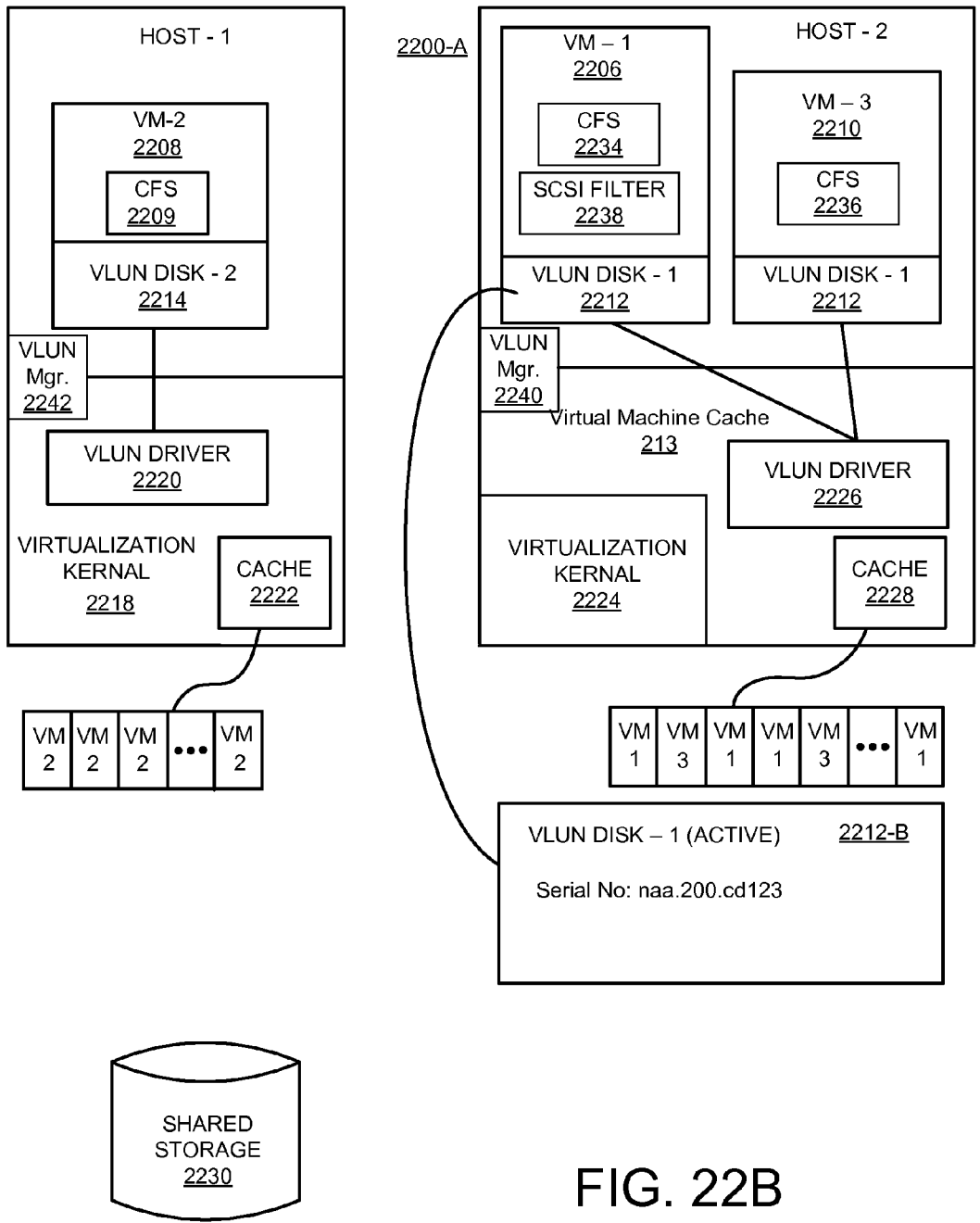
Figure 24:
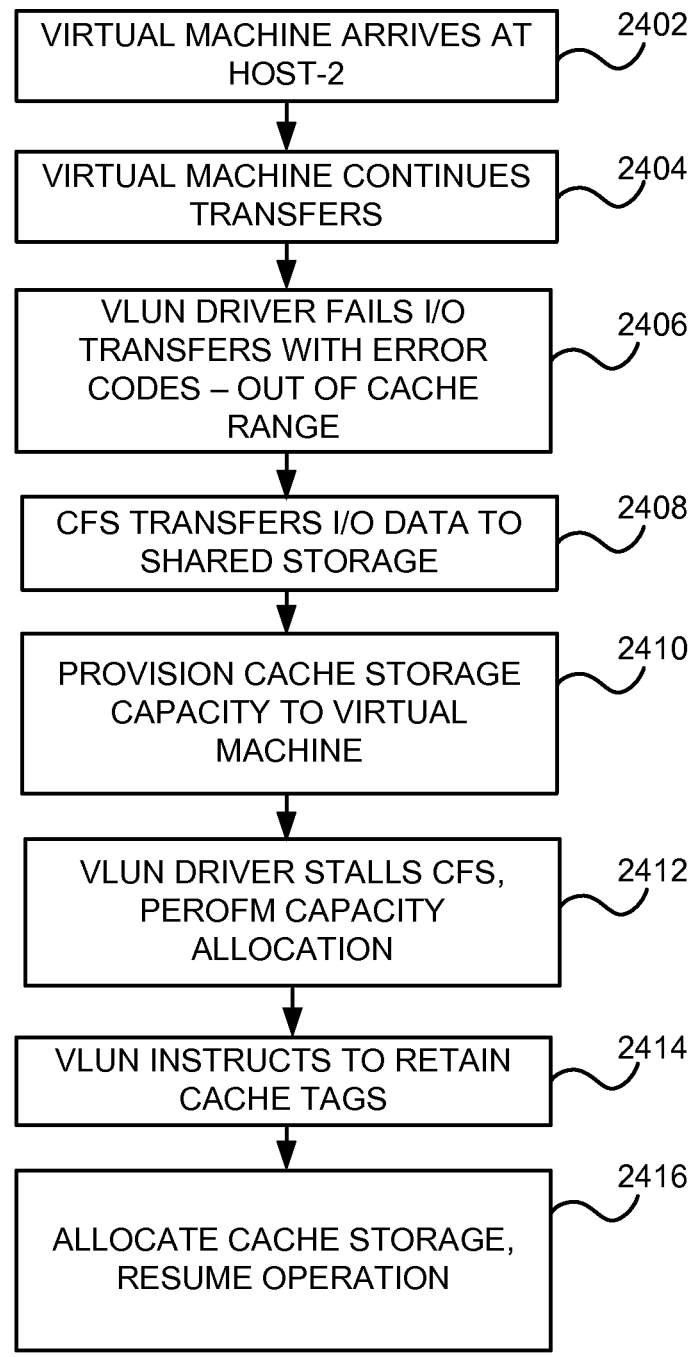
FIG. 24 is a flow diagram of another embodiment of a method for relocating a virtual machine.

In conventional systems, the hypervisor stalls I/O transfers to the remote storage device prior to transferring from one host to another. The virtual machine is then transferred to another host, instantiated on that host, and operations resume. In this embodiment, however, there is not only remote shared storage for operations, but also local storage. After the transfer, in step 2310, VM-1 is associated with VLUN driver 2226 and Cache 2228, which does not have the former cached data, and VM-1 has essentially zero capacity in the local cache 2228. Referring to FIG. 22B, the post-move system is illustrated, with VM-1 2206 appearing in Host-2, VLUN disk 2212 associating with VLUN driver 2226, and VLUN disk-1, now designated as 2212-B and being in the active state, with identical serial number naa.200.cd123. After the move, CFS 2234 of VM-1 still registers that it has 4 GB of data, and that it has data chunks stored in the cache 2222, but is now located in Host-2 without access to that cache storage with that capacity and also without access to that stored data that is still resident in cache storage 2222. Thus, VM-1 is essentially not aware that the move has occurred. Referring back to FIG. 22A, prior to the move Host-2 has only VM-3 that has the entire capacity of Cache 2228 (Note: In a typical system, multiple virtual machines VM-1, VM-2, ... VM-n, exists in a host, and there is a complex mapping of shared cache storage. For simplicity of discussion and to avoid obscuring the description of the embodiments, only these three virtual machines are illustrated). When VM-1 arrives in Host-2, VM-3 has substantially the entire capacity of Cache 2228, and VM-1 needs to get acclimated and acquire capacity in resident cache storage 2228. FIG. 24 shows an example acclamation process 2400.

After arriving in Host-2 in step 2402, CFS 2234 will continue to send I/O requests to the VLUN driver 2226 in step 2404, the new VLUN driver. The VLUN driver 2226 will fail the I/O requests in step 2406 with errors (traveling up the storage stack) to the CFS 2234 that cache addresses assigned to VM-1 are out of VM-1's range, it has no capacity. The error code is interpreted and recognized by the SCSI filter 2238 within VM-1. In some embodiments, the SCSI filter 2238 may fail the I/O requests to the CFS 2234, and request that CFS 2234 invalidate the cache tags associated with the I/O requests. Thus, there is a small period of time after the transfer from Host-1 to Host-2 when there is no cache storage capacity of Host-2 being used by VM-1. The small number of I/O requests that are issued are failed, and the cache tags are invalidated.

Alternatively, in response to the error code, the virtual machine cache 2313 may instruct the CFS 2234 to retain the cache tags (via the SCSI filter 2238). The cache tags may be retained by the cache tag retention module 418, described above. In addition, the virtual machine cache 2313 may further comprise a cache transfer module (e.g., module 329B), that is configured to transfer cache data from Host-1 to Host-2, as described above. Similarly, Host-1 may comprise a cache retention module 328A, configured to retain cache data of the virtual machine, as described above. Accordingly, the working set of cache tags 221 in the transferred virtual machine 2206 may be retained.

The CFS 2234 will then reissue the I/O requests that failed to primary virtual disk storage, typically stored on shared storage 2230 in step 2408. Later, the VLUN Manager 2240 recognizes the arrival of VM-1 in Host-2 and the VLUN driver 2226 provisions cache storage capacity for VM-1 in step 2410 according to an allocation of shares, as discussed above. In response the cache transfer module (described above) may begin transferring cache data to from Host-1 to Host-2, as described above.

Subsequent IO requests will benefit from local cache storage 2228 once CFS 2234 acquires capacity in local cache storage 2228. The VLUN driver stalls CFS 2234 as discussed above to perform capacity allocation.

In step 2414 the VLUN driver instructs the CFS 2234 to retain cache tags 221. Step 2414 may comprise resizing the cache tags 221 in accordance with the cache capacity allocated to the virtual machine 2206 on Host-2 2204. Step 2414 may further comprise initiating cache transfer(s) form the Host-1 2202 and/or shared storage 2230, as described above.

In step 2416, CFS resumes operation with the retained, potentially resized, set of cache tags 221. Also, the allocation will utilize the bit mask processes described above to protect against VM-1 reading any old data that may have been written by VM-3 or any other virtual machine. Thus, VM-1 would need to write to the chunks of allocated cache storage space before it can read, or the read requests will get a fail error.

Figure 25:
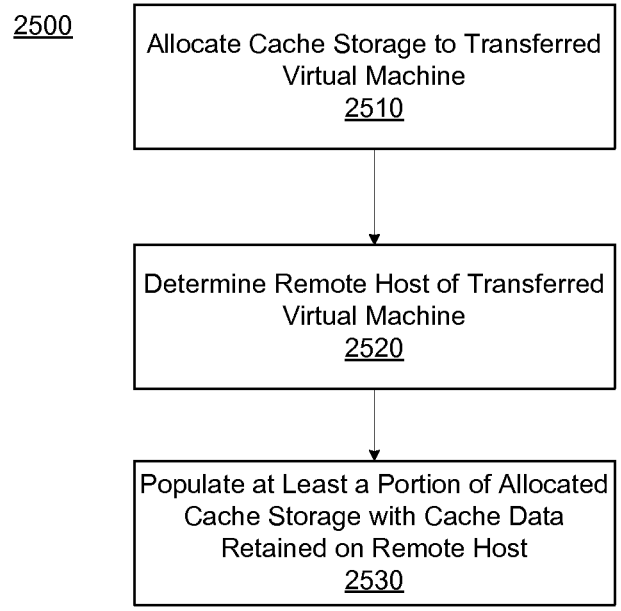
FIG. 25 is a flow diagram of one embodiment of a method for transferring a virtual machine.

FIG. 25 is a flow diagram of one embodiment of a method for transferring a virtual machine 208A-N. The method is described in conjunction with the modules depicted in FIG. 2. Step 2510 comprises allocating cache storage for a virtual machine 208X transferred to a host 202B from a remote host 202A. Step 2510 may further comprise identifying that the virtual machine 208X was transferred in response to a storage request, query, receiving cache data of the virtual machine 208X, or the like, as described above. Step 2510 may further comprise distinguishing the virtual machine transfer from an initial power-on and/or restart condition (e.g., based on the VMID of the virtual machine 208X, a host identifier, or the like). The cache storage may be allocated in a virtual disk (VLUN disk), as described above.

Step 2520 may comprise determining the remote host of the transferred virtual machine 208X. Step 2520 may comprise inspecting the VMID for an included host identifier, querying the transferred virtual machine 208X, receiving pushed cache data from the virtual machine, or the like, as described above.

Step 2530 may comprise populating at least a portion of the cache storage allocated to the virtual machine 208X with cache data retained at the remote host 202A, as described above. Step 2530, may comprise requesting the cache data, verifying that the host 202B is authorized to access the cache data, receiving the cache data in a push operation, or the like. Cache data may be requested, transferred, and/or pushed according to a cache transfer policy, as described above. In some embodiments, step 2530 further comprises populating the allocated cache storage with data accessed from primary storage 212 (or another source). Step 2530 may further comprise informing the remote host 202A that the retained cache data of the virtual machine 208X no longer needs to be retained, as described above.

Figure 26:
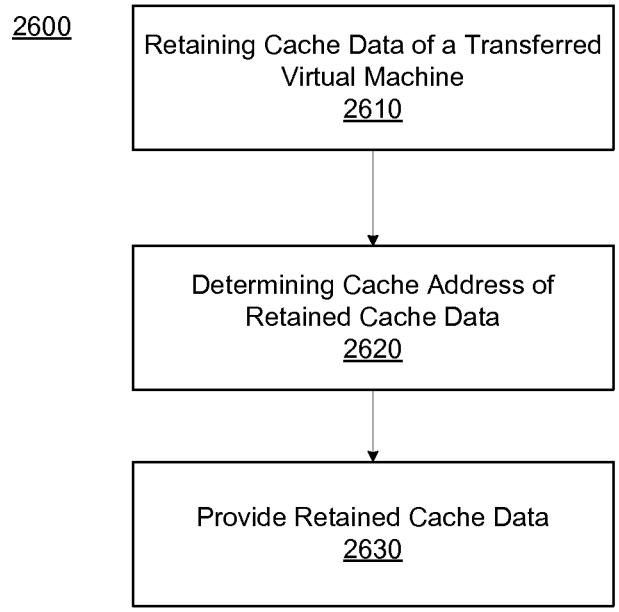
FIG. 26 is a flow diagram of another embodiment of a method for transferring a virtual machine.

FIG. 26 is a flow diagram of one embodiment of a method for transferring a virtual machine. Step 2610 comprises retaining cache data of a virtual machine 208X in a cache 216 (cache storage device) in response to transferring the virtual machine 208X to another host. The cache data may be retained according to a retention policy, as described above.

Step 2620 comprises determining an address of the retained cache data based, at least in part, on a VMID of the transferred virtual machine (e.g., within an index of mappings maintained by the map module 1522, described above).

Step 2630 comprises providing retained cache data, as described above. Step 2630 may comprise responding to requests for the cache data, pushing the cache data or the like.

Figure 27:
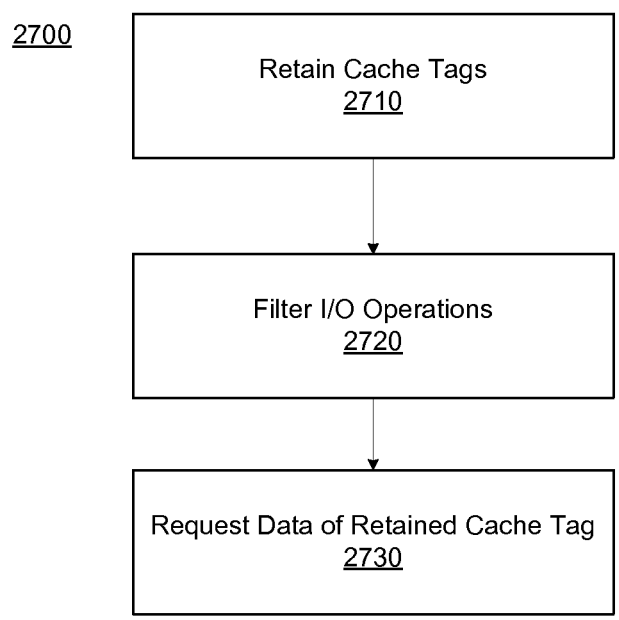
FIG. 27 is a flow diagram of another embodiment of a method for transferring a virtual machine.

FIG. 27 is a flow diagram of another embodiment for transferring a cache. Step 2710 comprises retaining cache tags 221 in response to a transfer. Step 2720 comprises filtering I/O operations and directing selected I/O operations to a CMS 220. Step 2730 may comprise requesting data of a retained cache tag, as described above.

The embodiments disclosed herein may involve a number of functions to be performed by a computer processor, such as a microprocessor. The microprocessor may be a specialized or dedicated microprocessor that is configured to perform particular tasks according to the disclosed embodiments, by executing machine-readable software code that defines the particular tasks of the embodiment. The microprocessor may also be configured to operate and communicate with other devices such as direct memory access modules, memory storage devices, Internet-related hardware, and other devices that relate to the transmission of data in accordance with various embodiments. The software code may be configured using software formats such as Java, C++, XML (Extensible Mark-up Language) and other languages that may be used to define functions that relate to operations of devices required to carry out the functional operations related to various embodiments. The code may be written in different forms and styles, many of which are known to those skilled in the art. Different code formats, code configurations, styles and forms of software programs and other means of configuring code to define the operations of a microprocessor in accordance with the disclosed embodiments.

Within the different types of devices, such as laptop or desktop computers, hand held devices with processors or processing logic, and also possibly computer servers or other devices that utilize the embodiments disclosed herein, there exist different types of memory devices for storing and retrieving information while performing functions according to one or more disclosed embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured disclosed herein enable the physical transformation of these memory devices. Accordingly, the embodiments disclosed herein are directed to novel and useful systems and methods that, in one or more embodiments, are able to transform the memory device into a different state. The disclosure is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

We claim:

1. An apparatus, comprising:
 a virtual machine cache configured to cache data, of one or more virtual machines operating on a host computing device, in a cache storage device of the host computing device, wherein the cache data is admitted into the cache storage device in response to storage requests of the respective virtual machines;
 a cache retention module configured to retain cache data of a virtual machine of the one or more virtual machines in response to the virtual machine being transferred from the host computing device to a remote host computing device, the retained cache data corresponding to data of a primary storage system; and
 a cache transfer module configured to provide retained cache data of the transferred virtual machine to the remote host computing device in response to a request of the transferred virtual machine operating on the remote host computing device.

2. The apparatus of claim 1, wherein the cache transfer module is configured to provide the retained cache data of the transferred virtual machine to the remote host computing device in response to a request from the remote host computing device, wherein the request from the remote host computing device is responsive to the request of the transferred virtual machine operating on the remote host computing device.

3. The apparatus of claim 1, wherein the virtual machine cache is configured to maintain mappings between virtual machine identifiers of virtual machines operating on the host computing device and cache addresses of the cache storage device, and wherein the cache transfer module is configured to identify the retained cache data of the transferred virtual machine using the mappings.

4. The apparatus of claim 1, wherein the cache transfer module is configured to push at least a portion of the retained cache data of the transferred virtual machine to the remote host computing device.

5. The apparatus of claim 1, wherein the cache retention module is configured to retain the cache data of the transferred virtual machine in accordance with a cache data retention policy.

6. The apparatus of claim 5, wherein the cache data retention policy provides for removing the retained cache data of the transferred virtual machine in response to one or more of:
 expiration of a retention threshold,
 determining that the retained cache data of the transferred virtual machine has been transferred to the remote host computing device, and
 receiving an indication that the retained cache data of the transferred virtual machine no longer needs to be retained.

7. The apparatus of claim 1, wherein the cache transfer module is configured to verify that the transferred virtual machine has been transferred to the remote host computing device.

8. The apparatus of claim 1, wherein the cache transfer module is configured to identify the retained cache data of the transferred virtual machine stored on the cache storage device of the host computing device based on a virtual machine identifier of the transferred virtual machine.

9. A method, comprising:
 retaining cache data of a virtual machine on a cache storage device of a first host computing device in response to determining that the virtual machine was transferred to a second host computing device, the retained cache data admitted into the cache storage device in response to storage requests at the first host computing device, the retained cache data corresponding to data of a primary storage system;
 determining a cache address of the retained cache data of the transferred virtual machine in the cache storage device of the first host computing device; and
 transferring retained cache data at the determined cache address in the cache storage device of the first host computing device to the second host computing device via a network, wherein the retained cache data is transferred in response to a request of the transferred virtual machine operating on the second host computing device.

10. The method of claim 9, wherein the request of the transferred virtual machine operating on the second host computing device is one of:
 a storage request of the transferred virtual machine operating on the second host computing device, and
 a request to prefetch retained cache data of the transferred virtual machine operating on the second host computing device.

11. The method of claim 9, further comprising pushing at least a portion of the retained cache data of the transferred virtual machine from the first host computing device to the second host computing device.

12. The method of claim 9, further comprising:
maintaining mappings between virtual machine identifiers and cache addresses of the cache storage device; and
determining the cache address of the retained cache data of the transferred virtual machine based on a virtual machine identifier of the transferred virtual machine included in a request for the retained cache data of the transferred virtual machine.

13. The method of claim 9, further comprising assigning respective virtual machine identifiers to virtual machines operating on the first host computing device, the virtual machine identifiers comprising an identifier of the first host computing device.

14. The method of claim 9, further comprising removing the retained cache data of the transferred virtual machine from the cache storage device in response to one or more of:
expiration of a retention threshold;
determining that the retained cache data of the transferred virtual machine has been transferred to the second host computing device; and
receiving an indication that the retained cache data of the transferred virtual machine no longer needs to be retained by the first host computing device.

15. An apparatus, comprising:
an input/output (I/O) driver for a particular virtual machine operating on a first host computing device configured to direct I/O operations of the particular virtual machine pertaining to a primary storage system to a virtual machine cache of the first host computing device;
a cache manager configured to maintain cache tags corresponding to cache data of the particular virtual machine, wherein the cache tags associate identifiers of the particular virtual machine with cache data corresponding to the primary storage system admitted into the virtual machine cache of the first host computing device, wherein the cache data is admitted into the virtual machine cache in response to I/O operations of the particular virtual machine operating on the first host computing device; and
a cache tag retention module configured to retain the cache tags corresponding to the cache data of the particular virtual machine admitted into the virtual machine cache of the first host computing device in response to determining that the particular virtual machine has been transferred from the first host computing device to a second host computing device, and
wherein the cache manager is configured to request data of a retained cache tag of the particular virtual machine operating on the second host computing device in response to an I/O operation of the virtual machine pertaining to data of the primary storage system admitted into the virtual machine cache of the first host computing device.

16. The apparatus of claim 15, wherein the cache manager is configured to provide a virtual machine identifier to the virtual machine cache of the first host computing device in response to determining that the particular virtual machine was transferred to the second host computing device.

17. The apparatus of claim 15, wherein the cache manager is configured to identify cache tags to prefetch from the first host computing device.

18. The apparatus of claim 17, further comprising a clock sweep module configured to maintain cache aging metadata, wherein the cache manager is configured to identify the cache tags to prefetch based on the cache aging metadata.

19. The apparatus of claim 15, wherein the cache manager is configured to remove one or more of the retained cache tags of the particular virtual machine in response to being allocated less cache capacity on the second host computing device than the particular virtual machine was allocated on the first host computing device.

\* \* \* \* \*